US007711573B1

(12) United States Patent
Obeid

(10) Patent No.: US 7,711,573 B1
(45) Date of Patent: *May 4, 2010

(54) RESUME MANAGEMENT AND RECRUITMENT WORKFLOW SYSTEM AND METHOD

(75) Inventor: Diya B. Obeid, New York, NY (US)

(73) Assignee: Algomod Technologies Corporation, New York, NY (US)

( * ) Notice: Subject to any disclaimer, the term of this patent is extended or adjusted under 35 U.S.C. 154(b) by 2055 days.

This patent is subject to a terminal disclaimer.

(21) Appl. No.: 10/418,142

(22) Filed: Apr. 18, 2003

(51) Int. Cl.
*G06Q 99/00* (2006.01)
(52) U.S. Cl. ......................................................... 705/1
(58) Field of Classification Search ........................ 705/1
See application file for complete search history.

(56) References Cited

U.S. PATENT DOCUMENTS

| | | | |
|---|---|---|---|
| 5,832,497 A | 11/1998 | Taylor | |
| 6,049,776 A | 4/2000 | Donnelly et al. | |
| 6,266,659 B1 | 7/2001 | Nadkarni | |
| 6,374,259 B1 | 4/2002 | Celik | |
| 6,385,620 B1 * | 5/2002 | Kurzius et al. | 707/104.1 |
| 6,408,337 B1 | 6/2002 | Dietz et al. | |
| 7,016,853 B1 * | 3/2006 | Pereless et al. | 705/1 |
| 2001/0034630 A1 * | 10/2001 | Mayer et al. | 705/7 |
| 2001/0056422 A1 | 12/2001 | Benedict, Jr. et al. | |
| 2002/0002479 A1 | 1/2002 | Almog et al. | |
| 2002/0002563 A1 | 1/2002 | Bendik | |
| 2002/0046074 A1 | 4/2002 | Barton | |
| 2002/0046224 A1 | 4/2002 | Bendik | |
| 2003/0093322 A1 * | 5/2003 | Sciuk | 705/26 |

OTHER PUBLICATIONS

"About AIRS—AIRS", web page [online], AIRS, 2003 [1 page retrieved on Oct. 21, 2003]. Retrieved from the Internet: <http://www.airsdirectory.com/aboutairs/press/press_release/oxygen_2_release.html>.
"Product Information", web page [online], AIRS, 2003 [3 pages retrieved on Oct. 21, 2003]. Retrieved from the Internet: <http://www.airsoxygen.com/spartner/product.guid?_page=productpromo2>.
Analysts International Website Pages [online], Analysts International, 2003 [2 pages retrieved on Oct. 29, 2003]. Retrieved-from the Internet: <http://www.analysts.com/>.

(Continued)

*Primary Examiner*—Jonathan Ouellette
(74) *Attorney, Agent, or Firm*—Kenneth P. Waszkiewicz, Attorney at Law

(57) ABSTRACT

A computer system and method for managing access to a resume database. For each skill or experience-related phrase in a resume, the system computes a term of experience based on an experience range associated with a contextual use of the phrase in the resume. The term of experience for a phrase that occurs multiple times in the resume is the summation of the term of experience for each occurrence of the phrase associated with a different contextual use. The system stores each phrase and the term of experience in a parsed resume. The resume database also stores job descriptions that include required phrases and a required term of experience for each required phrase. The job descriptions also store a required level of education or field of specialization, and a required salary range. A recruiter searches the resume database to find matching resumes that satisfy a job description.

520 Claims, 24 Drawing Sheets

OTHER PUBLICATIONS

"IT Supplemental Resources—Highly-Qualified People in the Right Place, at the Right Time", product features [online], Analysts International Corporation, 2001 [2 pages retrieved]. Retrieved from the Internet.

Beeline Website pages [online], Beeline.com, Inc., 1999-2003 [12 pages retrieved on Oct. 29, 2003]. Retrieved from the Internet: <http://www.beeline.com/>.

Bullhorn Website Pages [online], Bullhorn, Inc., 1999-2003 [32 pages retrieved on Oct. 29, 2003]. Retrieved from the Internet: <http://www.bullhorn.com/>.

Burning Glass Website Pages [online], Burning Glass Technology, 2003 [32 page retrieved on Nov. 26, 2003]. Retrieved from the Internet: <http://www.burningglass.com/>.

Elance Website Pages [online], Elance, Inc., 2000-2003 [26 page retrieved on Oct. 29, 2003]. Retrieved from the Internet: <http://www.elance.com/>.

Chimes Website Pages [online], Chimes, Inc. 2003 [16 pages retrieved on Oct. 29, 2003]. Retrieved from the Internet: <http://www.chimesnet.com/public/aboutus/execsummary.cfm>.

Comensura Website Pages [online], Comensura, 2001 [4 pages retrieved on Oct. 29, 2003]. Retrieved from the Internet: <http://www.comensura.com/>.

"What we do", web page [online], Corporate Services Group [1 page retrieved on Oct. 29, 2003]. Retrieved from the Internet: <http://www.csg-group.com/business/content/content_we.htm>.

Clear Technology Website Pages [online], Clear Technology, Inc. [13 pages retrieved on Oct. 29, 2003]. Retrieved from the Internet: <http://www.clear-technology.com/>.

Covendis Technologies Website Pages [online], Covendis Technologies, 2001 [13 page retrieved on Oct. 29, 2003]. Retrieved from the Internet: <http://www.covendis.com/>.

DataFrenzy Website Pages [online], Data Frenzy!, 2003 [8 page retrieved on Dec. 10, 2003]. Retrieved from the Internet: <http://www.datafrenzy.com/>.

DCR Website Pages [online], DCR, 2001 [9 pages retrieved on Oct. 30, 2003]. Retrieved from the Internet: <http://www.dcr-inc.com/>.

Econometrix Website Pages [online], Econometrix [8 pages retrieved on Oct. 30, 2003]. Retrieved from the Internet: <http://www.econometrix.com>.

CREATIVEmoonlighter Website Page [online], Emoonlighter.com [4 pages retrieved on Dec. 12, 2003]. Retrieved from the Internet: <http://www.creativemoonlighter.com/>.

"Tech 50 winners spoiling for fight", web page [online], PG Publishing Co., Inc. 1997-2003 [2 pages retrieved on Dec. 12, 2003]. Retrieved from the Internet: <http://www.post-gazette.com/pg/03290/231803.stm>.

"Small Companies, Big Returns", web page [online], Ziff Davis Media, Inc. 2001-2003 [4 pages retrieved on Dec. 12, 2003]. Retrieved from the Internet: <http://www.baselinemag.com/article2/0,3959,1325756,00.asp>.

"Boosted by Guru buy, Emoonlighter reports 2Q gains—Aug. 5, 2003—Pittsburgh Business . . . ", article [online], American City Business Journals, Inc. 2003 [1 page retrieved on Dec. 12, 2003]. Retrieved from the Internet: <http://pittsburgh.bizjournals.com/Pittsburgh/stories/2003/08/04/daily21.html?t=printable>.

"Customers aren't biting or fighting at Robot Club & Grill—Apr. 28, 2003—Pittsburgh Busin . . . ", article [online], American City Business Journals, Inc. 2003 [2 pages retrieved on Dec. 12, 2003]. Retrieved from the Internet: <http://pittsburgh.bizjournals.com/pittsburgh/stories/2003/04/28/focus4.html?t=printable>.

"Emoonlighter's controlled growth helps it succeed in tough economy—Feb. 17, 2003—Pitts . . . ", article [online], American City Business Journals, Inc. 2003 [3 pages retrieved on Dec. 12, 2003]. Retrieved from the Internet: <http://pittsburgh.bizjournals.com/pittsburgh/stories/2003/02/17/story7.html?t=printable>.

"Tech Council announces Tech 50 winners—Sep. 27, 2002—Pittsburgh Business Times", article [online], American City Business Journals, Inc. 2002 [1 page retrieved on Dec. 12, 2003]. Retrieved from the Internet: <http://pittsburgh.bizjournals.com/pittsburgh/stories/2003/09/23/daily48.html?t=printable>.

"CourierPostOnline—South Jersey Careers", web page [online], Courier-Post 2003 [2 pages retrieved on Dec. 12, 2003]. Retrieved from the Internet: <http://www.southjerseycareers.com/sjc051302a.html>.

"Major Business News—The Wall Street Journal Sunday", web page [online], Dow Jones & Company, Inc. 2002 [3 pages retrieved on Dec. 12, 2003]. Retrieved from the Internet: <http://www.creativemoonlighter.com/press_wsj_april.html>.

"Five fun ways to make quick cash—Mar. 13, 2002", article [online], CNN/Money [3 pages retrieved on Dec. 12, 2003]. Retrieved from the Internet: <http://cnnmoney/printthis.clickability.com/pt/cpt?action=cpt&title=Five+fun+ways+to+m...>.

"Moonlighting is popular, whether you need the extra money or not Dec. 23, 2001", web page [online], The Florida Times-Union [3 pages retrieved on Dec. 12, 2003]. Retrieved from the Internet: <http://www.jacksonville.com/tu-online/stories/122301/bus_8149409.html>.

"The interbiznet Bugler—Daily News for the Recruiting Professional", web page [online]. IBN: interbiznet Inc. 1999-2000[2 pages retrieved on Dec. 12, 2003]. Retrieved from the Internet: <http://www.interbiznet.com/bugler/bugler_00.09.27.html>.

Emoonlighter Website Pages [online], Emoonlighter [15 pages retrieved on Dec. 12, 2003]. Retrieved from the Internet: <http://emoonlighter.com/>.

"Amarillo Business Journal: Online job hunting works for businesses Oct. 2, 2000", web page [online], Amarillo Globe-News 2000 [2 pages retrieved on Dec. 12, 2003]. Retrieved from the Internet: <http://www.amarillonet.com/stories/100200/bus_100200-27.shtml>.

"Help Center—Employer", web page [online], [2 pages retrieved on Dec. 12, 2003]. Retrieved from the Internet: <http://www.emoonlighter.com/help_center/emp_general_info.cfm>.

EmployOn Website Pages [online], EmployOn 2003 [14 pages retrieved on Nov. 26, 2003]. Retrieved from the Internet: <http://www.employon.com/>.

Enthusian Website Pages [online], Enthusian Corp. 2000-2001 [6 pages retrieved on Oct. 31, 2003]. Retrieved from the Internet: <http://www.enthusian.com/>.

eWork Website Pages [online], eWork Exchange, Inc. 2003 [25 pages retrieved on Oct. 31, 2003]. Retrieved from the Internet: <http://www.ework.com/>.

ExecuNet Website Pages [online], ExecuNet 2003 [11 page retrieved on Oct. 10, 2003]. Retrieved from the Internet: <http://www.execunet.com/>.

Fieldglass Website Pages [online], Fieldglass, Inc. 2001-2002 [32 pages retrieved on Oct. 31, 2003]. Retrieved from the Internet: <http://www.fieldglass.com/>.

"FillYourJobs.com—Bridging the Gap Between Client and Vendor", product features [online], FillYourJobs.com [6 pages]. Retrieved from the Internet.

FillYourJobs Website Pages [online], FillYourJobs.com 2001-2002 [6 pages retrieved on Oct. 31, 2003]. Retrieved from the Internet: <http://www.fillyourjobs.com/>.

GlobalServe Website Pages [online], GlobalServe.com [3 pages retrieved on Nov. 19, 2003]. Retrieved from the Internet: <http://www.global-serve.com/>.

Gopher Recruiting Website Pages [online], BlackDog Inc. [6 pages retrieved on Oct. 10, 2003]. Retrieved from the Internet: <http://go4recruitingsoftware.com/>.

Resume Software Website Pages [online], gopher-software.com [12 pages retrieved on Oct. 10, 2003]. Retrieved from the Internet: <http://www.resume-software.com/>.

Hy-Phen Website Pages [online], hy-phen.com 2002 [8 pages retrieved on Nov. 19, 2003]. Retrieved from the Internet: <http://www.hy-phen.com/>.

Workstream Website Pages [online], Workstream Inc. 2003 [7 pages retrieved on Nov. 19, 2003]. Retrieved from the Internet: <http://www.workstreaminc.com/>.

iCIMS Website Pages [online], iCIMS 1999-2003 [4 pages retrieved on Nov. 19, 2003]. Retrieved from the Internet: <http://www.icims.com/>.

Infinity Consulting Group Website Pages [online], Infinity Consulting Group 1998-2003 [16 pages retrieved on Nov. 19, 2003]. Retrieved from the Internet: <http://www.infinitygroup.com/>.
Interactive Business Systems Website Pages [online], Interactive Business Systems, Inc. 2003 [21 pages retrieved on Dec. 1, 2003]. Retrieved from the Internet: <http://www.ibs.com/>.
"The Good, The Bad and The Ugly", article [online], NewsForRecruiters.com 2002 [1 page retrieved on Dec. 1, 2003]. Retrieved from the Internet: <http://www.newsforrecruiters.com/issue/index.cfm?t=article&a=13&ii=7>.
"News for Recruiters", article [online], NewsForRecruiters.com 2002 [2 pages retrieved on Dec. 1, 2003]. Retrieved from the Internet: <http://www.newsforrecruiters.com/issue/index.cfm?t=article&a=6&ii=2>.
IQ Navigator Website Pages [online], IQ Navigator [32 pages retrieved on Dec. 1, 2003]. Retrieved from the Internet: <http://www.iqnavigator.com/>.
iServiceX Website Pages [online], iServiceX, Inc. 2003 [44 pages retrieved on Dec. 1, 2003]. Retrieved from the Internet: <http://www.iservicex.com/>.
The Judge Group Website Pages [online], The Judge Group [2 pages retrieved on Dec. 1, 2003]. Retrieved from the Internet: <http://www.judge.com/>.
JudgeTech Contract Staffing Website Pages [online], Judge Technical Services [2 pages retrieved on Dec. 1, 2003]. Retrieved from the Internet: <http://www.judgejts.com/>.
LiquidMedium Website Pages [online], LiquidMedium [24 pages retrieved on Dec. 1, 2003]. Retrieved from the Internet: <http://www.liquidmedium.com/>.
MaxHire Website Pages [online], MaxHire, 2002 [5 pages retrieved on Oct. 10, 2003]. Retrieved from the Internet: <http://www.maxhire.net/>.
Mohomine Website Pages [online], Mohomine Inc. 2003 [11 pages retrieved on Nov. 26, 2003]. Retrieved from the Internet: <http://www.mohomine.com/>.
"Mohomine—Corporate Fact Sheet", product features [online], Mohomine, Inc. 2003 [1 page]. Retrieved from the Internet.
"Mohomine—mohoResume Extractor v4.6", product features [online], Mohomine, Inc. 2003 [2 pages]. Retrieved from the Internet.
"Mohomine—mohoResume Extractor v4.6 for Oracle iRecruitment", product features [online], Mohomine, Inc. 2003 [2 pages]. Retrieved from the Internet.
"Mohomine—mohoClassifier v2.3", product features [online], Mohomine, Inc. 2003 [2 pages]. Retrieved from the Internet.
"Mohomine—mohoClassifier for National Security Organizations", product features [online], Mohomine, Inc. 2003 [1 page]. Retrieved from the Internet.
MSX International Website Pages [online], MSX International, Inc. 2003 [15 pages retrieved on Dec. 1, 2003]. Retrieved from the Internet: <http://www.msxi.com/>.
neoIT Website Pages [online], neoIT 2003 [11 pages retrieved on Dec. 1, 2003]. Retrieved from the Internet: <http://www.neoit.com/>.
nextSource Website Pages [online], nextSource Inc. 1999-2002 [12 pages retrieved on Dec. 2, 2003]. Retrieved from the Internet: <http://www.nextsource.com/>.
"nextSource—Enterprise-Wide Human Capital Management Solutions", product features [online], nextSource Inc. [21 pages]. Retrieved from the Internet.
"nextSource Meets the New Challenges of Human Capital Management Through ASP-based Staffing Services and Solutions", white paper [online], nextSource Inc. 2001 [8 pages]. Retrieved from the Internet.
ConsultingDirect Website Pages [online], nextSource Inc. 1999-2003 [1 page retrieved on Dec. 2, 2003]. Retrieved from the Internet- <http://www.consultingdirect.com/>.
OnStaff Website Pages [online], OnStaff 2003 [4 pages retrieved on Dec. 2, 2003]. Retrieved from the Internet: <http://www.onstaff.com/>.
PeopleClick Website Pages [online], PeopleClick, Inc. 2003 [17 pages retrieved on Dec. 2, 2003]. Retrieved from the Internet: <http://www.peopleclick.com/>.
PeopleSoft Website Pages [online], PeopleSoft, Inc. 2003 [34 pages retrieved on Dec. 2, 2003]. Retrieved from the Internet: <http://www.peoplesoft.com/>.
J.D. Edwards Website Pages [online], PeopleSoft 2001-2003 [12 pages retrieved on Dec. 2, 2003]. Retrieved from the Internet: <http://www.jdedwards.com/>.
ProcureStaff Website Pages [online], ProcureStaff, Ltd. 2002-2003 [11 pages retrieved on Dec. 2, 2003]. Retrieved from the Internet: <http://www.procurestaff.com/>.
"Consol—next generation—e-sourcing, procurement and spend management system", product features [online], ProcureStaff, Ltd. 2002-2003 [8 pages]. Retrieved from the Internet.
ProSavvy Website Pages [online], ProSavvy, Inc. 2003 [5 pages retrieved on Dec. 16, 2003]. Retrieved from the Internet: <http://www.prosavvy.com/>.
RecruitTrack Website Pages [online], DGCC.com LLC 2001-2003 [33 pages retrieved on Oct. 10, 2003]. Retrieved from the Internet: <http://www.recruittrack.com/>.
ResourceOcean Website Pages [online], Resource Ocean Inc. 2002 [42 pages retrieved on Dec. 2, 2003]. Retrieved from the Internet: <http://www.resourceocean.com/>.
Resume Analyzer Website Pages [online], The Globsoft Inc. 1998-2003 [6 pages retrieved on Dec. 15, 2003]. Retrieved from the Internet: <http://www.resumeanalyzer.com/>.
Resume Mirror Website Pages [online], Resume Mirror 2001 [47 pages retrieved on Oct. 10, 2003]. Retrieved from the Internet: <http://www.resumemirror.com/>.
Resume Mirror Demonstration Program [online], Resume Mirror [24 pages retrieved on Oct. 16, 2003]. Retrieved from the Internet.
"Resume Mirror Signs Exclusive Partnership with Leading Search Technology Provider Engenium for the HR & Recruiting Market", article [online], Resume Mirror [2 pages]. Retrieved from the Internet.
"Resume Mirror Joins PeopleSoft Partner Connection Program", article [online], Resume Mirror [1 page retrieved on Oct. 10, 2003]. Retrieved from the Internet.
"Resume Mirror Announces Support for Microsoft's Office Solution Accelerator Program", article [online], Resume Mirror [1 page retrieved on Oct. 10, 2003]. Retrieved from the Internet.
RINGO Website Pages [online], RINGO 2002 [13 pages retrieved on Dec. 3, 2003]. Retrieved from the Internet: <http://www.goringo.com/>.
SkillBay Website Pages [online], SkillBay.com 2000 [38 pages retrieved on Dec. 3, 2003]. Retrieved from the Internet: <http://www.skillbay.com/>.
SonicRecruit Website Pages [online], cytiva, inc. 2003 [25 pages retrieved on Oct. 10, 2003]. Retrieved from the Internet: <http://www.sonicrecruit.com/>.
SpiderXchange Website Pages [online], SpiderXchange.com, Inc. 2001 [13 pages retrieved on Dec. 3, 2003]. Retrieved from the Internet: <http://www.spiderxchange.com/>.
WorkCard Website Pages [online], The WorkCard Company, Inc. 2002 [7 pages retrieved on Dec. 3, 2003]. Retrieved from the Internet: <http://www.workcard.com/>.
TKO Systems Website Pages [online], TKO Systems, Ltd. [3 pages]. Retrieved from the Internet: <http://www.tkosystems.com/>.
Top Echelon Website Pages [online], Top Echelon Network, Inc 1999-2002 [1 page retrieved on Dec. 3, 2003]. Retrieved from the Internet: <http://www.topechelon.com/>.
Big Biller Website Pages [online], Top Echelon 2003 [19 pages retrieved on Dec. 3, 2003]. Retrieved from the Internet: <http://www.bigbiller.com/>.
Unicru Website Pages [online], Unicru 2003 [30 pages retrieved on Nov. 18, 2003]. Retrieved from the Internet: <http://www.unicru.com/>.
Unicru Website Pages [online], Unicru 2003 [25 pages retrieved on Nov. 25, 2003]. Retrieved from the Internet.
Unicru Website Pages [online], Unicru 2003 [263 pages retrieved on Dec. 11, 2003]. Retrieved from the Internet: <http://www.unicru.com/>.
Unicru Website Pages [online], Unicru 2003 [2 pages retrieved on Dec. 12, 2003]. Retrieved from the Internet: <http://www.unicru.com/>.

Unicru Website Pages [online], Unicru 2003 [4 pages retrieved on Dec. 13, 2003]. Retrieved from the Internet: <http://www.unicru.com/>.

"Unicru—Screening out unqualified candidates: Unicru Smart Match", presentation [online], Unicru [35 pages]. Retrieved from the Internet.

"CVS Looks to Turnaround Employee Turnover", article [online], Top of the Net [1 page]. Retrieved from the Internet.

"HR Empowers Employees", article [online], Retail Info Systems News [1 page]. Retrieved from the Internet.

"5 Steps to Reducing Labor Pains", article [online], Hospitality Technology Magazine [3 pages retrieved on Dec. 11, 2003]. Retrieved from the Internet: <http://www.htmagazine.com/archive/htjuly/art5.htm>.

eTrucker Website Pages [online], eTrucker [1 page retrieved on Dec. 11, 2003]. Retrieved from the Internet: <http://www.etrucker.com/apps/news/article.asp?id=37983>.

"The Driver Shortage: It never goes away", article [online], PRIMEDIA Business Magazines & Media Inc. 2003 [3 pages retrieved on Dec. 11, 2003]. Retrieved from the Internet: <http://www.fleetowner.com/magazinearticle.asp?magazinearticleid=174730&magazineid...>.

"Kroger uses a web-based hiring system to cut employee turnover", article [online], Vertical Web Media 2002 [1 page retrieved on Dec. 11, 2003]. Retrieved from the Internet: <http://www.internetretailer.com/printArticle.asp?id=8617>.

"Speeding the process—HR software enables companies to save time, money and headaches involved with hiring workers", article [online], American City Business Journals Inc. 2002 [3 pages retrieved on Dec. 11, 2003]. Retrieved from the Internet: <http://triad.bizjournals.com/triad/stories/2002/10/07/focus1.html?t=printable>.

"Kroger hiring kiosks get green light—Grocer to expand test after positive startup", article [online], American City Business Journals Inc. 2003 [2 pages retrieved on Dec. 11, 2003]. Retrieved from the Internet: <http://cincinnati.bizjournals.com/cincinnati/stories/2003/02/24/story4.html?t=printable>.

"Unicru: Taking It to the Source", article [online], Hurwitz Group, Inc. 2001 [2 pages]. Retrieved from the Internet.

"Back to Basics: Harnessing the Power of Hourly Workers", article [online], Summit Strategies 2003 [2 pages retrieved on Dec. 11, 2003]. Retrieved from the Internet: <http://www.summitstrat.com/assets/ALfebCOL>.

Kutik, William M., "Searching and Matching Candidates to Jobs: Fixing the Weak Link in Recruiting Technology", white paper [online], [11 pages]. Retrieved from the Internet.

COMSYS Website Pages [online], COMSYS Information Technology Service, Inc. [29 pages retrieved on Dec. 3, 2003]. Retrieved from the Internet: <http://www.comsys.com>.

"Vendor One—A COMSYS Solution—One Call. It's Done.", product features [online], COMSYS Information Technology Service, Inc. 2001 [6 pages]. Retrieved from the Internet.

"COMSYS—The Art of Progress", product features [online], COMSYS Information Technology Service, Inc. 2002 [15 pages]. Retrieved from the Internet.

"COMSYS—Staffing Solutions—Meeting the demands of business in real-time", product features [online], COMSYS Information Technology Service, Inc. 2003 [6 pages]. Retrieved from the Internet.

Venturi Website Pages [online], Venturi Partners [14 pages retrieved on Dec. 3, 2003]. Retrieved from the Internet: <http://www.venturipartners.com>.

Venturi vWorx Website Pages [online], Venturi Partners [4 pages retrieved on Dec. 3, 2003]. Retrieved from the Internet: <http://www.vworx.com>.

Venturi Technology Partners Website Pages [online], Venturi Technology Partners [1 page retrieved on Dec. 3, 2003]. Retrieved from the Internet: <http://www.venturitechnologypartners.com>.

VirtualEdge Website Pages [online], VirtualEdge Corporation 2003 [18 pages retrieved on Oct. 10, 2003]. Retrieved from the Internet: <http://www.virtualedge.com>.

VirtualEdge Website Pages [online], VirtualEdge Corporation 2003 [1 page retrieved on Oct. 10, 2003]. Retrieved from the Internet: <http://www.virtualedge.apply2jobs.com/INDEX.CFM>.

RecruitSoft Website Pages [online], RecruitSoft, Inc. [24 pages retrieved on Dec. 3, 2003]. Retrieved from the Internet: <http://www.whiteamber.com>.

"White Amber—What we do", product features [online], White Amber, Inc. 1999-2003 [2 pages]. Retrieved from the Internet.

"How White Amber works: Looking under the hood", product features [online], White Amber, Inc. [3 pages]. Retrieved from the Interne: <http://www.whiteamber.com>.

WorkforceLogic Website Pages [online], WorkforceLogic.com [37 pages retrieved on Dec. 3, 2003]. Retrieved from the Internet: <http://www.workforcelogic.com>.

Workplace Technology Ventures Website Pages [online], Workplace Technology Ventures 2002 [28 pages retrieved on Dec. 3, 2003]. Retrieved from the Internet: <http://www.workplace.net>.

Xperius Website Pages [online], Xperius 2003 [20 pages retrieved on Dec. 12, 2003]. Retrieved from the Internet: <http://www.xperius.com>.

"TrueCareers : Employers : Our Services", web page [online], TrueCareers Inc., 2001-2003 [3 pages retrieved on Mar. 14, 2003]. Retrieved from the Internet: <http://www.truecareers.com/EmployerX/OurServices.asp>.

"Axiom JobQ", product features [online], Axiom Software, 2002, [5 pages retrieved on Aug. 1, 2003]. Retrieved from the Internet: <http://www.axiomjobq.com>.

"B2Secure Hiring Management System Features", product features [online], B2Secure, Inc., 2003 [1 page retrieved on Mar. 5, 2003]. Retrieved from the Internet: <http://www.b2secure.com/features.asp>.

"Monster Office HQ—Monster", web page [online], Monster, 2002 [2 pages retrieved on Mar. 4, 2003]. Retrieved from the Internet: <http://recruiter.monster.com/sourcing/resumesearch.asp>.

"Talent Match search", web page [online], Dice, Inc., 1991-2003 [2 pages retrieved on Mar. 4, 2003]. Retrieved from the Internet: http://employer.dice.com/talentmatch/index.jsp?jan=721>.

"Dice—Job Search for Technology Professionals", web page [online], Dice, Inc., 1991-2003 [3 pages retrieved on Mar. 13, 2002]. Retrieved from the Internet: <http://seeker.dice.com/seeker.epl?rel_code32 _1102>.

"Sourcer Products—Wizard Workshop Tip: Synonym Management", article [online], Young Associates, Inc., 1998-2002 [2 pages retrieved on Mar. 5, 2003]. Retrieved from the Internet: <http://www.sourcer.com/tip2.html>.

"Sourcer Products—Wizard Workshop Tip: Stop Searching!", article, [online], Young Associates, Inc., 1998-2002 [4 pages retrieved on Mar. 5, 2003]. Retrieved from the Internet: <http://www.sourcer.com/tip3.html>.

"Sourcer: Download a Tour of Sourcer", demonstration program [online], Sourcer Products, 1998-2003 [3 page retrieved on Mar. 5, 2003]. Retrieved from the Internet: <http://www.sourcer.com/downloads.html>.

"Peopleclick Solutions clickXg Recruitment Management", product features [online], Peopleclick, Inc., 2003 [1 page retrieved on Mar. 6, 2003]. Retrieved from the Internet: <http://www.peopleclick.com/solutions/recruitmentasp>.

"WinSearch—Recruiting Software—Simplified Resume Processing from Relational Syste..", product features [online], Relational Systems, Inc., 2002 [1 page retrieved on Mar. 6, 2003]. Retrieved from the Internet: <http://www.winsearch.com/xq/ASP/qx/ws3.htm>.

"Winsearch—Recruiting Software—Workflow Management from Relational Systems, Inc.", product features [online], Relational Systems, Inc., 2002 [2 pages retrieved on Mar. 6, 2003]. Retrieved from the Internet: <http://www.winsearch.com/xq/ASP/qx/ws1.htm>.

"Member Workstation—Tell Me More About Power/Profile Search", web page [online], Internet Association Group, Inc., 2003 [2 pages retrieved on Mar. 4, 2003]. Retrieved from the Internet: <http://www.computerwork.com/cfm-bin/member_area/resume_search.cfm?id=2766>.

"Member Workstation—Tell Me More About Web Search", web page [online], Internet Association Group, Inc., 2003 [1 page retrieved]. Retrieved from the Internet.

"Computerwork.com Resume Getter—Tell Me More About Resume Getter", web page [online], Internet Association Group, Inc., 1996-2002 [1 page retrieved]. Retrieved from the Internet.

"www.computerwork.com Resume Submission for Computer Professionals", web page [online], Internet Association Group, Inc., 2003, [2 pages retrieved on Mar. 4, 2003]. Retrieved from the Internet: <http://www.computerwork.com/cfm-bin/newresume/enter_resume.cfm>.

"JobWarehouse.com: Resume Search", web page [online], JobWarehouse.com, Inc., 1997-2003 [1 page retrieved on Mar. 4, 2003]. Retrieved from the Internet: <http://www.jobwarehouse.com/jws/secure/search.cfm>.

"JobWarehouse.com: Passive Resume Search", web page [online], JobWarehouse.com, Inc., 1997-2003 [1 page retrieved on Mar. 4, 2003]. Retrieved from the Internet: <http:passive.jobwarehouse.com/search/servlet/pdc?jwession=857E550CEE4CCB2EBDAFAB9C95AC...>.

"Icarian Employee Acquisition", product features [online], Icarian [2 pages retrieved on Mar. 4, 2003]. Retrieved from the Internet: <http://www.icarian.com/products/icarian_ea.html>.

"Interactive Job Site—Connecting with Candidates", datasheet [online], Icarian [2 pages retrieved]. Retrieved from the Internet.

"Icarian Resume Management", product features [online], Icarian [1 page retrieved]. Retrieved from the Internet.

"Icarian Products—Job Board Posting", product features [online], Icarian [1 page retrieved on Mar. 4, 2003]. Retrieved from the Internet: <http://www.icarian.com/products/job_board.html>.

"PureCarbon—JobPlanet by PureCarbon", product features [online], [2 pages retrieved on Mar. 3, 2003]. Retrieved from the Internet: <http://www.purcarbon.com/jp.shtml>.

"Search Resumes", web page [online], Net Temps [1 page retrieved]. Retrieved from the Internet.

"Power Search Resumes", web page [online], Net Temps [1 page retrieved on Mar. 4, 2003]. Retrieved from the Internet: <http://desk.net-temps.com/search_power.html>.

"Hot.Jobs.com Person Search", web page [online], Yahoo! [2 pages retrieved on Mar. 4, 2003]. Retrieved from the Internet: <http://member.hotjobs.com/member/cgi-bin/user-show?TEMPLATE=/member/htdocs/quick-search.html>.

"HotJobs.com Person Search", web page [online], Yahoo! [3 pages retrieved on Mar. 4, 2003]. Retrieved from the Internet: <http://member.hotjobs.com/member/cgi-bin/user-show?TEMPLATE=/member/htdocs/person-search-pag...>.

"New and Improved Hotjobs Desktop", product features [online], Yahoo! [1 page retrieved]. Retrieved from the Internet.

"Yahoo! Resumix", product features [online], Yahoo! [2 pages retrieved]. Retrieved from the Internet: <http://enterprise.yahoo.com/resumix>.

"Yahoo! Enterprise Solutions—Resumix—Resumix 6", product features [online], Yahoo! Inc., 2003 [3 pages retrieved on Mar. 4, 2003]. Retrieved from the Internet: <http://enterprise.yahoo.com/resumix/recruiting/resumix6/>.

"Yahoo! Enterprise Solutions—Resumix—Resumix 6—Product Tour—3. Creating a Requisition", product features [online], Yahoo!, Inc. 2003 [1 page retrieved]. Retrieved from the Internet.

"Yahoo! Enterprise Solutions—Resumix—Resumix 6—Product Tour—4. Searching for Matching Resumes", product features [online], Yahoo!, Inc., 2003 [1 page retrieved on Mar. 4, 2003]. Retrieved from the Internet: <http://enterprise.yahoo.com/resumix/recruiting/resumix6/tour/resumix_tour4.html>.

"Yahoo! Enterprise Solutions—Resumix—Resumix 6—Product Tour—5. Viewing the Resume matches List", product features [online], Yahoo! Inc., 2003 [1 page retrieved]. Retrieved from the Internet.

"Yahoo! Enterprise Solutions—Resumix—Resumix 6—Product Tour—6. Viewing the Candidate's Resume Summary", product features [online], Yahoo! Inc., 2003 [1 page retrieved]. Retrieved from the Internet.

"Yahoo! Enterprise Solutions—Resumix—Resumix 6—Product Tour—7. Organize Your Work Your Way", product features [online], Yahoo! Inc., 2003 [1 page retrieved on Mar. 4, 2003]. Retrieved from the Internet: <http://enterprise.yahoo.com/resumix/recruiting/resumix6/tour/resumix_tour.7.html>.

"Computerjobs.com—Resumes by Skill Search", web page [online], Computer Jobs.com, Inc., 1995-2003 [3 pages retrieved on Mar. 4, 2003]. Retrieved from the Internet: <http://www.employers.computerjobs.com/client/resume_drilldown.cfm>.

"Computerjobs.com—Classic Keyword Search", web page [online], Computer Jobs.com, Inc., 1995-2003 [3 pages retrieved on Mar. 4, 2003]. Retrieved from the Internet: <http://www.employers.computerjobs.com/client/ResumeSearchClassic.dbm>.

"Computerjobs.com—Standard Keyword Search", web page [online], Computer Jobs.com, Inc., 1995-2003 [3 pages retrieved on Mar. 4, 2003]. Retrieved from the Internet: <http://www.employers.computerjobs.com/client/ResumeSearchStandard.asp>.

"Computerjobs.com—Resume Search", web page [online], Computer Jobs.com [3 pages retrieved on Mar. 4, 2003]. Retrieved from the Internet: <http://www.employers.computerjobs.com/client/resume_search.aspx>.

"Member Candidate Search—FlipDog.com", web page [online], FlipDog.com, 2000-2003 [1 page retrieved on Mar. 4, 2003]. Retrieved from the Internet: <http://www.flipdog.com/emp/emp-search.html>.

"Web Candidate Search—FlipDog.com", web page [online], FlipDog.com, 2000-2003 [1 page retrieved]. Retrieved from the Internet.

"Job Seeker Registration—FlipDog.com", web page [online], FlipDog.com, 2000-2003 [2 pages retrieved on Mar. 4, 2003]. Retrieved from the Internet: <http://www.flipdog.com/skr/register.html;jsessionid=4ZPL5J55X40TLQFIC2USF3Q?DPSLogout=true&_re...>.

"HireAbility.com—Ability Search", web page [online], HireAbility.com [1 page retrieved on Mar. 4, 2003]. Retrieved from the Internet: <http://www.hireability.com/abilitysearch.html>.

"Sarah at Your Side—Profile—Upload Résumé", web page [online], [1 page retrieved]. Retrieved from the Internet.

"Sarah at Your Side—Candidate Search", web page [online], [1 page retrieved]. Retrieved from the Internet.

"HireAbility.com—New XML Technology Makes Online Job Searching a Snap", article [online]. HireAbility.com, LLC, 1997-2003 [2 pages retrieved on Mar. 4, 2003]. Retrieved from the Internet: <http://www.hireability.com/PR_5.14.01.html>.

"HireAbility.com—Meet Sarah", product features [online], HireAbility.com, LLC, 1997-2003 [1 page retrieved on Mar. 4, 2003]. Retrieved from the Internet: <http://www.hireability.com/sarah.html>.

"HireAbility.com—Resume Processing", product features [online], HireAbility.com, LLC, 1997-2003 [2 pages retrieved on Feb. 25, 2003]. Retrieved from the Internet: <http://www.hireability.com/rezprocessing.html>.

"Tri-State Jobs—Search the Resume Database—Resume Power Search", web page [online], Tri-State Jobs [1 page retrieved on Mar. 4, 2003]. Retrieved from the Internet: <http://www.tristatejobs.com/cgi-bin/page.p1?page=res_quick_search&userID=darzi&password=darzi&id=10...>.

"Tri-State Jobs—Search the Resume Database", web page [online], Tri-State Jobs, 1996-2002 [2 pages retrieved on Mar. 4, 2003]. Retrieved from the Internet: <http://www.tristatejobs.com/cgi-bin/page.p1?page=resume_power_search&userID=darzi&password=darzi&i...>.

"Post Your Resume to Tri-State Database", web page [online], Tri-State Jobs, 1996-2002 [4 pages retrieved on Mar. 10, 2003]. Retrieved from the Internet: <http://www.tristatejobs.com/add_resume.html>.

"Find Resumes at CareerBuilder—Search 6 Million Current Resumes of Active, Quality Job Seekers", web page [online], CareerBuilder.com [2 pages retrieved on Mar. 4, 2003]. Retrieved from the Internet: <http://www.careerbuilder.com/JobPoster/Resumes/resfind.asp>.

"CareerBuilder (add Resume)", web page [online], CareerBuilder.com, [3 pages retrieved on Mar. 4, 2003]. Retrieved from the Internet: <http://www.careerbuilder.com/jobseeker/resumes/editresume.asp?verb=add>.

"iGreentree Web Search", product features [online], Greentree Systems, Inc. [1 page retrieved]. Retrieved from the Internet.

"Greentree Products and Services", product features [online], Greentree Systems, Inc. [1 page retrieved on Mar. 4, 2003]. Retrieved from the Internet: <http://www.greentreesystems.com/EProducts/EProductFrameSet.htm>.

"Resume Processor with iGreentree", product features [online], Greentree Systems, Inc. [1 page retrieved on Mar. 5, 2003]. Retrieved from the Internet: <http://www.greentreesystems.com/Products/resproc.htm>.

"ScanSation", product features [online], GreentreeSystems, Inc. [1 page retrieved]. Retrieved from the Internet.

"Applicant Self-Entry Sample Screens", product features [online], Greentree Systems, Inc. [4 pages retrieved on Mar. 5, 2003]. Retrieved from the Internet: <http://www.greentreesystems.com/Products/ASESampleScreens.htm>.

"Applicant Self-Entry", product features [online], Greentree Systems, Inc. [1 page retrieved]. Retrieved from the Internet.

"Greentree Employment System for Windows Overview", product features [online], Greentree Systems, Inc. [4 pages retrieved on Mar. 5, 2003]. Retrieved from the Internet: <http://www.greentreesystems.com/Products/Overview.htm>.

"HRsmart | Online Recruiting & Applicant Tracking", product features [online], HRsmart, 1996-2003 [2 pages retrieved on Mar. 5, 2003]. Retrieved from the Internet: <http://www.hrsmart.com/ats.html>.

"Recruiting Software | ReruitMAX Web Based Enterprise Recruiting Software, Staffing soft . . . ", product features [online], Recruitmax [2 pages retrieved on Mar. 5, 2003]. Retrieved from the Internet: <http://www.recruitmax.com/products/pro/keys.cfm>.

"Recruiting Software | RecruitMAX Web Based Enterprise Recruiting Software, Staffing soft..", product features [online], Recruitmax [2 pages retrieved on Mar. 5, 2003]. Retrieved from the Internet: <http://www.recruitmax.com/services/resumeprocessing.cfm>.

"eRecruiting and Staffing Solutions: Applicant Tracking and Recruiting Software—erecruiter", product features [online], Xperius, 2003 [2 pages retrieved on Mar. 5, 2003]. Retrieved from the Internet: <http://www.xperius.com/solutions/eRecruiter.cfm>.

"eRecruiting and Staffing Solutions: Applicant Tracking and Recruiting Software—workflow", product features [online], Name/Date [2 pages retrieved on Mar. 5, 2003]. Retrieved from the Internet: <http://www.xperius.com/solutions/workflow.cfm>.

"eRecruiting and Staffing Solutions: Applicant Tracking and Recruiting Software—ezaccess", product features [online], Xperius, 2003 [1 page retrieved on Mar. 5, 2003]. Retrieved from the Internet: <http://www.xperius.com/solutions/ezaccess50.cfm>.

"AIRS Products—AIRS SearchStation 7.0", product features [online], AIRS, 2003 [2 pages retrieved on Mar. 5, 2003]. Retrieved from the Internet: <http://www.airsdirectory.com/products/technologies/searchstation/>.

"Tools—AIRS—SearchStation—Resumes", web page [online], AIRS, 2003 [1 page retrieved on Mar. 5, 2003]. Retrieved from the Internet: <http://www.airsdirectory.com/tools/searchstation/>.

"SonicRecruit: for Recruiters", product features [online], Cytiva, Inc., 2001 [2 pages retrieved on Mar. 5, 2003]. Retrieved from the Internet: <http://www.sonicrecuit.com/hrprofessionals/index.html>.

"SonicRecruit: For HR Key Features", product features [online], Cytiva, Inc., 2001 [2 pages retrieved on Mar. 5, 2003]. Retrieved from the Internet: <http://www.sonicrecruit.com/hrprofessionals/features.html>.

"SonicRecruit: For Recruiters", product features [online], Cytiva, Inc., 2001 [1 page retrieved on Mar. 5, 2003]. Retrieved from the Internet: <http://www.sonicrecruit.com/recruiters/index.html>.

"Bond International Software (AdaptRecruitment Product Features)", product features [online], Bond International Software, 2002 [3 pages retrieved on Mar. 6, 2003]. Retrieved from the Internet: <http://www.bondadapt.com/Products.asp?subpage=Recruitment_Prod>.

"iCIMS—iRecruiter: Resume Acquisition", product features [online], iCIMS, 1999-2003 [1 page retrieved on Mar. 6, 2003]. Retrieved from the Internet: <http://www.icims.com/products/irecruiter/acquistion.asp>.

"www.iCIMS.com—Product Strategy", product features [online], iCIMS.com [3 pages retrieved on Mar. 6, 2003]. Retrieved from the Internet.

"Workstream's Recruiting System—Benefits and Features", product features [online], Workstream, Inc., 2001-2002 [2 pages retrieved on Mar. 6, 2003]. Retrieved from the Internet: <http://www.workstreaminc.com/solutions/recruiting_systems/corporate_solutions/benefits_features.html>.

"The Right Tool for the Job—Workstream's Recruiting System", product features [online], Workstream, Inc., 2001-2002 [1 page retrieved on Mar. 6, 2003]. Retrieved from the Internet: <http://www.workstreaminc.com/solutions/recruiting_systems/corporate_solutions/communication.html>.

"Monster Momentum Tour—Applicant Pool Screen", product features [online], Monster.com, 2000 [1 page retrieved on Mar. 6, 2003]. Retrieved from the Internet: <http://www.simpatix.com/tour_applicantpool.htm>.

"Monster Momentum Tour—Actions Screen (continued)", product features [online], Monster.com, 2000 [1 page retrieved on Mar. 6, 2003]. Retrieved from the Internet: <http://www.simpatix.com/tour_actionspage2.htm>.

"Monster Momentum Tour—Evaluations Screen", product features [online], Monster.com, 2000 [1 page retrieved on Mar. 6, 2003]. Retrieved from the Internet: <http://www.simpatix.com/tour_evaluations.htm>.

"Untitled Document", product features [online], Monster.com [1 page retrieved on Mar. 6, 2003]. Retrieved from the Internet: <http://www.simpatix.com/tour_abcinfo.htm>.

"Untitled Document", product features [online], Monster.com [1 page retrieved on Mar. 6, 2003]. Retrieved from the Internet: <http://www.simpatix.com/tour_abcquestion.htm>.

"The Workforce Management Company—eLabor", product features [online], eLabor, 2002 [3 pages retrieved on Mar. 6, 2003]. Retrieved from the Internet: <http://www.skillset.com>.

"Resume Mirror: Extraction, Resume Extraction & Resume Processing", product features [online], Resume Mirror, Inc., 2001 [2 pages retrieved on Mar. 6, 2003]. Retrieved from the Internet: <http://www.resumemirror.com/Products/Defaultasp?Sub=1>.

"Resume Mirror: Extraction, Resume Extraction & Resume Processing", product features [online], Resume Mirror, Inc., 2001 [1 page retrieved on Mar. 6, 2003]. Retrieved from the Internet: <http://www.resumemirror.com/Technology/Default.asp?Sub=3>.

"Resume Mirror: Extraction, Resume Extraction & Resume Processing", product features [online], Resume Mirror, Inc., 2001 [2 pages retrieved on Mar. 6, 2003]. Retrieved from the Internet: <http://www.resumemirror.com/Technology/Default.asp?Sub=4>.

"Resume Mirror: Extraction, Resume Extraction & Resume Processing", product features [online], Resume Mirror, Inc., 2001 [2 pages retrieved on Mar. 6, 2003]. Retrieved from the Internet: <http://www.resumemirror.com/Technology/Default.asp?Sub=5>.

"Resume Mirror: Extraction, Resume Extraction & Resume Processing", product features [online], Resume Mirror, Inc., 2001 [1 page retrieved on Mar. 6, 2003]. Retrieved from the Internet: <http://www.resumemirror.com/Technology/Default.asp?Sub=6>.

"Resume Mirror: Extraction, Resume Extraction & Resume Processing", product features [online], Resume Mirror, Inc., 2001 [2 pages retrieved on Mar. 6, 2003]. Retrieved from the Internet: <http://www.resumemirror.com/Vendors/Default.asp?Sub=4>.

"Resume Mirror: Extraction, Resume Extraction & Resume Processing", product features [online]. Resume Mirror, Inc., 2001 [2 pages retrieved on Mar. 6, 2003]. Retrieved from the Internet: <http://www.resumemirror.com/Vendors/Default.asp?Sub=5>.

"Resume Mirror: Extraction, Resume Extraction & Resume Processing", product features [online], Resume Mirror, Inc., 2001 [2 pages retrieved on Mar. 6, 2003]. Retrieved from the Internet: <http://www.resumemirror.com/Corporations/Default.asp?Sub=1>.

"HiringSoftware.Com: Recruiter: Features—Recruiting Software and Applicant Tracking System", product features [online], Pharaoh Software, 2002 [2 pages retrieved on Mar. 6, 2003]. Retrieved from the Internet: <http://www.hr-soft.com/r_features.shtmlx.

"HiringSoftware.Com: Recruiter: Modules: Candidates—Recruiting Software and Applicant Tracking System", product features [online], Pharaoh Software 2002 [1 page retrieved on Mar. 6, 2003]. Retrieved from the Internet: <http://www.hr-soft.com/r_m_appl.shtml>.

"ResPro Brochure: Resume Management System—Software for Staffing and Employment", product features [online], Chaparral Systems, 2003 [11 pages retrieved on Mar. 6, 2003]. Retrieved from the Internet: <http://www.chaparralsystems.com/brochure.htm>.

"ResPro: Screen Shot of Acquiring Resumes", product features [online], [1 page retrieved]. Retrieved from the Internet.

"ResPro: Screen Shot of Progress Monitor", product features [online], [1 page retrieved on Mar. 6, 2003]. Retrieved from the Internet: <http://www.chaparralsystems.com/ssfl_1.htm>.

"ResPro: Screen Shot of Route Generator", product features [online], [2 pages retrieved on Mar. 6, 2003]. Retrieved from the Internet: <http://www.chaparralsystems.com/ssfr.htm>.

"ResPro: Screen Shot of Move Generator", product features [online], [1 page retrieved on Mar. 6, 2003]. Retrieved from the Internet: <http://www.chaparralsystems.com/ssmo.htm>.

"ResPro: Screen Shot of Search", product features [online], [1 page retrieved on Mar. 6, 2003]. Retrieved from the Internet: <http://www.chaparralsystems.com/ssrs.htm>.

ResPro: Screen Shot of Descriptions, product features [online], [2 pages retrieved on Mar. 6, 2003]. Retrieved from the Internet: <http://www.chaparralsystems.com/ssudk.htm>.

"RESUMate—Products", product features [online], RESUMate, Inc. [2 pages retrieved on Mar. 7, 2003]. Retrieved from the Internet: <http://www.resumate.com/products.htm>.

"RESUMate—Database Records", product features [online], RESUMate, Inc. [1 page retrieved on Mar. 7, 2003]. Retrieved from the Internet: <file://C:\DOCUME~1\samantha\LOCALS~1\Temp\FKV4180M.htm>.

"RESUMate—Moving the Resume into RESUMate is Easy", product features [online], RESUMate, Inc. [1 page retrieved on Mar. 7, 2003]. Retrieved from the Internet: <http://www.resumate.com/tour/moving_the_resume_into_resumate.htm>.

"RESUMate—Here's Complete Database Record", product features [online], RESUMate, Inc. [1 page retrieved on Mar. 7, 2003]. Retrieved from the Internet: <http://www.resumate.com/tour/the_complete_database_record.htm>.

"RESUMate—Searching is Easy", product features [online], RESUMate, Inc. [1 page retrieved on Mar. 7, 2003]. Retrieved from the Internet: <http://www.resumate.com/tour/searching_is_easy.htm>.

"RecruiTEK.com—Free Job Posting", product features [online], RecruiTEK.com [2 pages retrieved on Mar. 7, 2003]. Retrieved from the Internet: <http://www.recruitek.com/Home.aspx?mid=213&tabindex=0&tabid=1&subtabindex=1&subtabid=15>.

RecruiTEK.com—Web-based Applicant Tracking and Resume Processing System, product features [online], RecruiTEK.com [1 page retrieved]. Retrieved from the Internet.

"HireWorks", product features [online], Hireworks.com [3 pages retrieved on Mar. 7, 2003]. Retrieved from the Internet: <http:/www.hireworks.com/ProductsServices.asp>.

"About the Cyberspace Mining Company", fact sheet [online], CyberSpace Mining Company, 2001-2002 [2 pages retrieved on Mar. 7, 2003]. Retrieved from the Internet: <http://www.cyberspacemining.com/factsheet.php>.

"Products—Speed To Hire", product features [online], CyberSpace Mining Company, 2001-2002 [1 page retrieved on Mar. 7, 2003]. Retrieved from the Internet: <http://www.cyberspacemining.com/products.php>.

"Find The Best Resumes First—Windgate", product features [online], Windgate Corporation, 2001 [2 pages retrieved on Mar. 7, 2003]. Retrieved from the Internet: <http://www.windgatesoftware.com/article02.htm>.

"How Look™ Works for You—Windgate", product features [online], Windgate Corporation, 2001 [1 page retrieved]. Retrieved from the Internet.

"Windgate Look™ Resume Management—Windgate", product features [online], Windgate Corporation 2001 [1 page retrieved]. Retrieved from the Internet.

"Windgate Look—[Client NW Trek]", demo program [online], Windgate Corporation [1 page retrieved]. Retrieved from the Internet.

"Windgate Look™ Keywords—Windgate", product features [online], Windgate Corporation 2001 [1 page retrieved]. Retrieved from the Internet.

"Windgate Look™ Import Resumes—Windgate", product features [online], Windgate Corporation 2001 [1 page retrieved]. Retrieved from the Internet.

"Windgate Look™ Search—Windgate", product features [online], Windgate Corporation 2001 [1 page retrieved]. Retrieved from the Internet.

"Nerds Software—Applicant Tracking Software/Recruiting Software", product features [online], NerdsSoftware.com [1 page retrieved on Mar. 7, 2003]. Retrieved from the Internet: <http://www.nerdssoftware.com/inspector_30.html>.

"Nerds Software—Applicant Tracking Software/Recruiting Software", product features [online], NerdsSoftware.com [1 page retrieved]. Retrieved from the Internet.

"Nerds Software—Searching for Applicants", product features [online], NerdsSoftware.com [1 page retrieved on Mar. 7, 2003]. Retrieved from the Internet: <http://www.nerdssoftware.com/desk_help/ri305d4g.htm>.

"Nerds Software—Searching for Applicants—Skills Tab", product features [online], NerdsSoftware.com [1 page retrieved on Mar. 7, 2003]. Retrieved from the Internet: <http://www.nerdssoftware.com/desk_help/ri305d68.htm>.

"Nerds Software—Skill Set Options", product features [online], NerdsSoftware.com [1 page retrieved on Mar. 7, 2003]. Retrieved from the Internet: <http://www.nerdssoftware.com/desk_help/ri300k4w.htm>.

"Nerds Software—Job Classification Options", product features [online], NerdsSoftware.com [1 page retrieved on Mar. 7, 2003]. Retrieved from the Internet: <http://www.nerdssoftware.com/desk_help/ri300k6o.htm>.

"Nerds Software—Adding Applicant Records", product features [online], NerdsSoftware.com [2 pages retrieved on Mar. 7, 2003]. Retrieved from the Internet: <http://www.nerdssoftware.com/desk_help/ri305a0g.htm>.

"Nerds Software—List Screens", product features [online], NerdsSoftware.com [1 page retrieved on Mar. 7, 2003]. Retrieved from the Internet: <http://www.nerdssoftware.com/desk_help/ri305g34.htm>.

"Employment Software: Web Based Software for Employment Agencies", product features [online], EmploymentSoftware.com [1 page retrieved on Mar. 7, 2003]. Retrieved from the Internet: <http://www.employmentsoftware.com>.

"Agent Function Menu—Search These Collected Resumes", product features [online], EmploymentSoftware.com [1 pages retrieved on Mar. 7, 2003]. Retrieved from the Internet: <http.//www.employmentsoftware.com/agent/agentmenu.asp>.

"Agent Function Menu—Candidates Menu", product features [online], EmploymentSoftware.com [1 pages retrieved on Mar. 7, 2003]. Retrieved from the Internet: <http.//www.employmentsoftware.com/agent/agentmenu.asp>.

"Employment Software Demo", product features [online], EmploymentSoftware.com [1 page retrieved]. Retrieved from the Internet.

"Nufront Products Page", product features [online], Nufront.com [2 pages retrieved on Mar. 7, 2003]. Retrieved from the Internet: <http://www.nufront.com/products.htm.

"Nufront—Dedicated to your Success", product features [online], Nufront Inc., 2000 [1 page retrieved on Mar. 7, 2003]. Retrieved from the Internet: <http://www.nufront.com/techinfo.htm>.

"Overview—2Interview Careers Portal!", product features [online], 2Interview.com [6 pages retrieved on Mar. 7, 2003]. Retrieved from the Internet: <http://www.2interview.com/systemoverview.html>.

"Welcome to 2Interview!", product features [online], 2Interview.com [2 pages retrieved on Mar. 7, 2003]. Retrieved from the Internet: <http://www.2interview.com/oview.html>.

"Screens—Why Use Careers Portal?", product features [online], 2Interview.com [1 page retrieved on Mar. 7, 2003]. Retrieved from the Internet: <http://www.2interview.com/screen.html>.

"2Interview", product features [online], 2Interview.com [2 pages retrieved on Mar. 7, 2003]. Retrieved from the Internet: <http://www.2interview.com/install.html>.

"Parodia :: ASP Internet Recruitment System :: Job Board Software :: Third Party (Agency) Section", product features [online], Cactusoft Ltd., 1999-2003 [2 pages retrieved on Mar. 7, 2003]. Retrieved from the Internet: <http://www.parodia.net/jb/thirdparty.asp>.

"Parodia :: ASP Internet Recruitment System :: Job Board Software :: Back End", product features [online], Cactusoft Ltd., 1999-2003 [3 pages retrieved on Mar. 7, 2003]. Retrieved from the Internet: <http://www.parodia.net/jb/backend.asp>.

"Parodia :: ASP Internet Recruitment System :: Job Board Software :: Overview", product features [online], Cactusoft Ltd. [1 page retrieved on Mar. 7, 2003]. Retrieved from the Internet.

"Parodia :: Recruitment Applications :: Custom Databases :: Ecommerce", product features [online], Cactusoft Ltd., 1999-2003 [1 page retrieved]. Retrieved from the Internet.

"WorkforceERP Product Suite by Recruiting Solutions", product features [online], Recruiting Solutions International, Inc., 2001-2003 [2 pages retrieved on Mar. 7, 2003]. Retrieved from the Internet: <http://www.recruitingsolutions.net/products/recruitingcenter.htm>.

"Recruitsoft | Solutions & Services | Recruitsoft Solutions | The Recruiter WebTop Suite", product features [online], Recruitsoft Inc., 2002 [1 page retrieved on Mar. 7, 2003]. Retrieved from the Internet: <http://www.recruitsoft.com/en/solutions/solution/webtop.html>.

"Recruitsoft | Solutions & Services | Recruitsoft Solutions | ACE Enterprise Staffing", product features [online], Recruitsoft Inc., 2002 [2 pages retrieved on Mar. 7, 2003]. Retrieved from the Internet: <http://www.recruitsoft.com/en/solutions/solution/ace.html>.

"Recruitsoft | Solutions & Services | Recruitsoft Solutions | Staffing Supply Chain", product features [online], Recruitsoft Inc., 2002 [1 page retrieved on Mar. 7, 2003]. Retrieved from the Internet: <http://www.recruitsoft.com/en/solutions/solution/supply.html>.

"Recruitsoft | Solutions & Services | Recruitsoft Solutions | Integrating with ERPs", product features [online], Recruitsoft Inc., 2002 [1 page retrieved on Mar. 7, 2003]. Retrieved from the Internet: <http://www.recruitsoft.com/en/solutions/solution/erps.html>.

"General Features—TRMRecruiting Solutions", product features [online], TRMRecruiting.com, 2003 [3 pages retrieved on Mar. 7, 2003]. Retrieved from the Internet: <http://www.trmrecruiting.com/scripts/general_features.asp>.

"TRM Recruiting Solutions—OnLine Applications", product features [online], TRMRecruiting.com [2 pages retrieved on Mar. 7, 2003]. Retrieved from the Internet: <http://www.trmrecruiting.com/scripts/candidateapplication.asp?NewPageNum=1>.

"TRM Recruiting Solutions—Multiple Search Capabilities—Detailed Search", product features [online], TRMRecruiting.com [1 page retrieved on Mar. 7, 2003]. Retrieved from the Internet: <http://www.trmrecruiting.com/scripts/detailedsearch.asp?NewPageNum=3>.

"TRM Recruiting Solutions—Multiple Search Capabilities—Find a Candidate", product features [online], TRMRecruiting.com [1 page retrieved on Mar. 7, 2003]. Retrieved from the Internet: <http://www.trmrecruiting.com/scripts/findacandidate.asp?NewPageNum=4>.

"Products—Recruiter Edition—TRMRecruiting Solutions", product features [online], TRMRecruiting.com, 2003 [2 pages retrieved on Mar. 7, 2003]. Retrieved from the Internet: <http://www.trmrecruiting.com/scripts/recruiter_edition.asp>.

"PowerPlace—Products—PowerPlace Software", product features [online], PowerPlace Software, Inc., 2003 [4 pages retrieved on Mar. 7, 2003]. Retrieved from the Internet: <http://64.225.39.2/powerplace/Products.htm>.

"PowerPlace—Technology—PowerPlace Software", product features [online], PowerPlace Software, Inc., 2003 [3 pages retrieved on Mar. 7, 2003]. Retrieved from the Internet: <http://64.225.39.2/powerplace/technology.htm>.

"Kenexa Recruiter: Online Recruiting System for Human Resources Professional", product features [online], Kenexa 2002 [2 pages retrieved on Mar. 7, 2003]. Retrieved from the Internet: <http://www.kenexa.com/hire/hireRec.html?Hiring%20Solutions>.

"Recruiting Software for Executive Search by Cluen—Cluen Encore", product features [online], The Cluen Corporation, 1998-2003 [1 page retrieved on Mar. 7, 2003]. Retrieved from the Internet: <http://www.cluen.com/encore/encore.asp>.

"Recruiting Software for Executive Search by Cluen—Cluen Searchlight", product features [online], The Cluen Corporation 1998-2003 [2 pages retrieved on Mar. 7, 2003]. Retrieved from the Internet: <http://www.cluen.com/encore/products/searchlight/searchlight.asp>.

"Encore's Attributes", product features [online], [1 page retrieved]. Retrieved from the Internet.

"Visual Recruitment", product features [online], Task, 1996-2001 [1 page retrieved]. Retrieved from the Internet.

"Visual Recruitment—Presentation", product features [online], Task, 1996-2001 [3 pages retrieved on Mar. 7, 2003]. Retrieved from the Internet: <http://www.visualrecruitment.com/vrlpresentationuk.htm>.

"Visual Recruitment—Presentation—Internet Service", product features [online], Task, 1996-2001 [1 page retrieved]. Retrieved from the Internet.

"Visual Recruitment—Presentation—Internet Service—Internet Service UK Example", product features [online], [1 page retrieved]. Retrieved from the Internet.

"Gopher Recruiting Software—Products", product features [online], BlackDog [2 pages retrieved on Mar. 7, 2003]. Retrieved from the Internet: <http://www.recruiting-software.net/products.html>.

"Gopher Recruiting Software—Products Features", product features [online], BlackDog [1 page retrieved on Mar. 7, 2003]. Retrieved from the Internet: <http://www.recruiting-software.net/features.html>.

"An End-To-End Erecruitment Solution", product features [online], Netsite [2 pages retrieved on Mar. 7, 2003]. Retrieved from the Internet: <http://www.recruitactive.com/components.htm>.

"New York Times" web page [online], NYTimes.com [2 pages retrieved on Mar. 10, 2003]. Retrieved from the Internet: <http://jobs.nytimes.com/texis/rp?new=1&lookid=nyt>.

"JobCircle: New Resume Submittal", product features [online], JobCircle.com, Inc., 1998-2002 [1 page retrieved on Mar. 10, 2003]. Retrieved from the Internet: <http://www.jobcircle.com/employees/resume_home>.

"JobCircle: Resume Submittal", web page [online], JobCircle.com, Inc., 1998-2002 [2 pages retrieved on Mar. 10, 2003]. Retrieved from the Internet: <http://www.jobcircle.com/employees/submit_resume?new=1>.

"Hire.com—Solutions: Source—Sourcing Center", product features [online], Hire.com, 1996-2003 [1 page retrieved on Mar. 11, 2003]. Retrieved from the Internet: <http://www.hire.com/solutions/cand_mining.html>.

"Hire.com—Solutions Recruit", product features [online], Hire.com, 1996-2003 [1 page retrieved on Mar. 11, 2003]. Retrieved from the Internet: <http://www.hire.com/solutions/recruit>.

"Hire.com—Solutions: Recruit—Recruiting Center: Corporate", product features [online], Hire.com, 1996-2003 [1 page retrieved]. Retrieved from the Internet.

"Hire.com—Solutions: Hire—Hiring Center", product features [online], Hire.com, 1996-2003 [1 page retrieved on Mar. 11, 2003]. Retrieved from the Internet: <http://www.hire.com/solutions/hire/hiring_center.html>.

"BrassRing: HR Software for Recruiting & Workforce Management", product features [online], BrassRing.com [2 pages retrieved on Mar. 11, 2003]. Retrieved from the Internet: <http://www.brassring.com/EN/ASP/employer/Section.asp?SectionId=27&ChannelId=6&Si...>.

"Untitled", web page [online], searchease.com [2 pages retrieved]. Retrieved from the Internet: <http://www.searchease.com/CGI-bin/wc.dll?EnterSearch>.

"Administrative Features—SearchEase", product features [online], SearchEase.com Corp., 2000 [2 pages retrieved on Mar. 11, 2003]. Retrieved from the Internet: <http://www.jobboardsoftware.com/Products/features_admin.htm>.

"Employer Features—SearchEase", product features [online], SearchEase.com Corp., 2000 [1 page retrieved on Mar. 11, 2003]. Retrieved from the Internet: <http://www.jobboardsoftware.com/Products/features_employer.htm>.

"Job Seeker—SearchEase", product features [online], SearchEase.com Corp., 2000 [1 page retrieved on Mar. 11, 2003]. Retrieved from the Internet: <http://www.jobboardsoftware.com/Products/features_jobseeker.htm>.

"Candidate Seeker Home Page", product features [online], CandidateSeeker.com [2 pages retrieved on Mar. 11, 2003]. Retrieved from the Internet: <http://www.candidateseeker.com/>.

"M.A.R.S.™ Premium—A Human Capital Corporation", product features [online], Humanatek, 1999-2003 [5 pages retrieved on Mar. 11, 2003]. Retrieved from the Internet: <http://www.humanatek.com/mars.html>.

"Services Offered by Recruiters-Aid to Make Your Life Manageable", product features [online], Recruiters-Aid, 1999-2001 [1 page retrieved on Mar. 11, 2003]. Retrieved from the Internet: <www.recruiters-aid.com/services.html>.

"Resource System Built by Recruiters for Recruiters", product features [online], Recruiters-Aid, 1999-2001 [2 pages retrieved on Mar. 11, 2003]. Retrieved from the Internet: <http://www.recruiters-aid.com/kit.html.

"VirtualEdge", product features [online], VirtualEdge Corp., 2002 [1 page retrieved on Mar. 11, 2003]. Retrieved from the Internet: <http://www.virtualedge.com/Index.cfm?FuseAction=DSPKeyTechnology>.

"CoreWare, Member of CoreResource and Manufacturer of CoreRecruit", product features [online], CoreWare, Inc., 2002 [2 pages retrieved on Mar. 11, 2003]. Rerieved from the Internet: <http://www.corerecruit.com/user.shtml>.

"CoreRecruit", demo program [online], CoreWare, Inc. [1 page retrieved]. Retrieved from the Internet: <http://www.corerecruit.com/images/amethystbig.jpg>.

"CoreWare, Member of CoreResource and Manufacturer of CoreRecruit", product features [online], CoreWare, Inc., 2002 [2 pages retrieved on Mar. 11, 2003]. Rerieved from the Internet: <http://www.corerecruit.com/search.shtml>.

"CoreRecruit", demo program [online], CoreWare, Inc. [1 page retrieved on Mar. 11, 2003]. Retrieved from the Internet: <http://www.corerecruit.com/images/serachscreenbig.jpg>.

"CoreWare, Member of CoreResource and Manufacturer of CoreRecruit", product features [online], CoreWare, Inc., 2002 [2 pages retrieved on Mar. 11, 2003]. Rerieved from the Internet: <http://www.corerecruit.com/candidate.shtml>.

"EZaccess 5.0", product features [online], Personic, Inc., 2000 [2 pages retrieved]. Retrieved from the Internet.

"Save Time and . . . —Here's How Eliyon Works:", product features [online], Eliyon.com [2 pages retrieved]. Retrieved from the Internet.

"PeopleCapital Staffing", product features [online], PeopleCapital, Inc., 2001-2002 [2 pages retrieved]. Retrieved from the Internet.

"TechJobsOnline.com—Employers", product features [online], TechJobsOnline, LLC, 2001 [2 pages retrieved on Mar. 14, 2003]. Retrieved from the Internet: <http://www.techjobsonline.com/Employer/Index.asp>.

"TechJobsOnline.com—Employers", product features [online], TechJobsOnline, LLC, 2001 [2 pages retrieved on Mar. 14, 2003]. Retrieved from the Internet: <http://www.techjobsonline.com/jobseeker>.

"Fitability Systems—Features and Benefits", product features [online], Friability Systems, LLC, 2000-2001 [1 pages retrieved on Mar. 21, 2003]. Retrieved from the Internet: <http://www.fitability.com/tour/features.asp>.

"Fitability Systems—Features and Benefits", product features [online], Fitability Systems, LLC, 2000-2001 [1 pages retrieved on Mar. 21, 2003]. Retrieved from the Internet: <http://www.fitability.com/tour/default.asp>.

"Big Tango Theory: Solutions", product features [online], bigtangotheory.com [2 pages retrieved on Mar. 21, 2003]. Retrieved from the Internet: <http://www.bigtangotheory.com/solutions.html>.

"Boston Works Media Kit: Products & Packages: Online Recruitment Options: Resume Search", product features [online], BostonWorks [2 pages retrieved on Mar. 21, 2003]. Retrieved from the Internet <http://bostonworks.boston.com/mediakit/resumesearch.shtml>.

"CareerHarmony—Employers—Solutions", product features [online], CareerHarmony, Inc., 2000 [1 page retrieved on Mar. 21, 2003]. Retrieved from the Internet: <http://www.careerharmony.com/employers/solutions.html>.

"eEmpACT: Products & Services > FrontOffice Features", product features [online], eEmpACT, 2002 [1 page retrieved on Mar. 21, 2003]. Retrieved from the Internet: <http://www.eempact.com/resumes.htm>.

"eEmpACT: Products & Services > Features", product features [online], eEmpACT, 2002 [1 page retrieved on Mar. 21, 2003]. Retrieved from the Internet: <http://www.eempact.com/applications.htm>.

"eEmpACT: Products & Services > FrontOffice Features", article [online], eEmpACT, 2002 [1 page retrieved on Mar. 21, 2003]. Retrieved from the Internet: <http://www.eempact.com/cand_emp.htm>.

"HODESiQ | Solutons | Hodes iQ Post", product features [online], Bernard Hodes Group, 2003 [2 pages retrieved on Mar. 21, 2003]. Retrieved from the Internet: <http://www.hodesiq.com/solutions/sol_hodesiq.htm>.

"Recruitment Enhancement Services", product features [online], Omnicom Group Inc. [2 pages retrieved on Mar. 21, 2003]. Retrieved from the Internet: <http://www.resjobs.com/forbes/roam.html>.

"Recruitment Enhancement Services", product features [online], Omnicom Group Inc. [1 page retrieved on Mar. 21, 2003]. Retrieved from the Internet: <http://www.resjobs.com/forbes/mining.html>.

"6FigureJobs—The Leading Site for Executive Job Seekers, Employers and Executive Recruiters", web page [online], Workstream, Inc., 2002 [4 pages retrieved on Mar. 21, 2003]. Retrieved from the Internet: <http://www.6figurejobs.com/ExecEditResume.cfm?CFID=1179069&CFTOKEN=32751082&noCache=36...>.

"RCI Employment Solutions", product features [online], Recourse Communications, Inc., 2000 [2 pages retrieved on Mar. 21, 2003]. Retrieved from the Internet:<http://www.rcies.com/employer/search/index.asp>.

"Webhire | Products", product features [online], Webhire, Inc., 2000-2003 [2 pages retrieved on Mar. 21, 2003]. Retrieved from the Internet: <http://www.webhire.com/products/corporate.asp>.

"WebRecruiter: Recruiting and Staffing Software for a Web-Enabled World", product features [online], WebRecruiter, LLC, 2002 [2 pages retrieved on Mar. 21, 2003]. Retrieved from the Internet: <http://www.webrecruiter.com/productfeatures.htm>.

"WebRecruiter™", product features [online], WebRecruiter.com [2 pages retrieved]. Retrieved from the Internet: <http://www.webrecruiter.com/pdf_brochure.pdf>.

"Search ZillionResumes", web page [online], Easytrieve.com, Inc., 2003 [1 page retrieved on Mar. 26, 2003]. Retrieved from the Internet: <http://www.zillionresumes.com/dynamic/perl/zillion.p1?action=noreg_demo&itemid=>.

"Search Help", product features [online], Easytrieve.com, Inc., 2003 [3 pages retrieved on Mar. 26, 2003]. Retrieved from the Internet: <http://www.zillionresumes.com/search_help.html>.

"About ZillionResumes", product features [online], Easytrieve.com, Inc., 2003 [2 pages retrieved on Mar. 26, 2003]. Retrieved from the Internet: <http://www.zillionresumes.com/why_zillion.html>.

"ZillionResumes Free Resume Posting", web page [online], Easytrieve.com, Inc., 2003 [1 page retrieved on Mar. 26, 2003]. Retrieved from the Internet: <http://www.zillionresumes.com/candidate_info.html>.

"SmartSearch Online—Applicant Tracking Systems Staffing Management", product features [online], Advanced Personnel Systems, Inc., 2001 [2 pages retrieved on Mar. 25, 2003]. Retrieved from the Internet: <http://www.smartsearchonline.com/home/samples.asp>.

"SmartSearch Online—Applicant Tracking Systems Staffing Management", product features [online], Advanced Personnel Systems, Inc. [1 page retrieved on Mar. 25, 2003]. Retrieved from the Internet: <http://www.smartsearchonline.com/home/default.asp>.

"Main Sequence Technologies", product features [online], pcRecruiter.com [2 pages retrieved on Mar. 25, 2003]. Retrieved from the Internet: <http://www.pcrecruiter.com/products_jobBoard.htm>.

"MaxHire Applicant Tracking: The #1 Recruiting Software Solution", product features [online], MaxHire.net [2 pages retrieved on Mar. 26, 2003]. Retrieved from the Internet: <http://www.maxhire.net/information.asp>.

"AutoHire—Features", product features [online], CareerShop, Inc., 2000-2003 [2 pages retrieved on Mar. 27, 2003]. Retrieved from the Internet: <http://www.careershop.com/AutoHire_1.asp>.

"Seeker Search—Job Toaster", web page [online], JobToaster.com [1 page retrieved on Mar. 25, 2003]. Retrieved from the Internet: <http:www.jobtoaster.com/SearchSeekersResponse.asp?start=0&serach=java&submit=Search&WordSearc...>.

"#1 Internet Resume Sourcing Software", product features [online], Resource Edge, Inc., 2000-2001 and XyberSleuth, Inc., 1999-2001 [2 pages retrieved on Mar. 25, 2003]. Retrieved from the Internet: <http://www.talenthook.com>.

"Free Training and Support for a Powerful Resume Search Engine", product features [online], Resource Edge, Inc., 2000-2001 and XyberSleuth, Inc., 1999-2001 [1 page retrieved on Mar. 25, 2003]. Retrieved from the Internet: <http://www.talenthook.com/faq.html>.

"Agaveblue :: Employer Registration", product features [online], Agaveblue, Inc. 2001-2003 [1 page retrieved on Mar. 27, 2003]. Retrieved from the Internet: <http://www.agaveblue.net/employers/reg1res.asp>.

"About Us", product features [online], DataFrenzy.com [1 page retrieved on Mar. 26, 2003]. Retrieved from the Internet: <http://www.datafrenzy.com/aboutus.asp>.

"BrainHunter.com—Employers", product features [online], BrainHunter.com [1 page retrieved on Mar. 26, 2003]. Retrieved from the Internet: <http://dendrite.brainhunter.com/p196/p1sq1/bh2_cs.recruiter_home>.

"It's Time You Learn About HireHub.com", product features [online], Easytrieve.com, Inc. [2 pages retrieved]. Retrieved from the Internet: <http://www.hirehub.com/docs/hirehub-brochure.pdf>.

"Talent Match", web page [online], Dice.com [1 page retrieved on Mar. 31, 2003]. Retrieved from the Internet: <http://employer.dice.com/talentmatch/index.jsp?jan=721>.

"Dice—Find the Best Technology Professionals, Fast!", web page [online], Dice, Inc., 1991-2003 [2 pages retrieved on Mar. 31, 2003]. Retrieved from the Internet: <http://employer.dice.com/employer.epl>.

"Appmail—An Overview", product features [online], AppMail.com [8 pages retrieved]. Retrieved from the Internet: <http://www.appmail.com/overview.pdf>.

"WebPas by VCG Inc.", product features [online], VGC, Inc., 2002 [12 pages retrieved]. Retrieved from the Internet: <http://www.vcgsoftware.com/webpas_start/wp_30_brochure.pdf>.

"Introducing StaffingSoft's Resume' Manager", product features [online], StaffingSoft.com. 2001 [2 page retrieved on Mar. 31, 2003]. Retrieved from the Internet: <http://www.staffingsoft.com/ResumeMgr.htm>.

"The Resume Manager", product features [online], StaffingSoft.com [1 page retrieved on Mar. 31, 2003]. Retrieved from the Internet: <http://www.staffingsoft.com/test_drive/resume01.htm>.

"Working with Resumes", product features [online], StaffingSoft.com [1 page retrieved on Mar. 31, 2003]. Retrieved from the Internet: <http://www.staffingsoft.com/test_drive/managing_resumes03.htm>.

"Actively Sourcing Talent", product features [online], StaffingSoft.com [1 page retrived on Mar. 31, 2003]. Retrieved from the Internet: <http://www.staffingsoft.com/test_drive/managing_resumes04.htm>.

"HireDesk: Applicant Tracking, Candidate Management & Recruiting Software Solution", product features [online], HireDesk Inc., 2002 [1 page retrieved on Mar. 31, 2003]. Retrieved from the Internet: <http://www.hiredesk.com/employers/?Side=02>.

"HireDesk: Applicant Tracking, Candidate Management & Recruiting Software Solution", product features [online], HireDesk Inc., 2002 [1 page retrieved on Mar. 31, 2003]. Retrieved from the Internet: <http://www.hiredesk.com/employers/?Side=03>.

"ResumeWare—Web-Based Applicant Tracking", product features [online], ResumeWare.com [1 page retrieved on Mar. 31, 2003]. Retrieved from the Internet: <http://www.resumeware.com/main.html>.

"OpenHire—An Outtask Business Solution", product features [online], Outtask, Inc., 2002 [4 pages retrieved]. Retrieved from the Internet: <http://www.outtask.com/pdfs/openhire_brochure.pdf>.

"Find Best Candidates with Employ!", product features [online], Deploy Solutions, Inc., 2002 [1 page retrieved on Mar. 6, 2003]. Retrieved from the Internet: <http://www.deploy.com/products/findbest.cfm>.

"Deploy's Hirequest", product features [online], Deploy Solutions, Inc., 2002 [1 page retrieved on Mar. 6, 2003]. Retrieved from the Internet: <http://www.deploy.com/products/hirequest.cfm>.

"Deploy's Resume Processing", product features [online], Deploy Solutions, Inc., 2002 [1 page retrieved on Mar. 6, 2003]. Retrieved from the Internet: <http://www.deploy.com/services/resume.cfm>.

"eRecruiter", product features [online], eRecruiter, LLC, 2001 [1 page retrieved on Mar. 4, 2003]. Retrieved from the Internet: <http://www.erecruiter.com/demos.php?num=9>.

"eRecruiter", product features [online], eRecruiter, LLC, 2001 [1 page retrieved on Mar. 4, 2003]. Retrieved from the Internet: <http://www.erecruiter.com/demos.php?num=5>.

"NetworkersPro—Revolutionary New Internet Based Staffing Software with Resume Tracking, Resume Databa . . . ", product features [online], Networkerspro.com, Inc., 2000-2002 [1 page retrieved DATE]. Retrieved from the Internet: <http://www.networkerspro.com/>.

"NetworkersPro—Applicants Screen Shot", demo program [online], Networkerspro.com, Inc., 2000-2002 [1 page retrieved]. Retrieved from the Internet: <http://www.networkerspro.com/ssapplicant.html>.

"NetworkersPro—Applicant Search Screen Shot", demo program [online], Networkerspro.com, Inc., 2000-2002 [1 page retrieved]. Retrieved from the Internet: <http://www.networkerspro.com/sssearch.html>.

"NetworkersPro—Applicant Quick Entry Screen Shot", demo program [online], Networkerspro.com, Inc., 2000-2002 [1 page retrieved]. Retrieved from the Internet: <http://www.networkerspro.com/ssqentry.html>.

"Resume Grabber for Internet Recruiting, Dice.com, Monster.com, Recruiter Resources", product features [online], eGrabber Inc., 1999-2003 [5 pages retrieved on May 8, 2003]. Retrieved from the Internet: <http://www.deals4recruiters.com/resumegrabber/index4.html>.

"JobWarehouse.com: Visit Hiring Companies", web page [online], JobWarehouse.com, Inc., 1997-2003 [1 page retrieved on May 7, 2003]. Retrieved from the Internet: <http://www.jobwareehouse.com/jwc/companies.cfm?cmd=Detail&company_id=1103>.

"Resume Wahoo", product features [online], ResumeWahoo.com, 2000-2003 [1 page retrieved on May 7, 2003]. Retrieved from the Internet: <http://www.resumewahoo.com/>.

"Job.com—Jobseeker Center", web page [online], Job.com, 2002 [2 pages retrieved on May 5, 2003]. Retrieved from the Internet: <http://www.job.com/jobseekers/index.cfm?tid=signup.cfm>.

"Job.com—Untitled", product features [online], Job.com [3 pages retrieved]. Retrieved from the Internet.

"Resume-Net", product features [online], HCM Media, Inc., 1998-2003 [1 page retrieved on May 2, 2003]. Retrieved from the Internet: <http://www.resume-net.com/>.

"Resume-Net :: Demo Search", demo program [online], HCM Media, Inc., 1998-2003 [1 page retrieved]. Retrieved from the Internet.

"Resume-Net :: New Job Seeker Profile", demo program [online], HCM Media, Inc., 1998-2003 [1 page retrieved]. Retrieved from the Internet.

"NETSHARE—Your Center for Executive Jobs", product features [online], Netshare.com, 2003 [1 page retrieved on May 2, 2003]. Retrieved from the Internet: <http://www.netshare.com/recruiters_and_companies/search_database.asp>.

"Executive Recruiters, Executive Search Firms and Companies—Post Executive Jobs Now—NETSHARE.com", product features [online], Netshare.com 2003 [2 pages retrieved on May 2, 2003]. Retrieved from the Internet: <http://www.netshare.com/recruiters_and_companies/index.asp>.

"Wanted Technologies—Solutions", product features [online], Wanted Technologies, Inc., 2003 [1 page retrieved on May 7, 2003]. Retrieved from the Internet: <http://www.wantedtech.com/solutions.html>.

"Wanted Technologies—Solutions, RAM", product features [online], Wanted Technologies, Inc. 2003 [2 pages retrieved on May 7, 2003]. Retrieved from the Internet: <http://www.wantedtech.com/ram.html>.

"ProHire | The Leader in Online Job Searching and Recruiting Solutions has Jobs and Employment for Profes", product features [online], Creative Systems Solutions 2001 [1 page retrieved]. Retrieved from the Internet.

"T&E Solutions, Inc.: Human Resources Suite—Applicant Tracking", product features [online], T&E Solutions, Inc., 2002 [1 page retrieved]. Retrieved from the Internet.

"T&E Solutions, Inc.: Doctor's Office Management Systems (DOMS)", demo program [online], T&E Solutions, Inc., 2002 [2 pages retrieved]. Retrieved from the Internet.

"Applicant Tracking Systems 2003 Industry Analysis & Buyer's Guide", industry analysis [online], Electronic Recruiting Exchange, Inc., 2003 [158 pages retrieved]. Retrieved from the Internet: <http://www.erexchange.com/ats2003/premium>.

"CollegeGrad.com Resumes", web page [online], CollegeGrad.com [3 pages retrieved on May 29, 2003]. Retrieved from the Internet: <http://www.collegegrad.jobcontrolcenter.com/apply/advertise.cfm>.

"Applicant Tracking Software", product features [online], ApplicantSmartware.com [2 pages retrieved on Jun. 4, 2003]. Retrieved from the Internet: <http://www.applicantsmartware.com/>.

"Product Preview Screens—AgencySmartware—Candidate Form", web page [online], ApplicantSmartware.com [1 page retrieved]. Retrived from the Internet: <http://www.applicantsmartware.com/images/image7.htm>.

"Product Preview Screens—ApplicantSmartware—Search Form", web page [online], ApplicantSmartware.com [1 page retrieved]. Retrived from the Internet: <http://www.applicantsmartware.com/images/image15.htm>.

"Products", product features [online], ApplicantSmartware.com [1 page retrieved on Jun. 4, 2003]. Retrieved from the Internet: <http://www.applicantsmartware.com/products.htm>.

"CareerCast, Inc.—Resume Database", product features [online], CareerCast, Inc., 2003 [1 page retrieved on Jun. 4, 2003]. Retrieved from the Internet: <http://www.careercast.com/products.php?page=products&content=5>.

"CareerCast, Inc.—Tracking & Reporting" product features [online], CareerCast, Inc., 2003 [1 page retrieved on Jun. 4, 2003]. Retrieved from the Internet: <http://www.careercast.com/products.php?page=products&content=6>.

"CareerCast, Inc.—Job Database" product features [online], CareerCast, Inc., 2003 [1 page retrieved on Jun. 4, 2003] Retrieved from the Internet: <http://www.careercast.com/products.php?page=products&content=4>.

"CareerCast, Inc.—Job Seeker Tools" product features [online], CareerCast, Inc., 2003 [1 page retrieved on Jun. 4, 2003]. Retrieved from the Internet: <http://www.careercast.com/products.php?page=products&content=3>.

"CareerCast, Inc.13 Enterprise Admin" product features [online], CareerCast, Inc. 2003 [1 page retrieved on Jun. 4, 2003]. Retrieved from the Internet: <http://www.careercast.com/products.php?page=products&content=8>.

"Features—Pursuant Technologies", product features [online], Pursuant Technologies, 2001 [1 page retrieved on Jun. 4, 2003]. Retrieved from the Internet: <http://www.pursuanttech.com/features.cfm>.

"The Jobs—Job Search Site Employment Opportunities & Job Listing Online!", web page [online]. Post-a-Job.com [1 page retrieved on Jun. 6, 2003]. Retrieved from the Internet: <http://www.post-a-job.com/cgi-bin/c2r48/atlant/atl.cgi?ct=a8&md>.

"The Jobs—Job Search Site Employment Opportunities & Job Listing Online!", web page [online], Post-a-Job.com [2 pages retrieved on Jun. 6, 2003]. Retrieved from the Internet: <http://www.post-a-job.com/cgi-bin/c2r48/atlant/atl.cgi?ct=a8&md=addform>.

"Software and Technology Sales Jobs—SalesRecruits.com", web page [online]. SalesRecruits.com [1 page retrieved on Jun. 6, 2003]. Retrieved from the Internet: <http://www.salesrecruits.com/searchResumes.cfm>.

"PerfectSoftware—HR Software—Human Resource Software for Applicant Tracking, and Benefit Manage . . . ", product features [online], PerfectSoftware.com [1 page retrieved on Jun. 9, 2003]. Retrieved from the Internet: <http://www.perfectsoftware.com/pshtml/atm.html>.

"Home of Perfect Software, Inc.~hr Applicant", web page [online], Perfect Software, Inc., 1989-2001 [3 pages retrieved on Jun. 9, 2003]. Retrieved from the Internet: <http://www.perfectsoftware.com/pshtml/atm_screenshots.html>.

"EZ Recruit—Our Products", product features [online], EZRecruit.com [2 pages retrieved on Jun. 9, 2003]. Retrieved from the Internet: <http://www.ezrecruit.com/products.asp>.

"Overview of EZRecruit and EZVendor", product features [online], EZRecruit.com [1 page retrieved]. Retrieved from the Internet.

"WetFeet > Recruitment Technologies > Features and Benefits", product features [online], WetFeet, Inc., 2003 [2 pages retrieved on Jun. 9, 2003]. Retrieved from the Internet: <http://www.wetfeet.com/about/what/wfrecruiter/features.asp>.

"WetFeet Recruiter Tour—How Does WetFeet Recruiter Help?", product features [online], WetFeet.com [1 page retrieved on Jun. 9, 2003]. Retrieved from the Internet: <http://www.wetfeet.com/about/recruiterdemo/slide1.html>.

"WetFeet Recruiter Tour—What Does WetFeet Recruiter Do?", product features [online], WetFeet.com [1 page retrieved on Jun. 9, 2003]. Retrieved from the Internet: <http://www.wetfeet.com/about/recruiterdemo/slide2.html>.

"WetFeet Recruiter Tour—Focus on Top Candidate Immediately", product features [online], WetFeet.com [1 page retrieved on Jun. 9, 2003]. Retrieved from the Internet: <http://www.wetfeet.com/about/recruiterdemo/slide5.html>.

"WetFeet Recruiter Tour—Manage Recruits Through the Evaluation Process", product features [online], WetFeet.com [1 page retrieved on Jun. 9, 2003]. Retrieved from the Internet: <http://www.wetfeet.com/about/recruiterdemo/slide6.html>.

"WetFeet Recruiter Tour—Centralize Candidate Information in Your Private Talent Database", product features [online]. WetFeet.com [1 page retrieved on Jun. 9, 2003]. Retrieved from the Internet: <http://www.wetfeet.com/about/recruiterdemo/slide7.html>.

"HotResumes.com | 'Your Source for Thousands of Resumes!'", web page [online], HotResumes.com, 2002 [3 pages retrieved on May 21, 2003]. Retrieved from the Internet: <http://www.hotresumes.com/index.cfm?t=signup.cfm>.

"HotResumes.com | 'Your Source for Thousands of Resumes!'", web page [online], HotResumes.com [1 page retrieved on May 21, 2003]. Retrieved from the Internet: <http://www.hotresumes.com/index.cfm?t=search&s=2&start=1&ed=5&relo=0&H1B=0&HD=-1&view=1&...>.

"ABRA Recruiting Solution™", product features [online], Best Software, Inc., 2002 [2 pages retrieved]. Retrieved from the Internet.

"Bullhorn Staffing: #1 in Web-Native STAFFING Software:", product features [online], Bullhorn, Inc., 1999-2003 [1 page retrieved on May 22, 2003]. Retrieved from the Internet: <http://www.bullhorn.com/Home.6.0/BliContent_Solutions_PremierTools_Resume.htm>.

"Bullhorn Staffing: #1 in Customizable STAFFING Software", demo program [online], Bullhorn.com [2 pages retrieved]. Retrieved from the Internet.

"Resume Tracker Quick Tour", product features [online], askSam Systems [5 pages retrieved on Jun. 4, 2003]. Retrieved from the Internet: <http://www.asksam.com/rtstour.asp>.

"ComputerJobs.com—What is a Skills Summary?", web page [online], ComputerJobs.com [1 page retrieved]. Retrieved from the Internet.

"Profile-Based Recruiting" by Alice Snell, article [online], Electronic Recruiting Exchange, Feb. 11, 2003 [3 pages retrieved on Jun. 9, 2003]. Retrieved from the Internet: <http://www.erexchange.com/articles/db/05E54AB231E343C0BC35492E8173EC62.asp>.

* cited by examiner

Figure 12D

RESUME MANAGEMENT AND RECRUITMENT WORKFLOW SYSTEM AND METHOD

FIELD OF THE INVENTION

The present invention relates, in general, to computing systems and data processing. In particular, the present invention is a computer system and method for managing access to a resume database, searching the resume database, generating a resume summary based on a stored resume and job description, accessing a resume management and recruitment workflow system via a graphical user interface, and composing a resume for a candidate.

BACKGROUND OF THE INVENTION

When an employer decides to hire a new employee, a hiring manager determines requirements for the new employee. The requirements include mandatory characteristics for the new employee. With the requirements in mind, the hiring manager begins to review resumes that the employer receives from potential candidates.

A resume, or curriculum vitae, summarizes a candidate's career and qualifications. The resume is a mechanism to convey personal and business-related characteristics that the candidate believes to be relevant to a prospective employer. The resume typically includes the candidate's career objective, personal interests, professional affiliations, educational background, employment history, and a description of work experience.

Reviewing candidate resumes is typically a manual process that involves the hiring manager reading or scanning each paper or electronic resume in a stack of resumes with the requirements for the new employee in mind. After reading or scanning a resume, the hiring manager decides whether the candidate's qualifications described in the resume can possibly satisfy the job requirements. For each resume that seems to satisfy the requirements, the hiring manager contacts the potential candidate and attempts to schedule an interview. Once the potential candidate accepts the invitation to interview, the potential candidate becomes a candidate for the new position. One disadvantage of this process is the time required by the hiring manager to review resumes that do not possibly qualify for the position. The hiring manager is reviewing a large number of resumes for the purpose of narrowing them down to a few resumes that describe candidates who might qualify for the position and warrant an interview or hire. Furthermore, the accuracy of the process depends on the accuracy of the hiring manager who is reading or scanning the large number of resumes. Thus, the manual process does not lend itself to reviewing a large enough number of resumes and is likely to miss the resume of a qualified potential candidate or find the resume of an unqualified potential candidate.

Prior electronic systems improved upon the manual process by creating a database of resumes and tools to search the database. The impetus for developing these systems was to reduce the time required to review resumes, eliminate the tediousness of the task, and improve the accuracy of the search. These prior systems typically scanned a database of documents using a textual word search of the resume content. The textual word search did not account for alternative terminology, spelling, format, or case differences between the search terms and the resume content. The textual word search also did not take into account the length of the duration of an experience. Since these prior systems rely upon key words to describe the resume content, the disadvantages of these prior systems are similar to those of the manual process. These prior systems retrieve a much larger number of resumes than the number of possibly qualified resumes. Thus, these systems retrieve a large number of irrelevant resumes. To narrow the output to a short list, these systems require a further manual review tallying the maximum possible duration of experience for each required skill or experience-related phrase. This manual review is still timely and prone to error. Borrowing a term from the science and art of data mining, the precision ratio of prior systems has been extremely low. For certain technical jobs and jobs that require more than minimal experience, the precision ratio can be under 5% and at times even below 1%.

Other prior electronic systems attempted to solve the reduction of the large number of resumes to a short list of possibly qualified candidates by ignoring the resume and relying upon the candidate to input the duration of experience that they have in a skill or experience-related phrase. A search performed by these systems include the duration of experience on only a predetermined set of skill or experience-related phrases and rely on the candidate or the candidate's representative to correctly enter the duration of experience for the skill or experience-related phrase. These systems may consider alternate terminology, spelling, or formatting differences, but only for the predetermined set of skill or experience-related phrases. There are three principal disadvantages to these systems.

First, prior electronic systems provide a very time consuming set-up for candidates or their representatives. The candidate must enter each acquired skill or experience-related phrase and the associated duration of experience. This becomes a particularly daunting task when considering the number of recruitment systems to which an applicant might want to post a resume or list of qualifications. It is also a daunting task for the recruitment systems managers because their staff must read each resume or interview each candidate to obtain as many skill or experience-related phrases as possible from their previous experiences.

Second, prior electronic systems are not dynamic. They cannot consider a skill or experience-related phrase and its possible duration of experience as soon as the resume arrives into the system. In these systems, a new skill or experience-related phrase will never be searchable for a given duration of experience unless the users of the system grant the skill or experience-related phrase the status of being searchable by duration of experience, irrespective of the existence of the resume in the system.

Third, prior electronic systems tally the duration of experience for a skill or experience-related phrase at search time by utilizing traditional search techniques. Performing the tallying of years of experience at search time optimizes storage and data normalization and provides a simple traditional construct to the SELECT statement of a relational database. Unfortunately, tallying the duration at search time is a processor intensive operation that negatively impacts the system performance.

Thus, there is a need for a resume management and recruitment workflow system that includes search and recruitment workflow tools to reduce a resume database to a manageable number of resumes by identifying a set of candidates who can possibly satisfy the qualifications and requirements sought by a hiring manager. The search should identify any resume that includes the sought after qualification or requirement and should also interpret synonymous or alternative terms to be equivalent to the sought after qualification or requirement. Furthermore, the search should identify most resumes that can possibly include the sought after qualification or requirement and should avoid identifying resumes that cannot possibly include the sought after qualification or requirement. The qualifications and requirements should include any skill or experience-related phrase that appears in a resume, but should also accommodate requiring a candidate to possess the qualification or requirement for a specified minimum period of time. The present invention addresses this need.

SUMMARY OF THE INVENTION

A computer system, method, and computer program product for managing access to a resume database. The method comprises receiving a resume that includes at least one skill or experience-related phrase, storing the resume in the resume database, computing a term of experience for each skill or experience-related phrase, and storing a parsed resume in the resume database. The parsed resume includes each skill or experience-related phrase, the term of experience, and a relationship between the term of experience and each skill or experience-related phrase. The resume further includes a contextual use for each skill or experience-related phrase, the contextual use having an experience range. The term of experience for each skill or experience-related phrase being derived from the experience range of the associated contextual use. When the experience range is zero, the term of experience is set to zero. When the experience range is greater than zero, the term of experience is the time difference between the start time and the end time of the experience range rounded down to a unit of time, such as a number of seconds, minutes, hours, days, weeks, months, years, or decades. For each skill or experience-related phrase that is a repeated entry, the computation of the term of experience is the sum of the time difference for each repeated entry that is in a different experience range.

The storing of the parsed resume further comprises storing each skill or experience-related phrase having an identical term of experience as an element defined by a markup language (e.g., XML), the element comprising a start tag, content data, and an end tag. The start tag and the end tag include the identical term of experience, and the content data includes each skill or experience-related phrase having the identical term of experience. In another embodiment, the content data further includes a nested element comprising a nested start tag, nested content data, and a nested end tag. The nested start tag and the nested end tag include a nested term of experience, and the nested content data includes each skill or experience-related phrase having the nested term of experience. In another embodiment, the nested term of experience is greater than the identical term of experience.

In another embodiment, the method further comprises receiving a job description, storing the job description in the resume database, sending a database query to the resume database, receiving a result set in response to the database query, and sending a portion of the result set. The job description including at least one job requirement, where each job requirement includes a required skill or experience-related phrase and a required term of experience. The result set includes at least one matching resume from the resume database with each matching resume satisfying the job description. The required term of experience is rounded up to a unit of time, such as a number of seconds, minutes, hours, days, weeks, months, years, or decades. In another embodiment, the job description further includes a required level of education or a required field of specialization. In another embodiment, the job description includes a required salary range comprising a minimum required salary and a maximum required salary.

In another embodiment, the method comprises associating at least one of the skill or experience-related phrases with at least one implied skill or experience-related phrase, storing searchable phrases in the parsed resume, and computing a term of experience for each of the searchable phrases. The searchable phrases include the skill or experience-related phrases and each implied skill or experience-related phrase. To associate skill or experience-related phrases with implied skill or experience-related phrases, the method retrieves each implied skill or experience-related phrase from a mapping table that relates skill or experience-related phrases to implied skill or experience-related phrases. The term of experience for each searchable phrase is derived from the experience range of the contextual use associated with the searchable phrase.

In another embodiment, the method comprises receiving a request to search the resume database, receiving search criteria, sending a database query to the resume database, receiving a result set in response to a database query, and sending the result set in response to the request. In another embodiment, the method comprises sending a request to search the resume database, sending search criteria, and receiving a result set in response to a database query to the resume database. The result set including at least one matching resume from the resume database, where each matching resume satisfies the search criteria.

In another embodiment, the method comprises receiving a request to generate a summary of a resume, selecting a job description, sending a database query to the resume database, receiving a result set in response to the database query, and storing the resume summary. The result set including the resume and the resume summary, where the resume summary includes the required skill or experience-related phrases.

In another embodiment, a graphical user interface comprises a first data entry region, a second data entry region, and a search button. The first data entry region includes at least one required skill set, where each required skill set comprises a required skill or experience-related phrase and a required term of experience. The second data entry region includes a search string comprising at least one search phrase, where each search phrase includes one of the required skill sets and a one-to-one mapping exists between the search phrases and the required skill sets. The search button being operative to send to a resume database, a database query that includes the search string.

In another embodiment, the system updates the search string in the second data entry region to reflect changes made by a user editing the required skill sets in the first data entry region. Similarly, the processor also updates the required skill sets in the first data entry region to reflect changes made by a user editing the search string in the second data entry region.

In another embodiment, the method comprises sending scripted questions to a candidate, receiving responses to the scripted questions, and composing grammatically correct sentences based on the responses. The responses describe a job history for each job held by the candidate.

The preceding summary of the invention is presented to assist with understanding the invention and is neither an exhaustive nor an exclusive summary. It should be understood that this summary of the invention is not representative of all of the inventions defined by the claims, to be considered limitations on the invention as defined by the claims, or limitations on equivalents to the claims. Thus, this summary of the invention should not be considered dispositive when determining equivalence. Additional features and advantages of the invention will become apparent from a review of the detailed description, figures, and claims.

FEATURES AND ADVANTAGES

The resume management and recruitment workflow system allows a candidate to store requisite experiences, capabilities, and competencies by merely posting their electronic or digital resume to the system. The candidate does not need to complete forms and assign years of experience to a predefined set of skill or experience-related phrases. The system retains all of the experiences, skills, and experience-related phrases for the candidate and assigns the maximum possible duration of experience for each utilizing this information for the employer to execute a search with great accuracy, i.e., an improved precision ratio.

The resume management and recruitment workflow system allows a hiring manager or recruiting representative to search a resume database for a candidate having a specific skill or experience-related phrase at a required minimum duration of experience. This search allows the hiring manager or recruiting representative to reduce a large pool of resumes to a short list of resumes and to obtain a short list of candidates. The candidates in this short list will have the required skill or experience-related phrases at possibly the required duration of experience as long as the resume contains job narratives that contain the skill or experience-related phrase, and the duration of the various jobs held by the candidate. The search user interface allows the hiring manager or recruiting representative to draft a database query using either an intuitive interface or a Boolean phrase interface. The system converts the one form of data entry to the other and vice-versa.

From each posted resume, the system extracts each skill or experience-related phrase and stores it in an XML file within a duration tag. The duration tag has a value that is smaller than the maximum possible duration of experience of the skill or the experience-related phrase but is the largest value among the values of elements of a pre-established series of duration tags. Future searches for a candidate relies on the experience-related phrases and associated duration tag stored in a resume database for retrieval by the hiring manager of possibly suitable candidates. The system does not require real-time tallying of duration of experience for skill or experience-related phrases at search time.

The system stores in the XML file the creation date of the resume in a number of different time units. The user will be able to retrieve resumes for a period of time whose length is any one of these time units and whose creation date is so many such time units from a pre-determined date. In the Gregorian calendar system, Dec. 12, 2003 is 2003 years from 1 A.D., 24,036 months from January, 1 A.D. and approximately 731, 596 days from 12:00 A.M. Jan. 1, 1 A.D. For storing the creation or arrival date of a resume, this system created a different calendar system whose units are not necessarily days, months and years. This system enables the recruiter to retrieve all resumes that have arrived within any of such units of time on any past date. For instance, if a three-days unit is one such unit of time, then this system can retrieve three days worth of resumes that meet a certain criteria on a specified date that is so many multiples of three days from the pre-determined date. So, although this system will be retrieving data that is created between two dates that are three days apart, the stored date in the XML file will be a unique number identifying each of the three days. Similar to the Gregorian calendar, which utilizes days, months and years as units of time, this system utilizes a number of time units, which are pre-determined by the implementers of the system. Optimizing the data retrieval to the user's liking influences the determination of the length and number of these time units. Smaller number of time units tends to cause the units to carry high values and will cause the system to retrieve a larger number of resumes. However, if you need to narrow the number of resume retrieved, then a large number of such units is established, where the units' values will be narrowly spread out.

The system stores the salary in multiples of a predetermined series of values. For instance, an 82,000 U.S. dollar salary is four 20,000 U.S. dollar units, sixteen 5,000 U.S. dollar units and eighty-two 1,000 U.S. dollar units. This system retrieves all resumes whose desired salaries fall in a range whose length is one such dollar unit. All resumes in this dollar range, whose length is the value of the dollar unit, carry the same attribute or multiple of that unit. Retrieving all resumes with a certain value of the multiple will retrieve resumes whose desired salary is with a range whose length is one such dollar unit amount. This system can retrieve resumes within a dollar range without having to execute data base retrieval statements that utilize the greater, smaller or between operators.

The system stores educational information, which includes degree, field of specialization, school name, and year of graduation. This system allows the user to filter or retrieve resumes based on criteria related to education. Degrees are nested in a hierarchy. For instance, a resume of a candidate who holds a master degree will appear in nested enclosures for an associate, bachelor, and master degrees. The implementation can be made to accommodate any number of degrees that run in a hierarchy. Two degrees belong to the hierarchy when one implies the other. For instance, the holder of a Master's degree either holds a Bachelor's degree or has the qualifications of at least the holder of a Bachelor's degree.

The system maps each skill or experience-related phrase to a number of broad terms or phrases when a candidate posts the resume to the system. The system stores the broad terms or phrases and their maximum possible duration of experience in the same fashion as it does for the narrow terms or phrases, from which the broad terms or phrases were derived. Thus, the search will have a direct hit for requested skill or experience-related phrases as well as direct hits for their broad terms or experience-related phrases. Note that a broad term or phrase is a term or a phrase that is implied by another term or phrase. The latter term or phrase is the narrow term of the broad term that it implied. The term 'imply' is the Aristotelian implication in Logic as in the statement: "If A then B". In this statement A implies B. Therefore, B is a broad term of A and A is a narrow term of B.

After locating each skill or experience-related phrase, the system displays the data extrapolated from the resume to the candidate and allows the candidate to correct, add, or delete any information from the resume. In another embodiment, the system assists the candidate with developing a resume by asking the candidate a series of questions designed in such a way that the answers will make up the phrases and sentences that comprise the content of a job assignment description. In another embodiment, when a hiring manager's search identifies a suitable candidate, the system will generate for each employer's job, a summary of the candidate's background that highlights the experiences most pertinent to the job requirements.

The preceding features and advantages are presented to assist with understanding the invention and are neither an exhaustive nor an exclusive summary. It should be understood that these features and advantages are not representative of all of the inventions defined by the claims, to be considered limitations on the invention as defined by the claims, or limitations on equivalents to the claims. Thus, these features and advantages should not be considered dispositive when determining equivalence. Additional features and advantages of the invention will become apparent from a review of the detailed description, figures, and claims.

BRIEF DESCRIPTION OF THE DRAWINGS

The accompanying figures best illustrate the details of the resume management and recruitment workflow system and method, both as to its structure and operation. Like reference numbers and designations in these figures refer to like elements.

FIG. 6 is a flow diagram of an embodiment of resume management and recruitment workflow system 140 receiving a job requirement from recruiter 120a or adding a resume from candidate 110a.

FIG. 9 is a flow diagram of an embodiment of resume management and recruitment workflow system 140 searching resume database 302 for a list of resumes and, therefore, candidates that meet a set of requirements input by recruiter 120a.

DETAILED DESCRIPTION OF THE INVENTION

Figure 1:
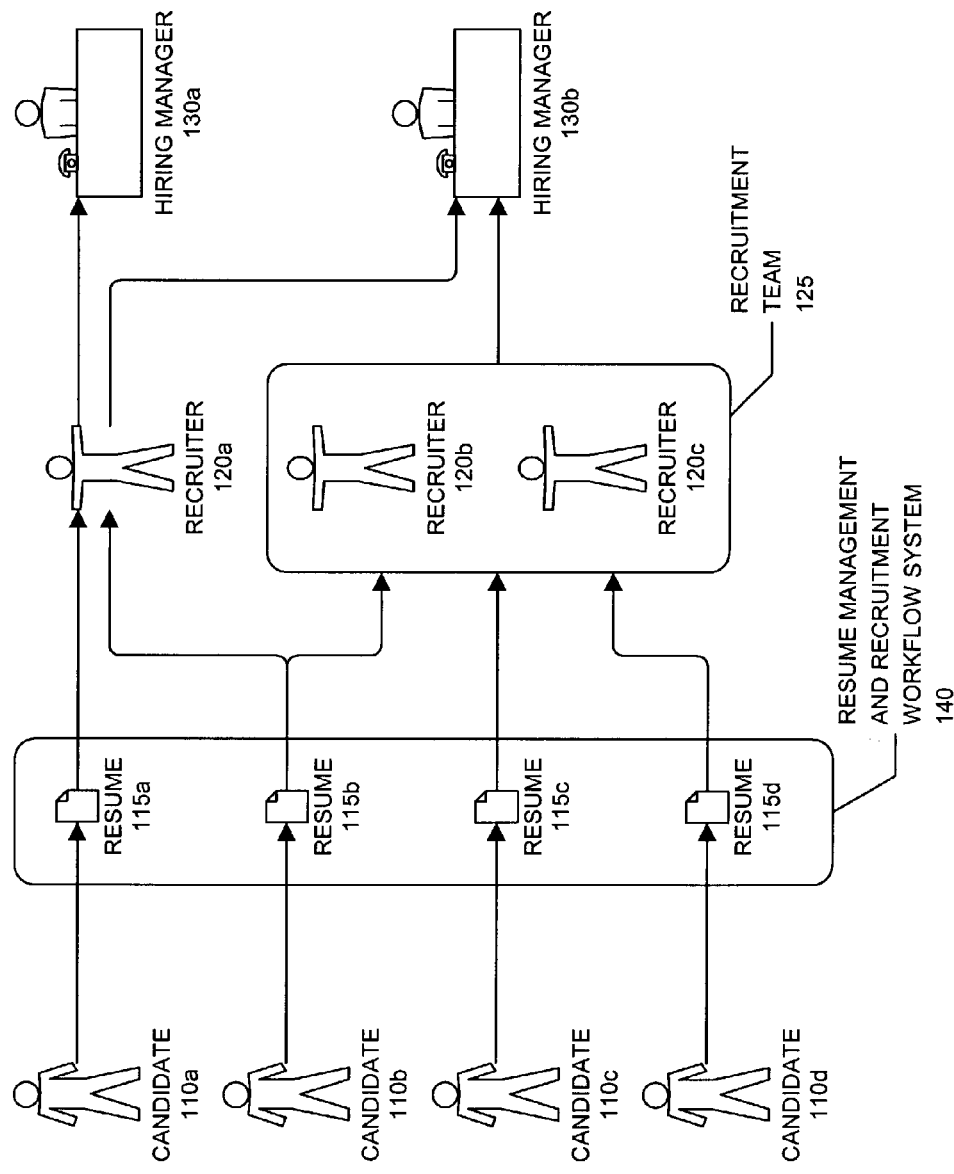
FIG. 1 is a block diagram that illustrates the integration of resume management and recruitment workflow system 140 into an operating environment for a traditional job-opening fulfillment or employment-seeking situation, in accordance with one embodiment of the present invention.

FIG. 1 is a block diagram that illustrates the integration of resume management and recruitment workflow system 140 into an operating environment for a traditional job-opening fulfillment or employment-seeking situation. In one embodiment, candidate 110a authors resume 115a in an electronic format and stores resume 115a in resume management and recruitment workflow system 140 as a public resume. The phrase "public resume" indicates that the system stores the resume and allows any buyer (e.g., recruiter 120a) to access the resume without restriction. The electronic format includes any standard digital document format comprising text file formats such as American Standard Code for Information Interchange (ASCII) or Extended Binary Coded Data Interchange Code (EBCDIC), word processor file formats such as Microsoft Word or WordPerfect, and markup language file formats such as Standard Generalized Markup Language (SGML), HyperText Markup Language (HTML), or eXtensible Markup Language (XML). Recruiter 120a determines a set of requirements and searches resume management and recruitment workflow system 140 for any resume that matches the set of requirements. Each requirement includes at least one required skill or experience-related phrase and a required minimum duration of experience associated with the skill or experience-related phrase. The phrase "matches the set of requirements" indicates that the resume includes each experience-related phrase in the set of requirements and that the maximum possible duration of experience for each experience-related phrase exceeds the required minimum duration of experience defined by hiring manager 130a. In another embodiment, the phrase "matches the set of requirements" indicates that the resume includes additional criteria (e.g., education, salary range, or geographic location) as defined by hiring manager 130a. If resume 115a matches the set of requirements, recruiter 120a retrieves a copy of resume 115a, optionally reviews the resume or interviews the candidate as an additional screening step, and sends it to hiring manager 130a for review. Even though this embodiment only illustrates the interaction of candidate 110a, recruiter 120a, and hiring manager 130a, it is to be understood that resume management and recruitment workflow system 140 can accommodate any number of candidates, recruiters, and hiring managers.

FIG. 1 also illustrates another embodiment that integrates recruitment team 125 into resume management and recruitment workflow system 140. Recruitment team 125, as shown in FIG. 1, includes recruiter 120b and recruiter 120c however, it is to be understood that recruitment team 125 may include any number of recruiters. Candidate 110b, candidate 110c, and candidate 110d each agreed to work with recruitment team 125. Candidate 110b, candidate 110c, and candidate 110d author, respectively, resume 115b, resume 115c, and resume 115d in an electronic format and store resume 115b, resume 115c, and resume 115d in resume management and recruitment workflow system 140 as private resumes. The phrase "private resume" indicating that the system stores the resume and restricts access to the resume to the members of a specific group of system users. As shown in FIG. 1, the specific group is recruitment team 125. As shown in FIG. 1, candidate 110b previously authored another instance of resume 115b and stored the other instance of resume 115b in resume management and recruitment workflow system 140 as a public resume. Thus, resume 115b is a "semi-private resume" because the other instance of resume 115b discloses to the public the information common to both the public and private instance of resume 115b. In another embodiment, the private resume is a replacement for the public resume. The recruiters comprising recruitment team 125 have access to both public and private resumes and search resume management and recruitment workflow system 140 for any resume that matches the set of requirements defined by hiring manager 130a and another set of requirements defined by hiring manager 130b. If resume 115c matches the set of requirements defined by hiring manager 130b, a member of recruitment team 125 retrieves a copy of resume 115c, optionally reviews the resume or interviews the candidate as an additional screening step, and sends it to hiring manager 130b for review. Even though this embodiment only illustrates the interaction of candidate 110b, candidate 110c, candidate 110d, recruitment team 125, hiring manager 130a, and hiring manager 130b, it is to be understood that resume management and recruitment workflow system 140 can accommodate any number of candidates, recruiters, and hiring managers.

Figure 2:
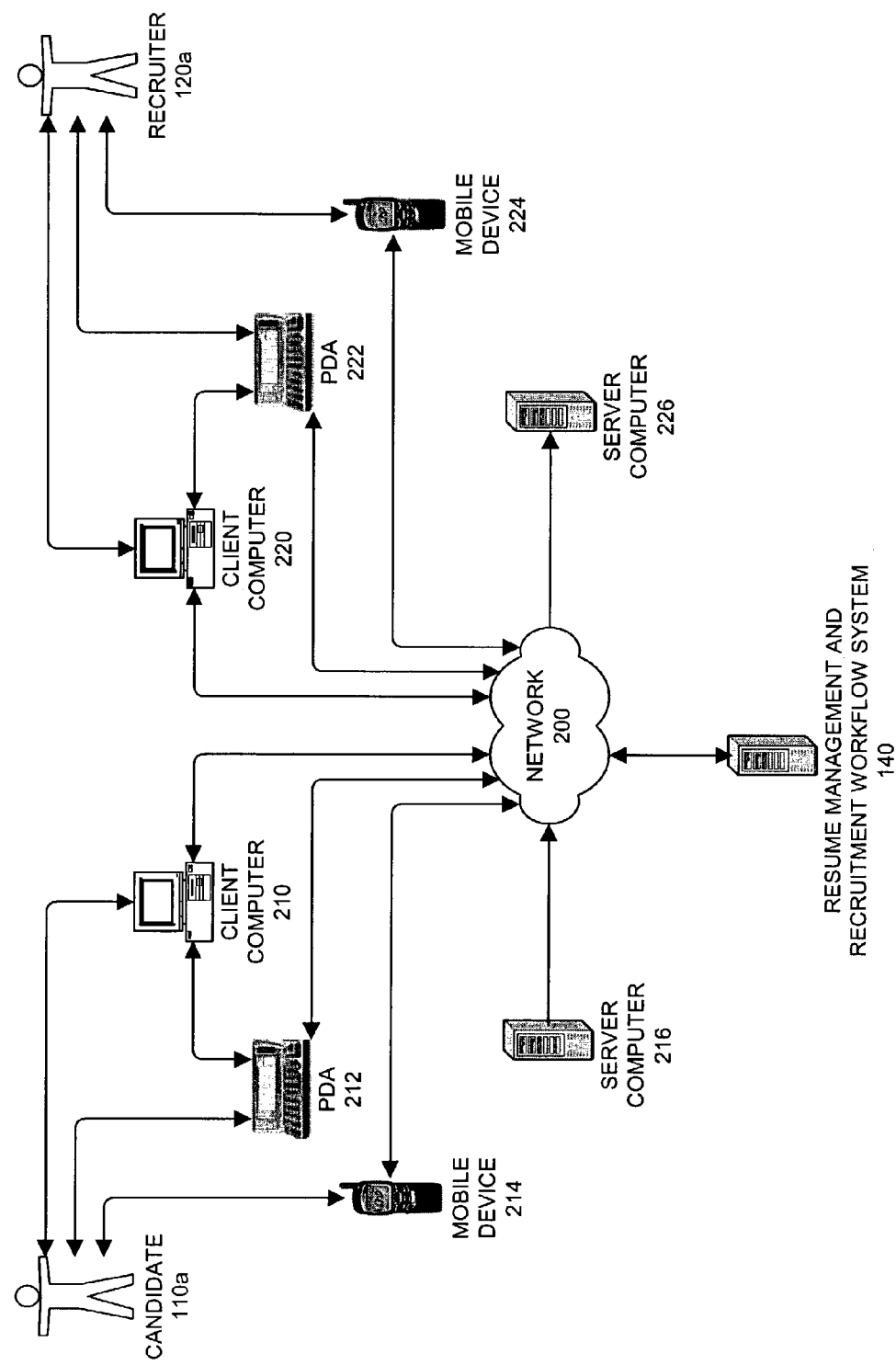
FIG. 2 is a network diagram that illustrates exemplary input and output hardware components that may form the operating platform for resume management and recruitment workflow system 140 shown in FIG. 1, in accordance with one embodiment of the present invention.

FIG. 2 is a network diagram that illustrates exemplary input and output hardware components that may form the operating platform for resume management and recruitment workflow system 140 shown in FIG. 1. Network 200, as shown in FIG. 2, is a public communication network that connects and enables data transfer between the input hardware components, output hardware components, and resume management and recruitment workflow system 140.

Network 200 shown in FIG. 2 is a public communication network however, resume management and recruitment workflow system 140 contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA) or Code Division Multiple Access (CDMA) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization, such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

The input hardware components shown in FIG. 2 include client computer 210, personal digital assistant (PDA) 212, mobile device 214, server computer 216, and comparable devices. Client computer 210 is a general-purpose personal computer, workstation, or laptop configured to connect to network 200. PDA 212 is a portable handheld device, such as a Palm handheld or Microsoft Pocket PC, configured to connect to network 200 either directly or via client computer 210. When PDA 212 disconnects from client computer 210, PDA 212 operates upon downloaded data stored locally until reestablishing the connection to client computer 210 and synchronizing the data. Mobile device 214 is a portable wireless device that connects to resume management and recruitment workflow system 140 via network 200. In another embodiment, mobile device 214 is a land-based or wireless telephone that connects to resume management and recruitment workflow system 140 via network 200. Server computer 216 is a general-purpose network computer that manages network resources and accepts connections from computers such as client computer 210 via network 200. It is to be understood that the input hardware components shown in FIG. 2 are illustrative examples that demonstrate the functions performed by a component and are not intended to limit resume management and recruitment workflow system 140.

In one embodiment, candidate 110a operates the input hardware components shown in FIG. 2 to create and store resume 115a in an electronic format. After storing resume 115a, candidate 110a operates the input hardware component to access resume management and recruitment workflow system 140 via network 200 and sends resume 115a to resume management and recruitment workflow system 140. In another embodiment, candidate 110a operates the input hardware component to access resume management and recruitment workflow system 140 and relies upon programmed instructions residing in resume management and recruitment workflow system 140 to create resume 115a and store the resume on resume management and recruitment workflow system 140. In another embodiment, candidate 110a operates the input hardware component to access resume management and recruitment workflow system 140 via network 200 and verify or update the content of resume 115a that was previously transmitted to resume management and recruitment workflow system 140. In another embodiment, candidate 110a operates the input hardware component to access resume management and recruitment workflow system 140 and verify or update the data parsed from candidate resume 115a. In another embodiment, candidate 110a operates the input hardware component to access resume management and recruitment workflow system 140 and search a database of job descriptions stored by recruiters such as recruiter 120a. In another embodiment, candidate 110a operates the input hardware component to access resume management and recruitment workflow system 140 and submit resume 115a for a job description stored by a recruiter such as recruiter 120a. In one embodiment, the input hardware component performs a resume "bulk load" by accessing resume management and recruitment workflow system 140 via network 200 to transmit at least one resume using a transmission protocol such as the file transfer protocol (FTP). In another embodiment, the resume bulk load is an automatic, scheduled process that occurs periodically.

The output hardware components shown in FIG. 2 include client computer 220, PDA 222, mobile device 224, server computer 226, and comparable devices. Client computer 220 is a general-purpose personal computer, workstation, or laptop configured to connect to network 200. PDA 222 is a portable handheld device, such as a Palm handheld or Microsoft Pocket PC, configured to connect to network 200 either directly or via client computer 220. When PDA 222 disconnects from client computer 220, PDA 222 operates upon downloaded data stored locally until reestablishing the connection to client computer 220 and synchronizing the data. Mobile device 224 is a portable wireless device that connects to resume management and recruitment workflow system 140 via network 200. In another embodiment, mobile device 224 is a land-based or wireless telephone that connects to resume management and recruitment workflow system 140 via network 200. Server computer 226 is a general-purpose network computer that manages network resources and accepts connections from computers such as client computer 220 via network 200. It is to be understood that the output hardware components shown in FIG. 2 are illustrative examples that demonstrate the functions performed by a component and are not intended to limit resume management and recruitment workflow system 140.

In one embodiment, recruiter 120a operates the output hardware component shown in FIG. 2 to access resume management and recruitment workflow system 140 via network 200 and relies upon programmed instructions residing in resume management and recruitment workflow system 140 to create a job that includes at least one requirement. Each requirement includes a skill or experience-related phrase that a candidate 110a must possess and a minimum duration of time that the candidate 110a could have possibly practiced the skill or experience-related phrase. Typically, a skill or experience-related phrase will appear in a resume in a context that implies a maximum duration of time that the candidate 110a has practiced the skill or experience-related phrase (i.e., the duration of time is non-negligible). This mention of the experience-related phrase might also occur when candidate 110a has studied the subject matter represented by the experience-related phrase. Although the phrase might not belong to a job with a duration of experience, the experience-related phrase might also be mentioned in resume 115a when candidate 110a is familiar with the phrase, had read about it, or other reasons that deemed candidate 110a to include it. If the context does not imply a duration of time (i.e., the duration of time is zero) or implies a duration of time that is less than one time unit (i.e., the duration of time is negligible), the maximum duration of time associated with the skill or experience-related phrase will be set to zero. Thus, the skill or experience-related phrase will be attributed to the resume. However, the weight attributed to the skill or experience-related phrase will be negligible. Situations that will cause the maximum duration of time to be zero include candidate 110a attending a class or seminar on a particular subject matter, or being familiar with a subject matter, but having no formal experience with the subject matter. After creating a job, recruiter 120a operates the output hardware component to access resume management and recruitment workflow system 140 via network 200 and verify the status of a job that was previously created and stored in resume management and recruitment workflow system 140. In another embodiment, resume management and recruitment workflow system 140 automatically searches its database for any resume such as resume 115a that matches the job requirement and displays resume 115a and the contact information for candidate 110a on client computer 220 for recruiter 120a. Resume 115a is a match if it contains a skill or experience-related phrase in the job requirements and if the duration of experience derived from the context of the skill or experience-related phrase exceeds the maximum duration of time associated with the skill or experience-related phrase in the job requirements. The phrase "maximum-total-duration" refers to the maximum possible duration of time that candidate 110a can take credit for a skill or experience-related phrase that appears in resume 115a. XML table 540 only stores a portion of the maximum-total-duration because the actual maximum-total-duration of each experience-related phrase extracted from resume 115a is rounded to the closest smaller duration tag in XML table 540. Thus, the maximum-total-duration for a skill or experience-related phrase is the summation, over every job experience range in resume 115a, of the duration of time for the skill or experience-related phrase. In another embodiment, recruiter 120a searches resume management and recruitment workflow system 140 to locate matching candidates. Candidate 110a is a match for a job if resume 115a includes each skill or experience-related phrase, or the associated narrow phrases, that comprise the requirements for the job and where, for each skill or experience-related phrase, the rounded maximum-total-duration of experience exceeds the required minimum duration of time. In one embodiment, the output hardware component performs a job "bulk load" by accessing resume management and recruitment workflow system 140 via network 200 to transmit at least one job using a transmission protocol such as the file transfer protocol (FTP). In another embodiment, the job bulk load is an automatic, scheduled process that occurs periodically.

Figure 3:
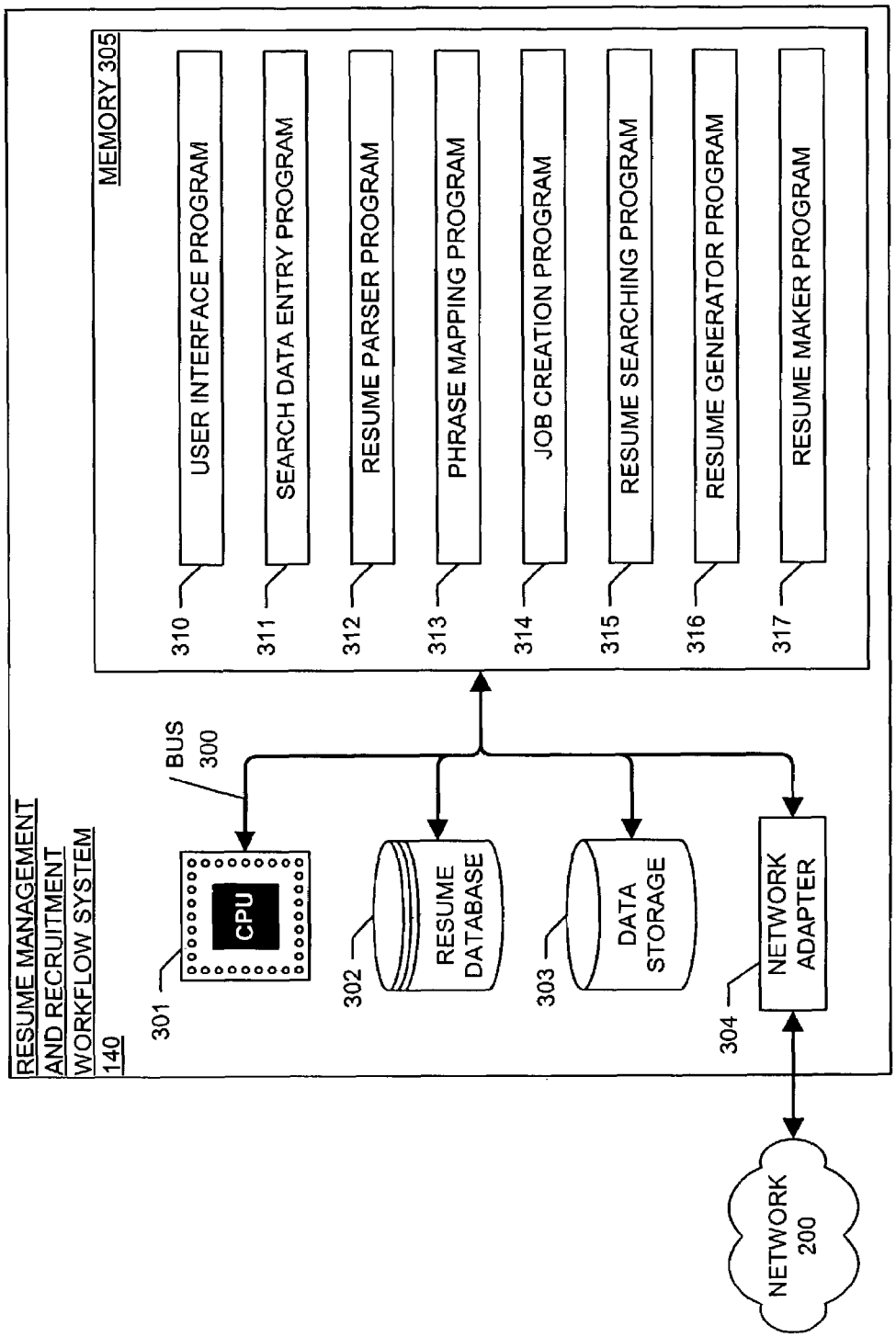
FIG. 3 is a block diagram that illustrates the hardware and software components comprising resume management and recruitment workflow system 140 shown in FIG. 2, in accordance with one embodiment of the present invention.

FIG. 3 is a block diagram that illustrates the hardware and software components comprising resume management and recruitment workflow system 140 shown in FIG. 2. Resume management and recruitment workflow system 140 is a general-purpose computer. Bus 300 is a communication medium that connects central processing unit (CPU) 301, resume database 302, data storage 303, and network adapter 304 to memory 305. Network adapter 304 also connects to network 200 and is the mechanism that facilitates the passage of network traffic between resume management and recruitment workflow system 140 and network 200. CPU 301 performs the disclosed methods by executing the sequences of operational instructions that comprise each computer program resident in, or operative on, memory 305.

FIG. 3 illustrates resume database 302 and data storage 303 as separate devices however, it is to be understood that another embodiment is to store the data in a single physical device that includes a separate logical partition for resume database 302 and data storage 303. FIG. 3 also illustrates resume database 302 and data storage 303 as internal devices however, it is to be understood that in another embodiment these devices may each be external to resume management and recruitment workflow system 140 and accessible via a network connection. Resume management and recruitment workflow system 140 also contemplates distributing resume database 302 over multiple storage devices to suit efficiency, performance, backup, and data warehousing requirements. In one embodiment, resume database 302 utilizes a relational database management system such as Oracle 9i (version 9.2) by Oracle™. Another embodiment of resume database 302 may utilize a different database management tool that is either homegrown or publicly available and traded. Another embodiment of resume database 302 may utilize an object-oriented database management system such as FrameD, open source software provided by SourceForge.net.

In one embodiment, the configuration of memory 305 includes user interface program 310, search data entry program 311, resume parser program 312, phrase mapping program 313, job creation program 314, resume searching program 315, resume generator program 316, and resume maker program 317. These computer programs store intermediate results in memory 305 and transmit final results via bus 300 for storage in resume database 302 or data storage 303. It is to be understood that in another embodiment the configuration of memory 305 may not simultaneously include these programs. CPU 301 coordinates loading a program when it is needed, storing intermediate results, transferring data from one program to another, and unloading the program when it is no longer needed.

User Interface Program

User interface program 310 is a web-based graphical user interface such as a hypertext markup language (HTML) web page that is accessible using a general-purpose hypertext transfer protocol (HTTP) web browser such as Netscape Communicator, Microsoft Internet Explorer, or Mosaic. In another embodiment, user interface program 310 is a standalone application program implemented using an interface tool such as Java, or Microsoft Visual Basic. A user, such as candidate 110a or recruiter 120a, operates user interface program 310 to access search data entry program 311, resume parser program 312, phrase mapping program 313, job creation program 314, resume searching program 315, resume generator program 316, and resume maker program 317. A connection pool management program such as the OC4j (version 1.0) portion of Oracle 9i manages the connections between the user interface program 310 and the programs comprising resume management and recruitment workflow system 140. A description of these programs follows in the discussion of the flowcharts shown in FIGS. 6, 7, 8, and 9. In another embodiment, a different set of software and hardware tools can service the connection and communication between the user or the user interface on one hand and the programs listed in memory 305 of resume management and recruitment workflow system 140 on the other hand.

Search Data Entry Program

Search data entry program 311 is the tool that recruiter 120a uses to compose the criteria for searching resume database 302 to identify resume 115a as possibly satisfying the requirements for a job and identifying candidate 110a as a possible match for the job. Candidate 110a is a matching candidate if the resume of candidate 110a contains the set of requirements whose rounded-down maximum possible duration of experience that is derived from the resume exceeds the rounded-up required minimum duration of experience for each of the skill or experience-related phrases required by the job and defined in the composed criteria. Again, this maximum possible duration as known to the searchable XML table 540 is the rounded figure, which is referred to in this disclosure as the rounded-maximum-total-duration of experience. Search data entry program 311 permits recruiter 120a to enter the criteria as a Boolean phrase of skill or experience-related phrases very similar to the data entry for search engines found in prior electronic systems. Search data entry program 311 converts the Boolean phrase into an intuitive layout of a list of required skill or experience-related phrases and possible alternative skill or experience-related phrases. In another embodiment, search data entry program 311 permits recruiter 120a to enter the criteria as the list of required skill or experience-related phrases and possible alternative skill or experience-related phrases. Search data entry program 311 then converts the intuitive layout of a list of required skill or experience-related phrases and possible alternative skill or experience-related phrases to a Boolean phrase. The data entered in Search data entry program 311 is the input to resume searching program 315.

Search data entry program 311 will replay itself for the user allowing the user to possibly enter another criteria, which will be utilized to remove candidates from the list of candidates who fit the previously entered criteria. In other words, search data entry program 311 accepts mandatory criteria to which the qualifications of the resulting resumes have to adhere and optional similarly laid-out criteria to which the qualifications of the resulting resumes cannot adhere. A resume adhering to the second criteria will be taken out of the list of resumes that adhere to the firstly entered criteria.

In another embodiment, search data entry program 311 accommodates educational requirements in its search criteria. Recruiter 120a can specify the required level of education and field of specialization.

In another embodiment, search data entry program 311 accommodates salary requirements in its search criteria. Recruiter 120a can specify a range of required salaries.

Resume Parser Program

An input to resume parser program 312 is resume 115a in an electronic format. Suitable transmission means for carrying resume 115a in an electronic format include an electronic mail message, an uploaded file, a "cut and paste" block of text, and output from a program such as resume maker program 317. A transmission means such as an electronic mail message will include resume 115a in an electronic format as an attachment. A transmission means such as an uploaded file comprises resume 115a in an electronic format that resume parser program 312 receives via a protocol such as FTP. A transmission means such as "cut and paste" cuts from one location, or program running on a general-purpose computer, a block of text comprising resume 115a and pastes the block of text into a resume input associated with user interface program 310. A transmission means such as resume maker program 317 is a specifically designed transmission means.

After receiving resume 115a, resume parser program 312 parses the resume to extract certain attributes of the candidate and all experience-related phrases and the maximum-total-duration of experience for each phrase. The attributes include the candidate's name, residence or business address, telephone numbers (e.g., home, work, facsimile, and cellular), e-mail addresses, education data (e.g., degree, major, year, and school name), past employer data (e.g., employer name, last title, and period of employment), and salary (e.g., current and expected).

During the parsing of resume 115a, resume parser program 312 identifies the beginning and end of the experience portion of resume 115a. The beginning of the experience portion occurs when the word "experience," or a synonymous word or phrase, appears as a heading in resume 115a. In another embodiment, the beginning of the experience portion occurs at the start of resume 115a. The experience portion of resume 115a by-passes narratives on education, objective, references, hobbies, summary of skills, name, address, phone numbers, electronic mail address, awards, non-experience related achievements, non-experience related accomplishments, and other narratives that do not define experience over a specified duration of time. The end of the experience portion occurs either when resume parser program 312 reaches the end of the resume or when a heading appears such as education, references, hobbies, or other headings that are not related to a job experience.

Resume parser program 312 extracts a start-date and an end-date from the description of each employer or job assignment in the experience portion of resume 115a. A job assignment description is all the text that starts with the line that includes the start-date and ends at the line before the line that includes the next start-date. In another embodiment, a job assignment description in resume 115a ends at the end of resume 115a or one line before the appearance of a non-experience-related heading like references, education or hobbies in resume 115a. The duration of experience, the term of experience, or the experience range, is the duration of time resulting from the subtraction of the end-date for a job assignment description from the start-date for the job assignment description. The start-date and end-date for a job assignment description in resume 115a appear on one line with a separator in between. The separator can be a space, a character, or a term or a phrase that means "to" (e.g., "Oct. 1, 1999 to Nov. 24, 2001" or "Oct. 1, 1999-Nov. 24, 2001"). In another embodiment, the start-date, separator, and end-date of a job assignment description in resume 115a appear on two or three consecutive lines respectively. When only two lines are used the separator might be a null, implied by a carriage-return or line-feed, a hidden or unprintable character, or non-existent. The maximum duration for any skill or experience-related phrase that appears in the description of that employer or job assignment is the duration of time between the start-date and the end-date. If the start-date or the end-date are not present in the description, then resume parser program 312 sends an electronic message to candidate 110a requesting that candidate 110a edit resume 115a to include date ranges for each of the job assignment descriptions via user interface program 310. In another embodiment, after receiving the electronic message sent by resume parser program 312, candidate 110a can edit resume 115a on client computer 210 and retransmit resume 115a to resume management and recruitment workflow system 140.

Resume parser program 312 also extracts each phrase contained in every job assignment description portion of resume 115a. A phrase is a sequence of one or more consecutive words. A word is a sequence of one or more consecutive printable characters, numbers, or symbols. Extracted phrases from a job assignment description in resume 115a can have overlapping words or overlapping sub-phrases. For example, if the phrase "Utilized Java and Oracle" appears in a job assignment description of resume 115a, the extracted phrases include "Utilized", "Java", "and", "Oracle", "Utilized Java", "Java and", "and Oracle", "Utilized Java and", "Java and Oracle", and "Utilized Java and Oracle". Each extracted phrase from a job assignment description is a "skill or experience-related phrase" and includes one or more consecutive words in the description of the employer or job assignment. Each experience-related phrase is stored in resume database 302 and is associated with a maximum possible duration of time (e.g., number of months, or number of years) that candidate 110a possessed the experience-related phrase. An experience-related phrase includes or describes a skill, job location, title, department, responsibility, duty, action, achievement, accomplishment, relationship, product, consultation, group, team, field, space, area of endeavor, company, industry, technical package, or tool.

When resume parser program 312 finishes parsing resume 115a, resume parser program 312 sends an electronic mail message to candidate 110a that includes a link to the parsed resume. Candidate 110a reviews the candidate attributes and the job experiences with their start-dates and end-dates as parsed by resume parser program 312 and is able to revise any information that is incorrect. In one embodiment, candidate 110a sends the revised copy as a replacement resume.

Phrase Mapping Program

Phrase mapping program 313 maps all experience-related phrases to their possible synonyms and to their broad terms or broad phrases. An experience-related phrase includes, but is not limited to skills that are utilized on the job, all functions that are performed on the job, and all other terms, acronyms, or phrases used in the job assignment description. The information and narratives in the job assignment description comprise statements or phrases that includes one or more words or terms where a word or a term includes one or more characters, numbers, or symbols. Additionally, the word or the term would be preceded and trailed by a delimiter such as a space or non-alphanumeric character. Phrase mapping program 313 maps individual words and consecutive words (i.e., statements or phrases) to their possible synonyms and broad terms in the English language. A broad term or phrase is a term or a phrase that another term or phrase implies (i.e., a broad phrase is an implied phrase). For instance, "human" is a broad term for "soldier", "banker" is a broad term for "lending officer", and "medical doctor" is a broad term for "psychiatrist" or "neurologist". Since "medical doctor" is a synonym for "physician", the phrase "medical doctor" is a broad phrase for "physician" and "physician" is a broad term for "medical doctor". The phrase "speaks Spanish very well" is a synonym for the phrase "fluent in Spanish" and therefore, both phrases are broader than each other. However, "fluent in Spanish" is a broad term for "Spanish author". Phrase A is a narrow term or phrase (i.e., a narrow phrase is an implying phrase) of phrase B when phrase B is a broad phrase of phrase A.

Phrase mapping program 313 is activated to map newly introduced mappings to mapping table 530. Every time resume management and recruitment workflow system 140 adds a map of a phrase to another phrase in mapping table 530, resume management and recruitment workflow system 140 looks up in resume database 302 all the resumes containing the narrow phrase. Resume management and recruitment workflow system 140 utilizes the new mapping to introduce the broad phrase to all the corresponding records in XML table 540. Note that, resume management and recruitment workflow system 140 will attempt to avoid duplication. If a job experience contains the phrase "Java", and its newly mapped narrow phrase "JSP", resume management and recruitment workflow system 140 will not add to the maximum-total-duration of "Java" any duration contributed to by the existence of "JSP" in the mentioned job. Conversely, if "Java" is not explicitly listed in the job assignment description, the introduction of a mapping making "JSP" a narrow phrase of "Java", will cause the resume management and recruitment workflow system 140 to add the duration of experience of the job containing "JSP" to the maximum-total-duration of "Java".

The job assignment description or experience portion of a resume begins on the line that includes the start-date of a date range (e.g., "Oct. 1, 1999 to Nov. 24, 2001" or "Oct. 1, 1999-Nov. 24, 2001") and ends one line before the line that includes the next start-date, if any. The resume management and recruitment workflow system 140 will parse numerous layouts of date ranges including those that might appear on one, two or three lines. Date ranges would initiate job experiences once the program determines that they belong within the experience portion of the resume. The verbiage of a job assignment description may also end when headings on non-job related matters appear. Such headings may include education, references, and hobbies.

During the parsing of resume 115a, resume management and recruitment workflow system 140 gives skill or experience-related phrases in a job assignment description their due weight, in units of time representing the maximum possible duration of experience. As mentioned above, experience-related phrases in a job assignment description can range from one to any number of consecutive words. The duration between the start-date and the end-date in the date range, which defined and started the job assignment description (or experience), is an attribute assigned to each of the experience-related phrases, mentioned above, along with their synonyms and broad phrases. For each experience-related phrase in a single resume, the length of time associated with each appearance of the experience-related phrase in a job experience is tallied to compute a total duration for the experience-related phrase, its synonyms, or broad phrases for the whole resume. By definition and inference, this total duration for each phrase represents the total duration of experience the owner of the resume could have had in the phrase describing, for example, a skill, job location, title, department, responsibility, duty, action, achievement, accomplishment, relationship, product, consultation, group, team, field, space, area of endeavor, company, industry, technical package, or tool. In other words, the total duration of all the jobs, for each experience-related phrase appearing in resume 115a of candidate 110a, is the maximum duration of experience candidate 110a could have had in the experience-related phrase. This maximum duration of experience is referred in this disclosure as the maximum-total-duration.

As previously defined, the term as "maximum-total-duration" for each experience-related phrase refers to the maximum duration per experience-related phrase per resume, and therefore, per candidate. The "total" is for the possible multiplicity of jobs or experiences, in which the experience-related phrase appears, in resume 115a. The duration is at its possible maximum because resume 115a and resume parser program 312 provided all the possible experiences that contain the experience-related phrase. Additionally, during an individual job, candidate 110a could have used an experience-related phrase contained in resume 115a for at most the total duration of the job that contains the phrase. The total of all the duration of all the jobs that contain the experience-related phrase is the maximum-total-duration of experience in the phrase for candidate 110a.

The maximum-total-duration can be in any duration of time such as a number of seconds, minutes, hours, days, weeks, months, years, or decades. Resume management and recruitment workflow system 140 indexes the experience-related phrase in an Extensible Markup Language (XML) table within a duration tag, that represents the largest duration tag among a series of duration tags that is smaller than the maximum-total-duration of the experience-related phrase resulting from resume 115a. In one embodiment, the series of duration tags is chosen so as to optimize the search for candidates, the matching of candidates to jobs, and to get the narrowest possible results without missing any significant number of resumes. For further discussion on the elements in the series of the duration tags, please refer to the section in this disclosure on XML table 540. For example, if resume 115a includes a first job lasting 24 months and a second job lasting 36 months, each experience-related phrase in resume 115a will have a maximum-total-duration attribute with a value of 24, 36, or 60 months depending on whether the experience-related phrase appears in the first job, the second job, or both jobs. Any experience-related phrase that appears in resume 115a has only one value for its maximum-total-duration attribute.

When resume management and recruitment workflow system 140 receives resume 115a, the experience-related phrases are mapped to their broad phrases. For candidate search and job-to-candidate matching purposes, the newly derived broad phrases become new experience-related phrases in the job assignment description that contains the original experience-related phrase from which the broad phrase was derived. By recursion, this mapping and implication process is repeated until the entire original and derived experience-related phrases have been mapped to all their possible and available broad phrases. This mapping process refers to mapping table 530 as the thesaurus for implication to broad phrases. Since concatenating newly derived broad experience-related phrases does not occur within the job experience, neither a partial phrase of the newly generated experience-related phrases nor a concatenation of a number of the newly generated experience-related phrases with each other, with the original experience-related phrases, or with parts thereof generate any newer experience-related phrases. After all the mappings are completed, the maximum-total-duration of experience for each experience-related phrase, original and new, is tallied. The tallying of the maximum-total-duration of experience does not differentiate between an original skill or experience-related phrase that appeared verbatim in the original resume and a derived broad phrase that came about as a broad phrase through implication by the thesaurus mapping table 530.

Note that a broad experience-related phrase might not have existed in the job that contained the original narrower experience-related phrase, from which it was derived, but it might exist in another job that does not contain the original narrower experience-related phrase. It is therefore deduced that while the maximum-total-duration of the original narrow experience-related phrase might only be the length of the job that contains the narrow experience-related phrase, the maximum-total-duration of the broad phrase will be the total duration of both jobs. In other words, the maximum-total-duration of a broad experience-related phrase is at least, but can be more than, the maximum-total-duration of the narrow phrase that implied it. The mapping process, the tallying process of maximum-total-duration, and the storing and indexing of the experience related phrases in XML table 540 are performed when the resume is received by resume management and recruitment workflow system 140. Resume searching program. 315 fetches preprocessed and already indexed data.

Job Creation Program

Job creation program 314 enables recruiter 120a to utilize user interface program 310 to enter data that describes a job and the requirements that a potential candidate should possess to be a match for the entered job. Job creation program 314 stores the entered data in job table 520. In another embodiment, before storing the entered data, job creation program 314 activates resume searching program 315 to locate potential candidates whose resume is a match to the entered job. In another embodiment, when resume 115a arrives, the system examines the resume to determine whether it matches any job entered by recruiter 120a and stored in job table 520. If resume 115a matches a job stored in job table 520, resume management and workflow system 140 automatically alerts recruiter 120a, the creator of the job, of the arrival of resume 115a. Recruiter 120a can review resume 115a and send it to hiring manager 130a or flag resume 115a for future reference. In another embodiment, after reviewing resume 115a, recruiter 120a does not send resume 115a to hiring manager 130a and does not flag resume 115a for future reference.

In another embodiment, job creation program 314 allows recruiter 120a to clone a job. Recruiter 120a will be able to enter or create a job similar to an existing job upon the click of a button. The cloning will create a new job with the same specifications, required criteria, and hiring manager 130a of the cloned job. The new job will have the cloning date for the creation date and will not share notes and job activities with the original job.

Resume Searching Program

Resume searching program 315 searches resume management and recruitment workflow system 140 for the resumes that meet input criteria. Resume 115a meets the input criteria if the rounded-up required duration of each required experience-related phrase or its stated alternative in the job criteria is less than the maximum-total-duration tag of the experience-related phrase or its alternative in resume 115a. This excludes those phrases specified by the excluding criteria where the excluding criteria is laid out similar to the required including criteria.

For example, resume 115a includes four jobs with a respective duration of 10, 20, 60, and 60 months. Using every combination of the four jobs, the only possible values for maximum-total-duration of experience (i.e., term of experience) of any experience-related phrase are 60, 60, 120, 20, 80, 80, 140, 10, 70, 70, 130, 30, 90, 90, and 150 months. If the duration tags are monthly, the XML tags that may include skill or experience-related phrases, are <S060>, <S060>, <S120>, <S020>, <S080>, <S080>, <S140>, <S010>, <S070>, <S070>, <S130>, <S030>, <S090>, <S090>, and <S150>. After eliminating duplicate tags, the only possible XML tags that may include skill or experience-related phrases are <S010>, <S020>, <S030>, <S060>, <S070>, <S080>, <S090>, <S120>, <S130>, <S140>, and <S150>. When indexing, the nesting of the possible values of the maximum-total-duration tags is in ascending order. Between these tags, there are monthly tags that contain no skill or experience-related phrases. It is to be understood that the outer tags implicitly contain the skill or experience-related phrases contained in any of the inner higher valued tags. The maximum-total-duration tag or attribute becomes a key. The resume identifier, the maximum-total-duration tag and the skill or experience-related phrase, to which it is an attribute, make up a virtual composite key to the XML table. In another embodiment, when XML is not utilized, the resume identifier, the experience-related phrase, and each period less than or equal to the maximum-total-duration tag make up a composite key to an indexed table that points to resume table 550.

In the criteria, resume searching program 315 allows for substitution of an alternative for a required experience-related phrase. For resume 115a to be a match, the maximum-total-duration tag for the alternative in resume 115a should be greater than or equal to the rounded-up required duration in the criteria of resume searching program 315.

In addition, resume searching program 315 implicitly allows for the substitution of a narrow skill or experience-related phrase of a required experience-related phrase for the required experience-related phrase if the narrow experience-related phrase's maximum-total-duration tag in resume 115a is greater than or equal to the rounded-up required duration of the required broader experience-related phrase. This substitution is implicit because it does not take place at search time. Again, the substitution was accomplished when resume 115a was received by resume management and recruitment workflow system 140 and the broad phrase was derived as an experience-related phrase wherever its narrow phrases existed as experience-related phrases. Upon receipt of resume 115a, phrase mapping program 313 of resume management and recruitment workflow system 140 has already included the broad phrase as an experience-related phrase in the index. The maximum-total-duration tag of this broad newly generated experience-related phrase is at least the maximum-total-duration tag of the narrow experience-related phrase from which it was implied. Therefore, once the maximum-total-duration tag of the newly derived broad experience-related phrase is more than its rounded-up required duration by the search, resume 115a becomes a match to the job or search requirement. Although the original resume 115a did not contain the phrase in the search criteria, the developed index of experience-related phrases for resume 115a does contain the phrase and when the maximum-total-duration tag is greater than or equal to the rounded-up required duration, resume 115a becomes a match.

According to one embodiment of the system, the "SELECT" statement of a search will identify a candidate with 80 months of experience in an experience-related phrase even if the search requires fewer months of experience (e.g., 65 months) in the experience-related phrase. Additionally, an experience-related phrase associated with a duration of 70 months of experience will have its own nest and will not appear in the 80 months nest or in the outer nests that represent 60, 30, 20, and 10 months. Since the nesting includes every possible duration that the job experiences of a resume can provide, each experience-related phrase of a resume will belong to one and only one nest. In a series of monthly nests, there will be additional nests to the ones mentioned above for each month from one up to the highest number of months less than or equal the largest maximum-total-duration attribute among the maximum-total-duration attributes of the experience-related phrases in resume 115a.

In another embodiment, resume searching program 315 accommodates educational requirements in its search criteria. Candidate 110a will satisfy the required educational level when the highest degree that is earned by candidate 110a is higher than the required educational level. The field of specialization is met when the degree for candidate 110a satisfies the degree level requirement and is in the required field of specialization or in a narrower field that implies the required field of specialization as per mapping table 530. For example, candidate 110a satisfies a requirement for a bachelor degree in biology when candidate 110a holds a Ph.D. in genetics.

In another embodiment resume searching program 315 accommodates salary requirements in its criteria. Resume searching program 315 selects a salary range unit for searching based upon the difference between the maximum and minimum salary for the required salary range. For example, a salary range unit can be a 20,000-dollar, 5,000-dollar, or 1,000-dollar unit. If the search is for an individual whose salary is between 250,000 and 300,000 dollars, then the 20,000-dollar unit range will be searched on first. Resume searching program 315 will search for multiples of 13, 14 and 15 of the 20,000-dollar range. If a 12, but not 13 or higher, multiple of the 20,000-dollar range is found then, a 50 or 51 multiple of the 5,000-dollar range should be present for candidate 110a to fit the criteria. If a 13, 14 or 15 multiple are found of the 20,000-dollar range then candidate 110a meets the salary requirement criteria.

Resume searching program 315 performs a search and displays the result of the search via user interface program 310. The search results include a job applicant's resume and the candidate attributes. User interface program 310 displays candidates in a split screen format with the attributes of a selected candidate from the list on one side of the screen and the candidate resume on the other side of the screen. The default display presents the latest copy of the candidate's incoming resume however, a user such as recruiter 120a may also choose to view other resumes for the same candidate, if available. The user may also choose to display the attributes and resumes of other candidates from the output list. The user may also scroll up and down the list selecting the next and previous candidates on the list or directly jumping to a candidate on the list without scrolling.

For individual candidates, the candidate attributes, the candidate activities, the candidate notes, a copy of one of the candidate resumes, and the results of the search will simultaneously remain displayed on the screen while recruiter 120a is flipping from one resume of the candidate to another. User interface program 310 displays the same corresponding information for each new candidate selected from the output list. The user is only limited by the size of the display screen when adjusting how much of the resume, candidate attributes, candidate activities, and output of the search shows on the screen.

A candidate having more than one resume stored in resume table 550 of resume database 302 will have different records in XML table 540 corresponding to each resume. For the candidate to be a match to the requirements of a job or to a search, only one resume needs to match the job requirements or the search criteria. The candidate will appear once on the list of matched candidates.

Resume Generator Program

Resume generator program 316 uses the job data entered by job creation program 314 and resume 115a to generate a new version of resume 115a for candidate 110a. In one embodiment, resume 115a is a match to the job requirements. In another embodiment, resume 115a is not necessarily a match to the entered job. For example, resume 115a may not include a phrase specified in the job requirements, but does include a narrower phrase or a broader phrase for the phrase specified in the job requirements. In both cases, resume generator program 316 produces a new resume that highlights the skill or experience-related phrases required by the entered job and summarizes the job's requirements that are found in resume 115a.

Resume generator program 316 produces a resume summary that includes the total duration of work experience of candidate 110a, the duration of experience that candidate 110a possess in each skill or experience-related phrase required by the job, the duration of experience that candidate 110a possess in each of the phrases that are stated in the job requirements as alternates to the required experience-related phrases, and the duration of experience that candidate 110a possess in the narrow phrases of both the required skill or experience-related phrases and their alternates. Educational background of candidate 110a and the original summary from resume 115a are also included in the newly produced summary. The summary also includes prior job titles for candidates 110a. The summary will also contain the duration of each of the job titles. Resume generator program 316 makes use of the output of resume parser program 312 to derive the total duration of work experience and the duration of experience in each of the required experience-related phrases, their alternatives, and the narrow phrases of both. Additionally, resume generator program 316 makes use of the output of resume parser program 312 to arrive at the educational background of candidate 110a and the job titles that candidate 110a has held. The generated summary includes statements from existing summaries in the original resume. The newly generated resume contains all the experiences found in the original resume. In the newly generated resume, resume generator program 316 highlights (e.g., changes the text appearance to a bold font style) the experience-related phrases that are required by the job; the alternative phrases, which are stated in the job requirement, of the required experience-related phrases; and the narrow phrases of both the required experience-related phrases and the alternatives that are referred to herein. The newly generated resume will only contain information derived from, extrapolated from, or implied by the contents of resume 115a.

Resume Maker Program

Resume maker program 317 enables candidate 110a to make resume 115a. Prior electronic systems and resume management and recruitment workflow system 140 provide the capability that enables candidate 110a to enter their name, address, home phone number, work phone number, facsimile number, cellular telephone number, electronic mail address, earned degrees, field of specialization, the name of educational institutions attended, graduation years, expected salary, and job history. Prior electronic systems and resume management and recruitment workflow system 140 allow candidate 110a to chronologically enter a job history for each prior employer. The job history includes a start and end date for the employment, titles held by candidate 110a, a description of the functions, responsibilities, and duties performed by candidate 110a or an organization to which candidate 110a belongs, accomplishments attributed to candidate 110a, and tools that candidate 110a used during the employment. Some prior electronic systems provide tool tips in the form of samples of resumes, text from existing resumes, or instructions on the expected content of the description of the performed function. However, resume maker program 317 is unique because it composes the description of the performed function for each of the jobs held by candidate 110a. A series of scripted questions that are part of resume maker program 317 are administered to candidate 110a. The mentioned scripted questions comprise multiple choice questions, questions that can only be answered with a yes or a no, and questions that can only be answered with a word, a phrase, a list of words, or a list of phrases. Resume maker program 317 then composes full sentences from the answers to the scripted questions and makes up the description of the performed function. Resume maker program 317 asks candidate 110a a subset of the totality of questions that it contains. In order to compose the description of the performed function, resume maker program 317 dynamically chooses which questions to ask based on the answers to previously asked questions. For example, resume maker program 317 asks candidate 110a for their title at a job. If the response from candidate 110a is "programmer", then resume maker program 317 will ask which programming languages he used. However, if the response from candidate 110a is "manager", then resume maker program 317 will ask how many people he supervised. Resume maker program 317 asks candidate 110a to state their individual responsibility, the responsibility of each person they supervised, the department they worked in, and the company that they worked for. Resume maker program 317 asks candidate 110a to state the hierarchy of the organizations that he worked for and their titles (e.g., department, division, group, etc.). Resume maker program 317 asks candidate 110a for the names of the tools, processes, machinery, or systems that he used. Resume maker program 317 also asks candidate 110a for the names of the tools, processes, machinery, systems, services, products, or duties he produced or performed. Resume maker program 317 then composes full sentences out of the responses of candidate 110a to the questions asked by resume maker program 317. The resulting narrative is then presented to candidate 110a for proof-reading and editing. No further questioning is then performed.

Figure 4:
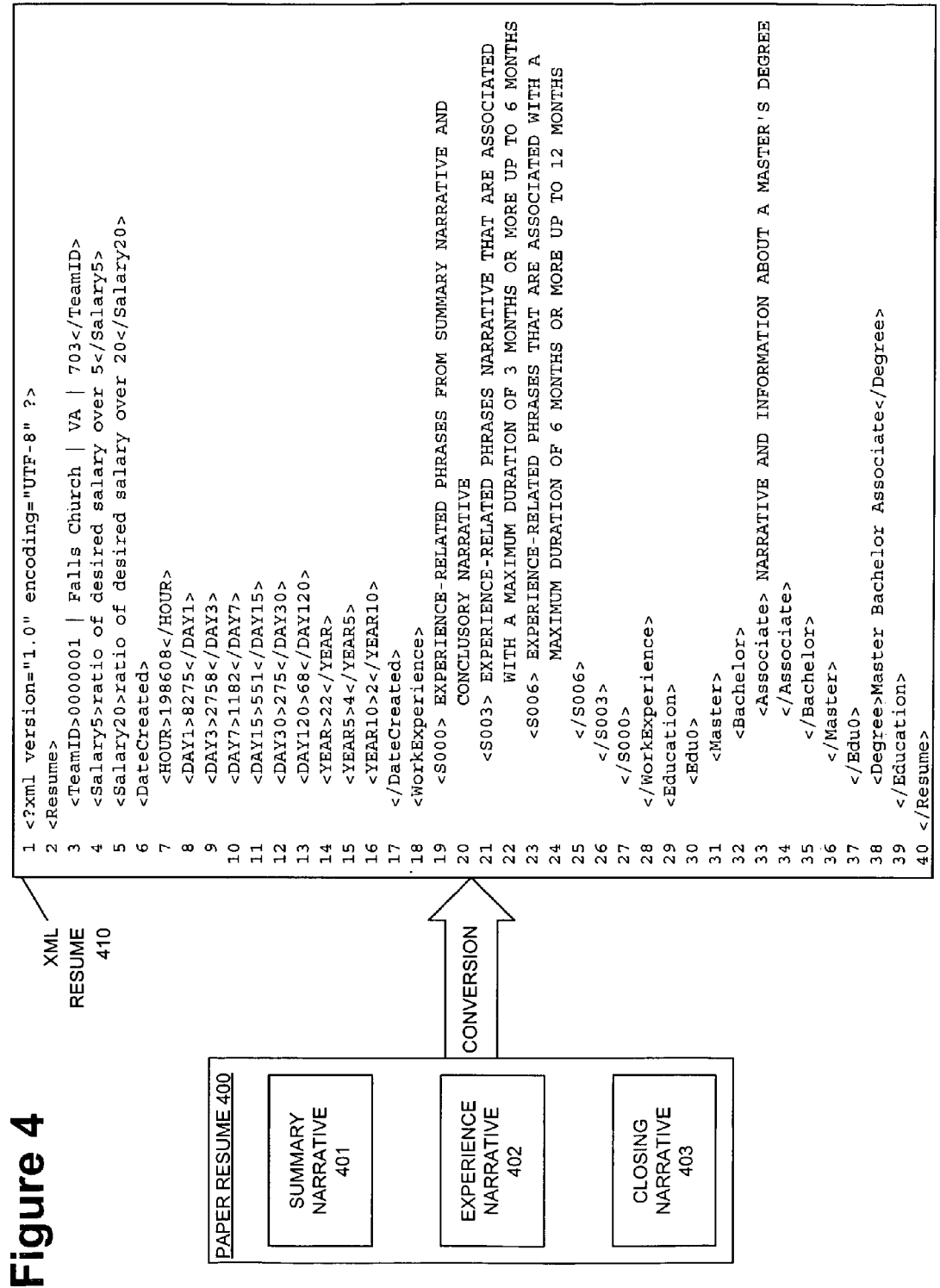
FIG. 4 illustrates the conversion of an exemplary paper resume into an exemplary XML resume, in accordance with one embodiment of the present invention.

FIG. 4 illustrates the conversion of an exemplary paper resume into an exemplary XML resume. Paper resume 400 includes summary narrative 401, experience narrative 402, and closing narrative 403. Summary narrative 401 includes resume headings and their content such as the executive summary, career objective, education, professional summary, and professional certifications. Experience narrative 402 includes the employer or job assignment descriptions that comprise the work experience heading of the resume or a synonymous heading. Closing narrative 403 includes resume headings and their content such as hobbies, security clearance, references, or technical skills. Resume management and recruitment workflow system 140 converts paper resume 400 into XML resume 410. Lines 2-40 of XML resume 410 represent the conversion of paper resume 400. Lines 3-17 of XML resume 410 represent administrative sections that identify the recruitment team ID, salary requirement, and creation date of XML resume 410. Lines 18-39 of XML resume 410 define the experience-related phrases and education data parsed from the paper resume 400. The <Work Experience> tag comprises a series of nested <S_> tags. Each <S_> tag defines the experience-related phrases that correspond to a given duration of experience, i.e., term of experience. Thus, <S000> defines the experience-related phrases that appear in paper resume 400, but correspond to a duration of time from zero to less than the duration of the next nested <S_> tag. For example, the <S000> tag contains any skill or experience-related phrase that occurs in summary narrative 401 or closing narrative 403, but not in experience narrative 402. <S003> defines the experience-related phrases that correspond to at least three months of maximum-total-duration of experience up-to the next <S_> tag. Note that any skill or experience-related phrase that occurs in experience narrative 402 is associated with a maximum-total-duration of three or more months. Further, <S006> defines those three or more months experience-related phrases that correspond to six or more months of maximum-total-duration of experience (i.e., any experience-related phrase that occurs in experience narrative 402 and is associated with a maximum duration of six or more months). Thus, the skill or experience-related phrases are stored in nested tags and, when the experience-related phrase is indexed under the tag, the skill or experience-related phrase, the corresponding duration tag and the resume identifier become a composite key to XML table 540. Furthermore, the resume identifier, the maximum-total-duration, and the associated experience-related phrase comprise a virtual composite key to XML table 540. The example of XML resume 410 shown in FIG. 4 includes a tag series where the first two elements represent three months and six months. Also, XML resume 410 represents a candidate whose total experience is more than six months but less than the duration represented by the next or third series tag that is higher than six months. Candidate 110a whose resume 115a generated XML resume 410 does not have experience beyond or more than the third tag in the series. Therefore, the third and higher tags do not need to appear in XML resume 410. XML resume 410 will include enough <S_> tags to span the entire duration of experience in the resume. For example, if a resume has two jobs, one lasting 24 months and the other lasting 36 months, then the last internal nested <S_> tag will be <SXXX> where XXX is the highest valued tag, which is smaller or equal to 60 months. Regardless whether there are corresponding experiences, all the <S_> series elements up to the highest tag are inserted in the XML resume 410. Among them are the tags, which are the highest tags smaller or equal to each of the 24, 36 and 60 months correspondingly.

In one embodiment, the database management tool uses XML to index and store the experience-related phrases and their maximum-total-duration of experience. In another embodiment, a different database tool may employ another tool to store the same information and make it rapidly accessible at search time.

In another embodiment, an experience-related phrase and the highest tag series element that is smaller than the maximum-total-duration of the experience-related phrase can be used as an indexed composite key to a table that points to resume 115a. Additionally, for each such composite key, more composite keys are generated from the experience-related phrase and each of the elements in the series that are less than or equal to the maximum-total-duration. All of these keys would be indexed in a table that points to resume 115a in resume table 550. For example, for a tag series with data elements using a number system in months (i.e. one month, two months, three months, etc.). If candidate 110a has resume 115a that contains the phrase "Java" at a maximum-total-duration of eight months, then eight composite keys will be generated, each containing "Java" at one, two, three, four, five, six, seven, and eight months consecutively. A search or a job description that requires a minimum of five and a half months of experience will retrieve the record containing the composite key of "Java" and six months via a direct hit. Again, no tallying of years of experience at search time will be required. Additionally, "Java" could have been either an original experience-related phrase or a derived one via an implication that utilized an original narrower phrase and mapping table 530.

Figure 5:
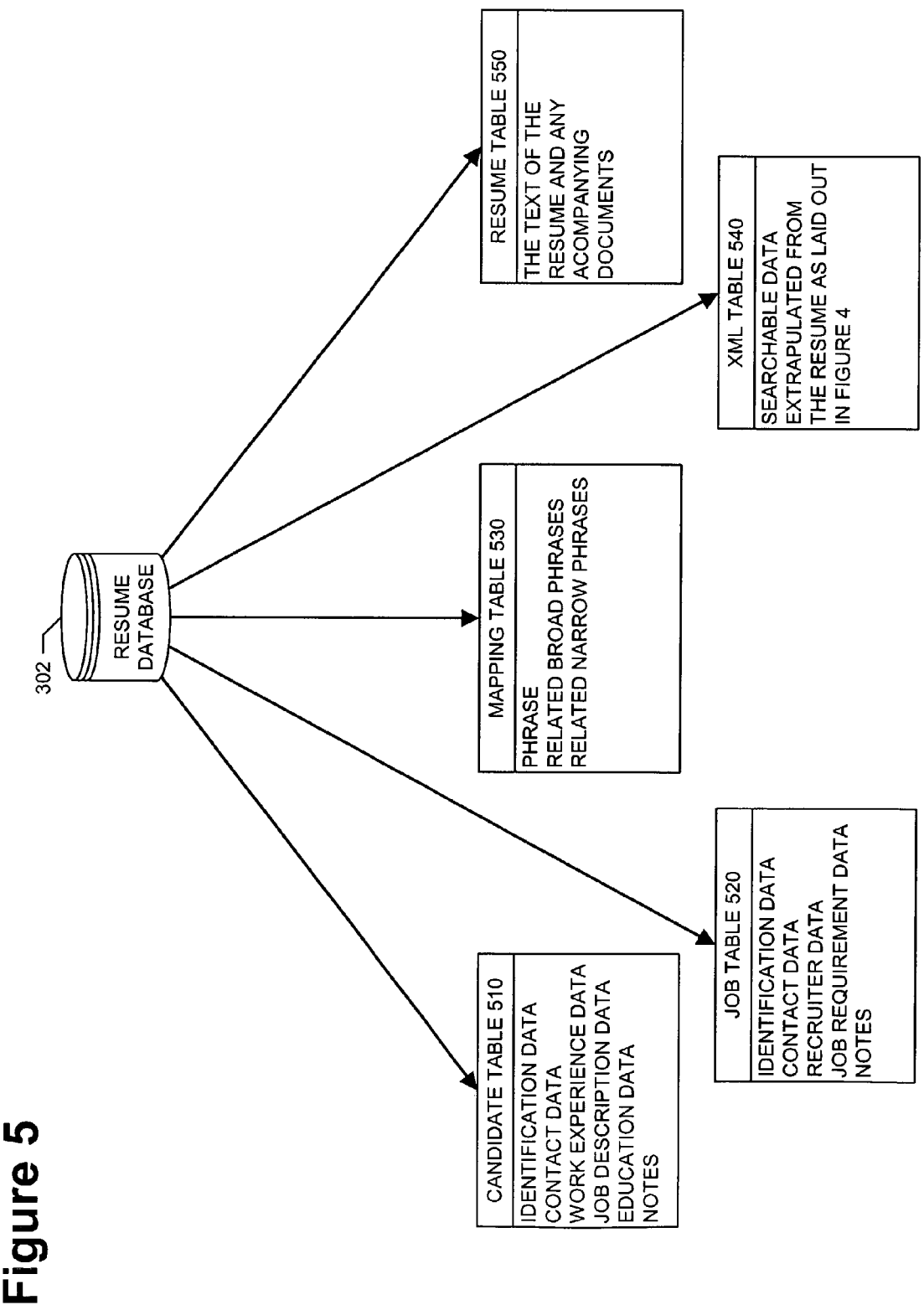
FIG. 5 is an exemplary database structure for resume database 302 shown in FIG. 3, in accordance with one embodiment of the present invention.

FIG. 5 is an exemplary database structure for resume database 302 shown in FIG. 3. Resume database 302 comprises candidate table 510, job table 520, mapping table 530, XML table 540, and resume table 550. In another embodiment, the system distributes the tables that comprise resume database 302 among several computers configured similarly to resume management and recruitment workflow system 140. In another embodiment, resume database 302 also includes tables containing candidate activities and notes, job activities and notes, recruiter table and level of authorization, recruiter activities and notes, as well as joining tables to optimize the storage and performance of the system for an ideal normalization level. The distributed architecture will improve load balancing by distributing the processing required to populate, search, maintain, and backup the database.

Candidate Table

Candidate table 510 stores information related to each candidate such as data extracted from the candidate's resume, data entered by the candidate or an administrator on behalf of the candidate and notes and recruitment activities entered by recruiter 120a, pertaining to the candidate. The data extracted from the candidate's resume and the data entered by the candidate or an administrator on behalf of the candidate include personal identification and contact information, work experience data, job assignment descriptions, education credentials, job skills, and other experience-related phrases. The notes input by the recruiter include a synopsis of conversations between the candidate and the recruiter, the candidate's interview schedule, and the candidate's availability status.

Job Table

Job table 520 stores information related to each job or position that a hiring manager needs to fill such as requirements for a job and notes relating to candidates for the job. Job table 520 includes the employer or hiring manager identification and contact information, the recruiter identification information, if different from the employer or hiring manager, the requirements for the job, and the notes and recruitment activities pertaining to the job. The requirements for the job include the work location, the duration of the job assignment, and the pay scale. The requirements for the job also include required skill or experience-related phrases and their alternatives, and the required minimum duration of experience for each required skill or experience-related phrase, and the required minimum duration of experience for each stated alternative of each skill or experience-related phrase. The requirements for the job allow for the exclusion of candidates, who fit criteria similar to the criteria specified herein as the required candidate's inclusion criteria. Other inclusion and exclusion conditions may include geographic locations (states), area codes, salary ranges, and educational levels. The notes relating to candidates for the job include a synopsis of conversations between the candidate, the recruiter, and the hiring manager, as well as a list of the interviewees for the job.

Mapping Table

Mapping table 530 retains the broad and narrow phrases of phrases encountered by resume parser program 312. A definition of "phrase" includes one or more consecutive words. Phrase A is broad phrase of phrase B when phrase B implies phrase A. Likewise, phrase B is a narrow phrase of phrase A when phrase B implies phrase A. Phrase A and phrase B are synonymous when phrase A is a narrow and broad phrase of phrase B and vice versa. A detailed discussion of mappings in this system is in the disclosure of phrase mapping program 313. Mapping table 530 attempts to include any phrase that might appear in a resume and that might have possible broad and narrow phrases. Mapping table 530 is utilized by phrase mapping program 313 as a thesaurus of phrases implying other phrases. Mapping tables 530 also includes the exceptions when a supposedly broad or narrow phrase is not broad or narrow because of context. For instance, experience in 'bank' does not imply 'banking' experience when 'bank' appears in the resume in the context of 'data bank'.

XML Table

XML table 540 retains the rows of XML resume 410 and points to resume table 550, which contains resume 115a, in a one-to-one correspondence between XML resume 410 of XML table 540 and resume 115a of resume table 550. Resume parser program 312 and phrase mapping program 313 convert resume 115a of candidate 110a into the exemplary rows comprising XML resume 410 as shown in FIG. 4. For each resume, there is a resume identifying tag followed by extracted attributes from resume 115a for candidate 110a. Within the outer <resume> tag, there is tag <S000>, which contains all the narratives that did not belong to job experiences that have a start-date and an end-date or a distinct duration of time. Nested within the <S000> tag are tags that labeled by duration of time and nested in an ascending order of the value of the duration. These are 'duration tags' and have a length that is a duration of time. The duration tags are system-wide predefined to constitute an ascending series of values for duration. These duration tags can be in any unit of time. Again, the values of the data elements of the series are in ascending order with no other pattern. Their selection is established to produce optimal performance. Whether it is a subset or a superset of another phrase within resume 115a, each experience-related phrase is identifiable as an entity and is stored in XML resume 410. Although the words of an experience-related phrase might overlap with the words of other experience-related phrases, as a separate entity, each experience-related phrase appears once and only once in XML resume 410 of resume 115a. For each resume 115a, resume parser program 312 and phrase mapping program 313 store experience-related phrases within a duration tag whose value, among the duration tags in the series, is the largest that is smaller than the maximum possible duration of experience of the experience-related phrase. Again, the maximum possible duration (maximum-total-duration) of experience of an experience-related phrase is the total duration of all the jobs during which the experience-related phrase appeared in resume 115a. The maximum-total-duration is the maximum duration that can be derived from resume 115a for the experience-related phrase.

The value of duration tags is an ascending series of numbers each representing a time period. Since resumes traditionally contain job start-dates and end-dates down to a specific day, the value of the duration tags can possibly be in days. In another embodiment, the value of individual duration tags is in a number of seconds, minutes, hours, days, weeks, months, years, or decades. An example is that the value of a duration tag can be five days; two and a half months; and one year, three quarters, and half a month. For all resumes within a single implementation of the resume management and recruitment workflow system 140, the chosen series of values for the duration tags is the same. In another embodiment, a different series can be chosen for each recruiter 120a or each team 125 as long as they are searching within their exclusive private pool of resumes. One of the factors in establishing the values of the series of the duration tags is performance. For example, smaller values of the duration tags will result in larger consumption of storage space by the XML table 540 and vice versa. Smaller values will create extra work for resume parser program 312 and vice versa. When the values of the duration tags are smaller, resume searching program 315 retrieves a more accurate list of matching candidates and vice versa.

In another embodiment, each experience-related phrase and its maximum-total-duration tag make up an indexed composite key to a table (referred to in this disclosure as the substitute-to-XML-table) that substitutes XML table 540 but likewise points to resume table 550. For each experience-related phrase, the substitute-to-XML-table include additional records that have an indexed composite key comprising the experience-related phrase and each value of the tag series that would have been an XML duration tag and is less than the maximum-total-duration. In other words, the series duration values, which would have been used in the XML duration tags and that are smaller than the maximum-total-duration, are utilized in conjunction with the experience-related phrase to make up composite keys to the substitute-to-XML-table. For each such distinct composite key, there is a record in the substitute-to-XML-table pointing to resume table 550. A search that requires a minimum duration of experience in an experience-related phrase would first locate in the series of values of duration tags the smallest value that is larger than the required minimum duration. Then the experience-related phrase along with the located tag value will make up a search key to the substitute-to-XML-table. Resume 115a contained in resume table 550 is pointed to by the substitute-to-XML-table record whose composite key is made up of the required experience-related phrase and the located (duration tag) value in XML resume 410. It is to be understood that this single experience-related phrase search scenario is expandable to include more than one experience-related phrase in a Boolean or intuitive layout as per the acceptable input to resume searching program 315.

In one embodiment, the search criteria entered in resume searching program 315 generates a virtual look-up in XML table 540 or substitute-to-XML-table for each experience-related phrase mentioned in the criteria. In another embodiment, the output of the multiple look-ups for the multiple experience-related phrases are combined to result in a list of resumes that are true to the total criteria and are a match to the search or job requirements. In another embodiment, different database management systems handle the prioritization and concurrency of the execution of searches that require a join between multiple sub-output of the same search in differing manners. The utilization of XML to store and retrieve resume information is independent of and has no relation to the utilization of XML by the XML resume library system sponsored by the Open Source software development web site, the HR-XML Consortium, SourceForge.net, or any other implementation that utilizes XML to store resume or career-related data.

XML table 540 also stores the date on which the resume was received or latest updated and refers to this date as the date created. XML table 540 stores this creation date multiple times in individual units of time. The units of time can be seconds, hours, days, months, years, or any fraction, multiple or combination thereof. So, the creation date is a point in time, which is a multiple of a unit of time, so many units away from an origination date of the count. For instance, the origination date could be Jan. 1, 1980 and the creation date could be Mar. 10, 1983. In month units of time, the Mar. 10, 1983 will be 39. The 39 represents 39 months away from Jan. 1, 1980.

XML table 540 also stores the educational degree in nested tags that represent all the degrees lower or equal to the degree earned by candidate 110a. Within the nest, the field of specialization, the year the degree was earned, and the school from which it was earned are stated.

XML table 540 also stores the salary desired by candidate 110*a*. XML table 540 stores the desired salary multiple times in individual dollar units. The dollar units can be in individual dollars or in multiples of dollars. For example, the stored desired salary can be 36,000 individual dollars or equivalently seven five thousand dollars, where individual dollars and five thousand dollars are the dollar units respectively. Resume management and recruitment workflow system 140 rounds the desired salary to the highest multiple of a dollar unit that is smaller than the desired salary.

Resume Table

Resume table 550 retains resume 115*a* in its original shape, form and content. Resume table 550 retains an unaltered copy of resume 115*a*, as it was received from the sender by resume management and recruitment workflow system 140, whether resume 115*a* was electronically mailed, cut-and-paste, uploaded, bulk loaded, or generated by resume maker program 317 for resume management and recruitment workflow system 140. The copy of resume 115*a* in resume table 550 gets displayed for the recruiter or other users to view in step 630 and in step 930.

Figure 6:
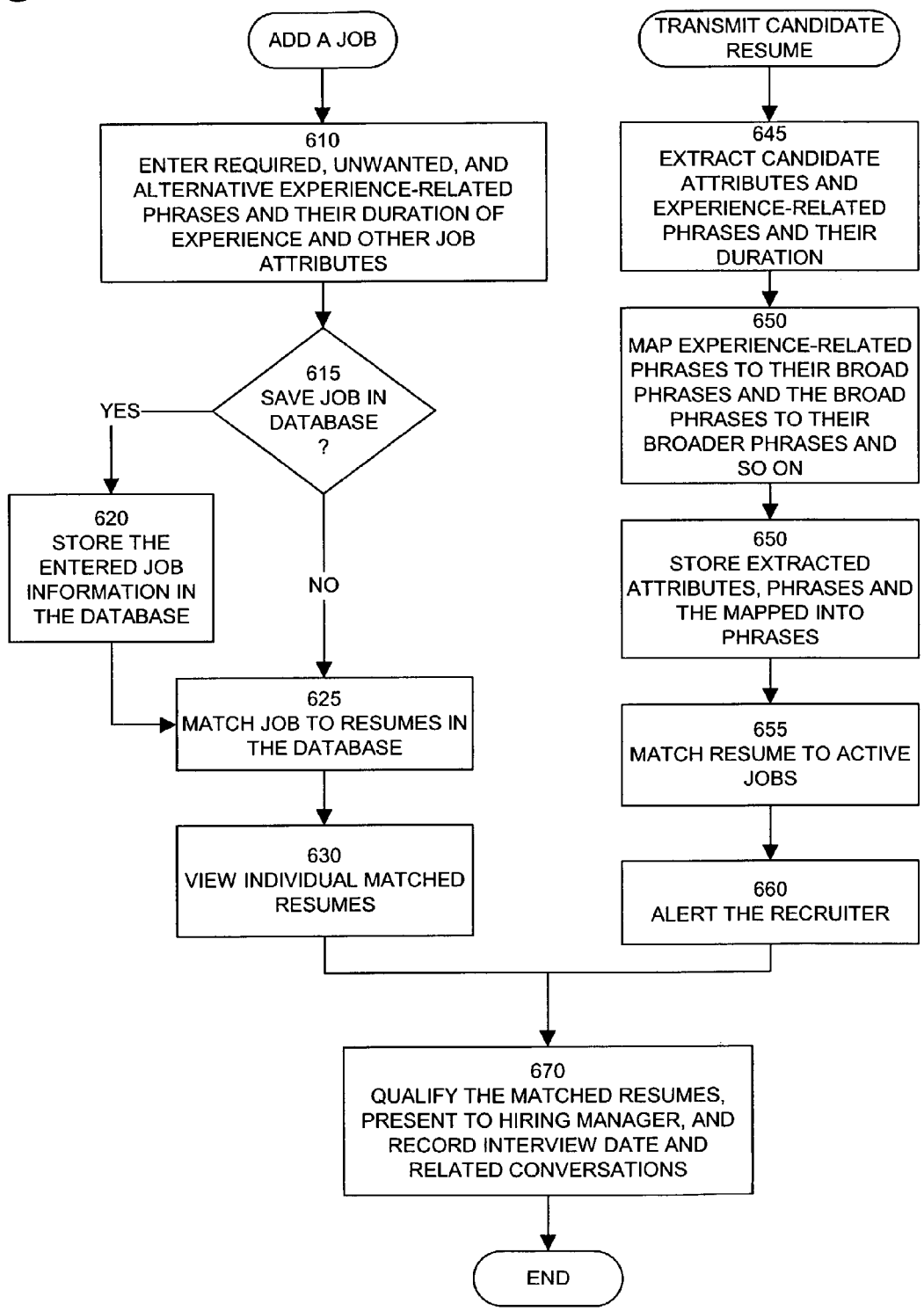

FIG. 6 is a flow diagram of an embodiment of resume management and recruitment workflow system 140 receiving a job requirement from recruiter 120*a* or adding a resume from candidate 110*a*. Recruiter 120*a* initiates the process of adding a job to resume management and recruitment workflow system 140. Recruiter 120*a* enters a list of required and alternative experience-related phrases and the minimum duration of experience that is required in each phrase for candidate 110*a* (step 610). For each required experience-related phrase in the list, recruiter 120*a* may specify a list of alternate experience-related phrases. For example, if recruiter 120*a* wishes to consider candidates with a minimum two years of experience in the Java programming language, recruiter 120*a* may list alternative skill or experience-related phrases such as one and a half years of experience in C++ or three years of experience in PASCAL. Thus, a search will return any candidate with two years of experience in Java, the required skill or experience-related phrase, one and a half years of experience in C++ (a listed alternative) or three years of experience in PASCAL (another listed alternative). Recruiter 120*a* may exclude candidates who meet similarly structured criteria of a different set and/or combination of experience-related phrases. An example would be: two years in Java and either one and a half years in C++ or three years in PASCAL, but not to include those candidates who have two years in brokerage and one year of management or whose Java experience is over five years. In addition, recruiter 120*a* may also list some attributes, such as educational level or field of specialization, geographic location, and desired salary, which would be required of candidate 110*a* to be a match to the job.

Resume management and recruitment workflow system 140 determines whether recruiter 120*a* wants to save the entered job description to resume database 302 (step 615). If recruiter 120*a* requests to save the job, resume management and recruitment workflow system 140 stores the entered job information (step 620), as well as all the listed requirements, and matches the requirements for the new job to resume database 302 (step 625). If recruiter 120*a* does not request to save the job, resume management and recruitment workflow system 140 performs an instantaneous check of resume database 302 and matches the requirements for the new job to resume database 302. Recruiter 120*a* views each resume retrieved by the search performed (step 630). Recruiter 120*a* qualifies the matched resumes and presents the qualified resumes to hiring manager 130*a* (step 670). Recruiter 120*a* documents any interview or hiring as part of a candidate's history, if desired. Note that recruiter 120*a* and hiring manager 130*a* can be the same and each may be the employer or a representative acting on behalf of the employer.

FIG. 6 also provides an overview of the process of transmitting resume 115*a* for candidate 110*a* to resume management and recruitment workflow system 140. Candidate 110*a* or somebody on behalf of the candidate initiates transmission of resume 115*a* to resume management and recruitment workflow system 140. Resume management and recruitment workflow system 140 extracts the candidate's attributes from resume 115*a*, as well as the candidate's experience-related phrases and the maximum-total-duration of experience for each experience-related phrase (step 645). Resume management and recruitment workflow system 140 stores resume 115*a* in resume table 550 and the extracted information in XML table 540 of resume database 302 (step 650). In addition, resume management and recruitment workflow system 140 stores information on job experiences such as title, company name, department name, location, other job header data, and the job duration in candidate table 510 of resume database 302. Resume management and recruitment workflow system 140 stores the output of resume parser program 312 in candidate table 510 of resume database 302. Again, the output of resume parser program 312 includes each experience-related phrases and the associated maximum-total-duration of experience tag and all the broad phrases of the experience-related phrases and the maximum-total-duration of experience tags of the broad phrases. Resume management and recruitment workflow system 140 matches the newly received resumes to any active jobs listed in resume database 302 (step 655). Again, each matching candidate has a resume that contains the set of experience-related phrases or their narrow terms at a maximum-total-duration of experience that exceeds the required minimum duration of experience for each of the experience-related phrases or their alternatives that are required by the job. Resume management and recruitment workflow system 140 alerts recruiter 120*a* if there is a match between the resume and the job posted by recruiter 120*a* (step 660). Recruiter 120*a* qualifies the matched resumes and presents the qualified resumes to hiring manager 130*a* (step 670). Recruiter 120*a* may document any interview or hiring activity as part of a candidate's history and job's history, if desired. Note that recruiter 120*a* and hiring manager 130*a* can be the same person and each may be the employer or a representative acting on behalf of the employer.

Figure 7:
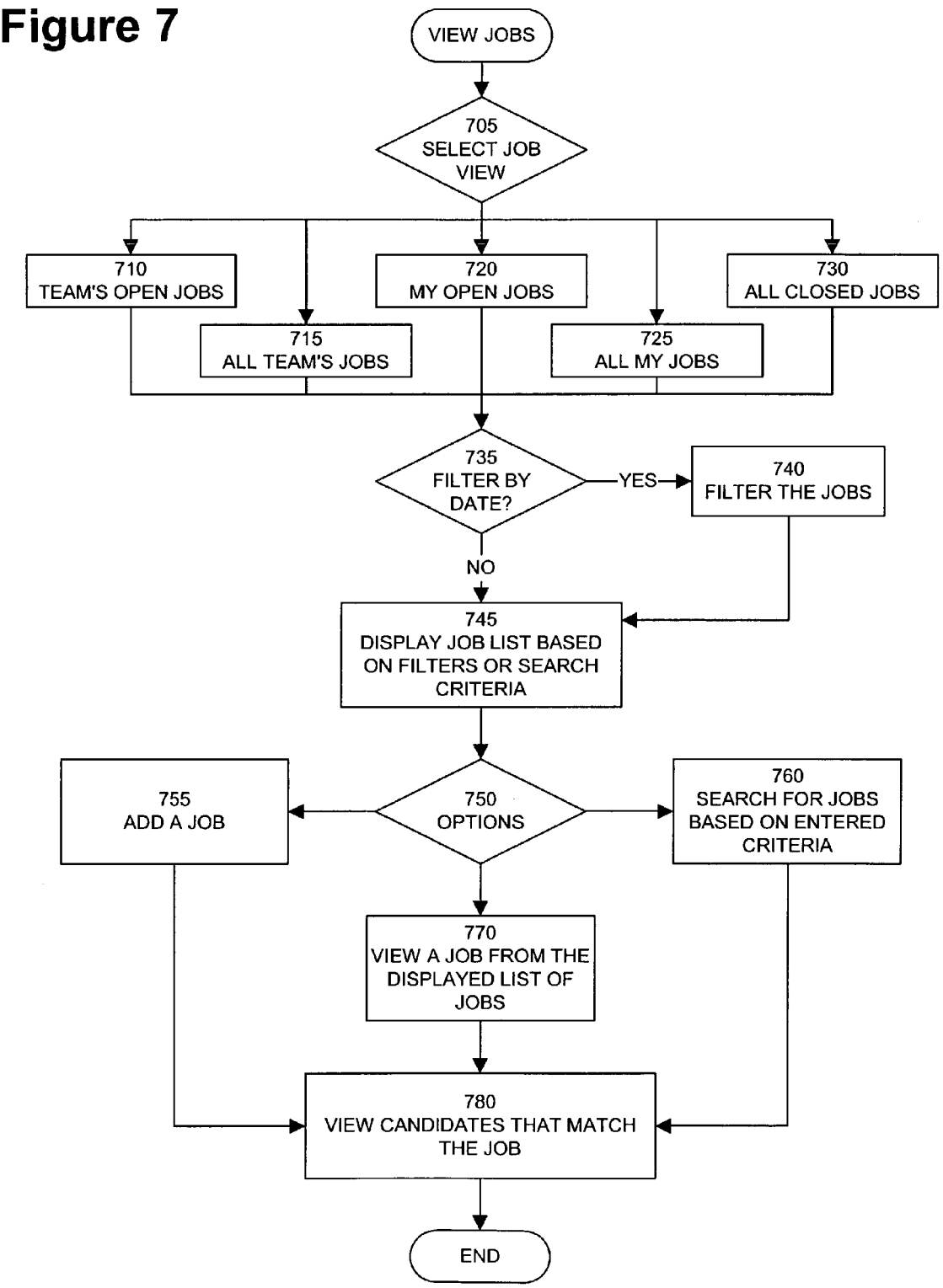
FIG. 7 is a flow diagram of an embodiment of resume management and recruitment workflow system 140 displaying a list of jobs, searching through previously entered and stored job descriptions and their specifications, and adding a new job and its description and specification.

FIG. 7 is a flow diagram of an embodiment of resume management and recruitment workflow system 140 displaying a list of jobs, searching through previously entered and stored job descriptions and their specifications, and adding a new job and its description and specification. A recruiter begins using the system by selecting a category for viewing jobs (step 705). A member of a recruitment team (e.g., recruiter 120*b* of recruitment team 125) may select to view all the open jobs for every member of the recruitment team (e.g., recruiter 120*b* and recruiter 120*c*) (step 710). A member of a recruitment team (e.g., recruiter 120*b* of recruitment team 125) may select to view all the jobs ever created (i.e., both open and closed jobs) by any member of the recruitment team (e.g., recruiter 120*b*, or recruiter 120*c*) (step 715). A recruiter (e.g., recruiter 120*a*, recruiter 120*b*, or recruiter 120*c*) may select to view all, open jobs posted by the recruiter (step 720). A recruiter (e.g., recruiter 120*a*, recruiter 120*b*, or recruiter 120*c*) may select to view all the jobs ever created (i.e., both open and closed jobs) by the recruiter (step 725). A recruiter (e.g. recruiter 120a, recruiter 120b, or recruiter 120c) may select to view all the closed jobs owned by the recruiter (step 730).

Once the recruiter has made a selection and resume management and recruitment workflow system 140 displays a list of jobs, the user decides whether to filter the jobs by the posting date (step 735). If the recruiter requests to filter the jobs by the posting date (step 740), the jobs are actually filtered and a list is displayed to the recruiter (step 745). If the recruiter does not want to filter the jobs by the posting date (step 745), the unfiltered jobs are displayed in a list to the recruiter. The recruiter has an option (step 750) to either add a new job to resume database 302 (step 755), search for an existing stored job based on specific criteria (step 760), or view a job from the displayed list of jobs (step 770). The recruiter may view a list of candidates who match the job (step 780). Each matching candidate has a resume that contains the required set of experience-related phrases, their alternatives, or the narrow terms of the original experience-related phrases or their alternatives at a maximum-total-duration of experience that exceeds the required minimum duration of experience for each of the experience-related phrases or their alternatives that are required by the job. The recruiter may view the resume of a candidate that matches the displayed job (step 780).

Figure 8:
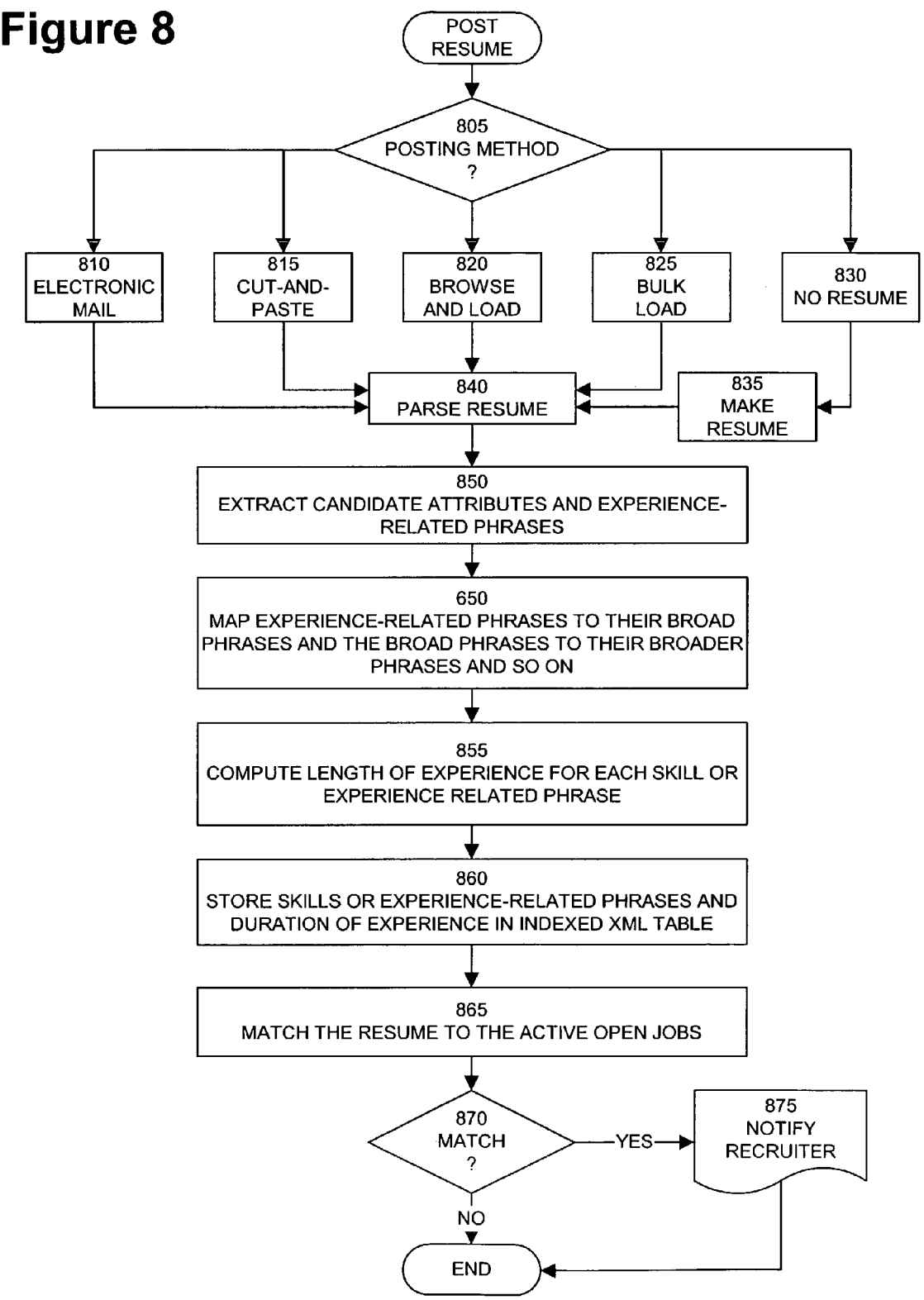
FIG. 8 is a flow diagram of an embodiment of resume management and recruitment workflow system 140 parsing resume 115a, storing its parsed data in resume database 302 and matching resume 115a and its candidate 110a to a stored job, if applicable.

FIG. 8 is a flow diagram of an embodiment of resume management and recruitment workflow system 140 parsing resume 115a, storing its parsed data in resume database 302 and matching resume 115a and its candidate 110a to a stored job, if applicable. Candidate 110a initiates the posting of a resume. Candidate 110a selects one method for posting resume 115a to resume management and recruitment workflow system 140 (step 805). Resume management and recruitment workflow system 140 accommodates candidate 110a sending the resume as an attachment to an electronic mail message (step 810) or making a digital copy of the resume in another application and pasting the digital copy into user interface program 310 (step 815). Resume management and recruitment workflow system 140 also accommodates candidate 110a operating user interface program 310 to browse a file directory listing, select a file that includes the resume, and upload the resume to the resume management and recruitment workflow system 140 (step 820). Resume management and recruitment workflow system 140 also accommodates a user uploading at least one resume in a bulk upload (step 825) or, if candidate 110a does not have a prepared resume, operating resume maker program 317 to author a new resume (step 835).

After candidate 110a uploads resume 115a to resume management and recruitment workflow system 140, the process flow shown in FIG. 8 parses the resume (step 840). Steps 840, 850, and 855 represent resume parser program 312 and phrase mapping program 313. Resume management and recruitment workflow system 140 extrapolates attributes for candidate 110a (step 850). Resume management and recruitment workflow system 140 computes the maximum length of experience (i.e., maximum-total-duration) that each of the experience-related phrases can have and assigns the maximum-total-duration XML tag as an attribute to the experience-related phrase for resume 115a of candidate 110a (step 855). An experience-related phrase is any one or more consecutive words that appear in a job assignment description within a resume. All the broad phrases of experience-related phrases are also experience-related phrases.

Resume management and recruitment workflow system 140 stores every experience-related phrase that candidate 110a lists in resume 115a, including all broader phrases (step 860) in XML table 540. In XML table 540, resume management and recruitment workflow system 140 writes the experience-related phrase within a duration tag whose value is smaller than the maximum-total-duration of the experience-related phrase and is the largest in a pre-defined series of duration tags. Resume management and recruitment workflow system 140 matches resume 115a to all active open jobs (step 865). If resume management and recruitment workflow system 140 determines that resume 115a matches the requirements of an open job (step 870), resume management and recruitment workflow system 140 proceeds to notify recruiter 120a (step 875). In one embodiment, the notification means is an electronic mail message. However, any method of communication (e.g., telephone, facsimile, or letter carrier) by recruiter 120a or automatically by resume management and recruitment workflow system 140 that notifies candidate 110a of the match is sufficient. If resume management and recruitment workflow system 140 does not find a match, the process ends with no further action.

Figure 9:
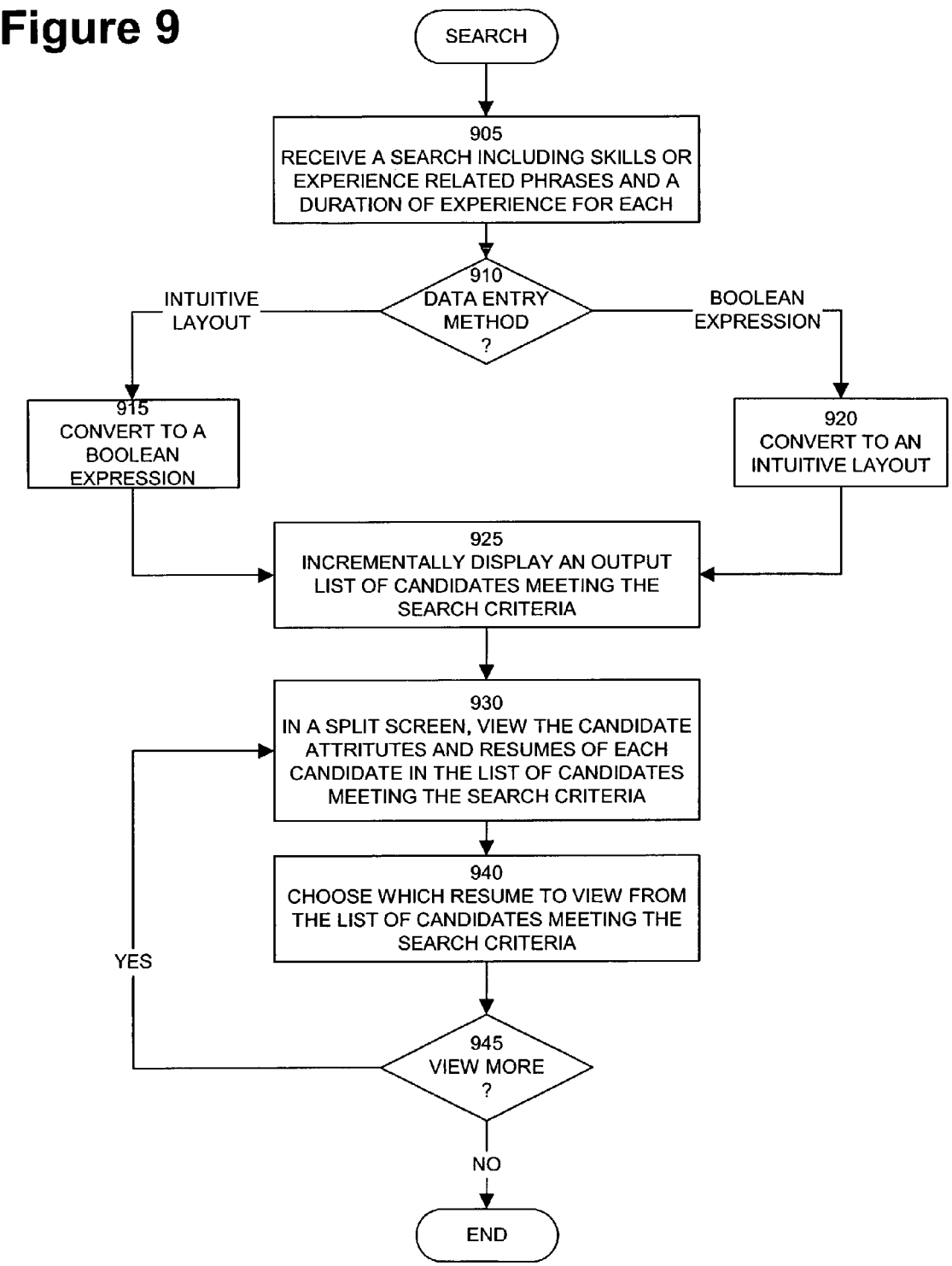

FIG. 9 is a flow diagram of an embodiment of resume management and recruitment workflow system 140 searching resume database 302 for a list of resumes and, therefore, candidates that meet a set of requirements input by recruiter 120a. One shown candidate at a time, resume management and recruitment workflow system 140 allows recruiter 120a to view, the attributes, experiences and resumes of all or chosen candidates from the list. Recruiter 120a initiates the search for resume 115a that meets a given search criteria.

Recruiter 120a enters a list of all the skill or experience-related phrases sought in candidate 110a (step 905). Recruiter 120a may enter a skill or experience-related phrase required in a candidate by providing an exact description, a representative phrase of it, or any other acronym, skill name or experience-related phrase that may describe or stand for the skill or the experience-related phrase. Recruiter 120a may enter one or more alternative experience-related phrases that can identify alternates to the previously entered and required experience-related phrase. Each of these alternatives can fully substitute the need for the original phrase in the resume and can, therefore, satisfy the full need of the requirement for the original skill or experience-related phrase. For example, if the original phrase is "Oracle", recruiter 120a might be satisfied with a resume that contains "Sybase" or "Informix" as possible alternatives. Note that this searchable alternative to the experience-related phrase in resume management and recruitment workflow system 140 should not be confused with the phrase mapping feature of the resume management and recruitment workflow system 140. At search time, narrow phrases of the required experience-related phrase or its stated alternatives by recruiter 120a are implicit alternatives in resume 115a to the required experience-related phrase or its stated alternatives by recruiter 120a. Thus, the narrow phrases are transparent to recruiter 120a. Resume management and recruiter workflow system 140 will retrieve resumes that contain the narrow phrases of the required experience-related phrases or the narrow phrases of the alternatives stated by recruiter 120a as matching resumes. The term 'implicit' is utilized because the broad phrase might not exist in resume 115a. When resume 115a arrives, resume management and recruitment workflow system 140 maps the narrow phrase to its broad phrases and additionally inserts the broad phrases in XML table 540. These broad phrases might be the phrases that comprise all or part of the search criteria. Although these broad phrases might not have existed in resume 115a or in all the resume jobs in which they need to exist, they caused the match to occur and therefore the narrow phrases had an indirect implicit effect on satisfying the match.

Furthermore, recruiter 120a may provide a required minimum length of experience for any of the skill or experience-related phrases that comprise the search, whether the phrases are those originally required or their alternatives as stated by recruiter 120a. To fulfill the requirement of recruiter 120a, the required minimum length of experience of the experience-related phrase or its stated alternatives has implications on the requirement of the narrow phrase, referred to in the previous paragraph, whether the narrow phrase is combined with its required broad phrase or not. Again, note that the mapping of the narrow phrase to the broader required phrase took place when the resume was received by resume management and recruiter workflow system 140 and not at search time. Resume parser program 312 and phrase mapping program 313 had already mapped the narrow phrase, which appeared in the original incoming resume 115a of candidate 110a, to all its possible broad phrases among which happened to be the required phrase or its alternatives. These broad phrases were stored in XML resume 410 as experience-related phrases and their maximum-total-duration is at least the maximum-total-duration of the narrow phrase from which they were derived. Thus, the value of duration tag of the broad phrases is at least the value of the duration tag of the narrow phrase from which they were derived. For example, a resume might have two jobs; one three-year job containing Java and another four-year job containing JSP. Let's say that mapping table 530 has Java as a broad phrase of JSP. Assuming that JSP does not appear in the three-year job, the maximum-total-duration of JSP is four years while Java is seven years. Assuming that the duration tag series is small enough, a search that requires a minimum of five years of Java will be satisfied thanks to the JSP narrow phrase that contributed an additional four years to the Java three years mentioned experience to a total of seven years. That is, at search time, the narrow phrases contributed to the expansion of the value of the duration of the broad phrase and therefore, enabled the broad phrase to meet the requirement of recruiter 120a.

Resume management and recruitment workflow system 140 determines whether recruiter 120a entered the search criteria in the intuitive layout or as a Boolean expression (step 910). If recruiter 120a entered the search data in an intuitive layout, the process converts the search data to a Boolean expression (step 915) and displays both the intuitive layout and the Boolean expression to recruiter 120a. If recruiter 120a entered the search data as a Boolean expression, the process converts the search data to an intuitive layout (step 920) and displays both the Boolean expression and the intuitive layout to recruiter 120a. Thus, whether the user chooses the intuitive layout or the Boolean expression as the method of data entry, resume management and recruitment workflow system 140 converts the search data to the other method of data entry and displays both forms of the search expression to recruiter 120a.

In the intuitive layout form of data entry, recruiter 120a enters a list of phrases required for a job opening into resume management and recruitment workflow system 140. Resume management and recruitment workflow system 140 combines the phrases that comprise the list using a Boolean "and" between each phrase. Since each phrase may also include alternatives, resume management and recruitment workflow system 140 combines the alternatives using a Boolean "or" between each alternative. The resulting expression is the intersection (i.e., Boolean "and") of a number of unions (i.e., Boolean "or") of phrases. The expression "(A or B) and (C or D or E)" is an example that might result from the intuitive layout of data entry of the search criteria.

Additionally, note that this representation of an intersection of a number of unions of phrases is a representation that can cover the union of a number of intersections of phrases. For example, if the requirement is for the union of the intersection of phrases: "(A and B) or (C and D and E)", then the requirement is equivalent to the following intersection of unions acceptable as an input to the intuitive layout of data entry for the criteria: "(A or C) and (A or D) and (A or E) and (B or C) and (B or D) and (B or E)". It is to be understood that "(A and B) or (C and D and E)" is equivalent to "(A or C) and (A or D) and (A or E) and (B or C) and (B or D) and (B or E)". This conversion is important because the intuitive layout form of data entry accepts a required list of and'ed phrases each of which is or'ed with a number of alternatives. Or'ing of lists of and'ed phrases will be converted to and'ing of or'ed phrases. Note that the intuitive layout form of data entry referred to here, which is and'ing the or's, is closer to the way people select a meal from a multiple course menu. We select one appetizer from a list of or'ed few, one main course from a list of or'ed few, one drink from a list of or'ed few, one desert from a list of few, and so on. Then, we join (and) the selected list of items, skipping some at times. For example, we might pass on the drink. The selection from this food menu is the and'ing of or'ed items. In fast food chains, we select meals, each of which, make up an and'ing of items. We can select one or more of the meals through a choice from an or'ing of the and's. Again, as stated above, both methods of setting up a search criteria can be represented or converted to the intuitive layout of and'ing multiple or's.

Since resume management and recruitment workflow system 140 accommodates the intersection of multiple unions and, thereby the union of multiple intersections along with the negation or exclusion of a similar intersection or union, the search covers all possible search criteria that a job opening might require of an individual. Required complex nested Boolean phrases can be easily broken down to the intersection of unions or the union of intersections and therefore can all be covered by the intuitive layout. Purging the output list of resumes from rejected resumes, which are true to another combination of phrases that adhere to another Boolean expression or input through the intuitive layout, accommodates the possible negation in a Boolean expression. In other words, the output of a list of required skill or experience-related phrases and their alternatives can be cut down by the resumes that adhere to some unwanted similar combination of phrases.

The intuitive approach for entering the search improves the usability of resume management and recruitment workflow system 140 because recruiter 120a does not need to type a Boolean expression. On the other hand, the Boolean expression approach for entering the search improves the flexibility of resume management and recruitment workflow system 140. Whether recruiter 120a enters a list of required skill or experience-related phrases and alternatives or enters a Boolean statement, resume management and recruitment workflow system 140 converts one form to the other and displays both forms to the user. Resume management and recruitment workflow system 140 also provides the user with interface tips and feedback on obvious errors in data entry. Additionally, resume management and recruitment workflow system 140 provides spelling checks for phrases searched and for notes on the candidates.

Resume management and recruitment workflow system 140 displays a list of candidates meeting the criteria entered by recruiter 120a (step 925). The system provides a split-screen view that displays the candidate attributes in one portion and the individual resume in the other portion (step 930). The resumes are displayed for each candidate that recruiter 120a selects to view by selecting one candidate's name from the list of the candidates displayed by resume management and recruitment workflow system 140. Recruiter 120a chooses which resume to view from the list of the candidates that meet the search criteria (step 940).

Resume management and recruitment workflow system 140 determines whether recruiter 120a wants to view additional resumes for other possible candidates (step 945). If recruiter 120a decides to view additional resumes, the process flow returns to step 930 otherwise, the process flow ends.

According to one embodiment, resume management and recruitment workflow system 140 incrementally displays the output of a search for resumes that fit the search criteria. Resume management and recruitment workflow system 140 retrieves and displays the outcome of incremental searches from the resume database 302. The initial batch of resumes displayed will begin with the most recently received or updated resume and proceed backward for a period of time. Subsequent batches of resumes retrieved by resume management and recruitment workflow system 140 will proceed backward further in time. Each search performed by resume management and recruitment workflow system 140 increases the period of time that the search covers by going back further in time. Thus, the backward incremental search will have longer leaps into the past as the incremental search continues. Each increment will start where the other increment ended. The search is complete either following an exhaustive search of resume database 302 or the attainment of specified number of resumes that meet the needs of recruiter 120a.

Figure 10:
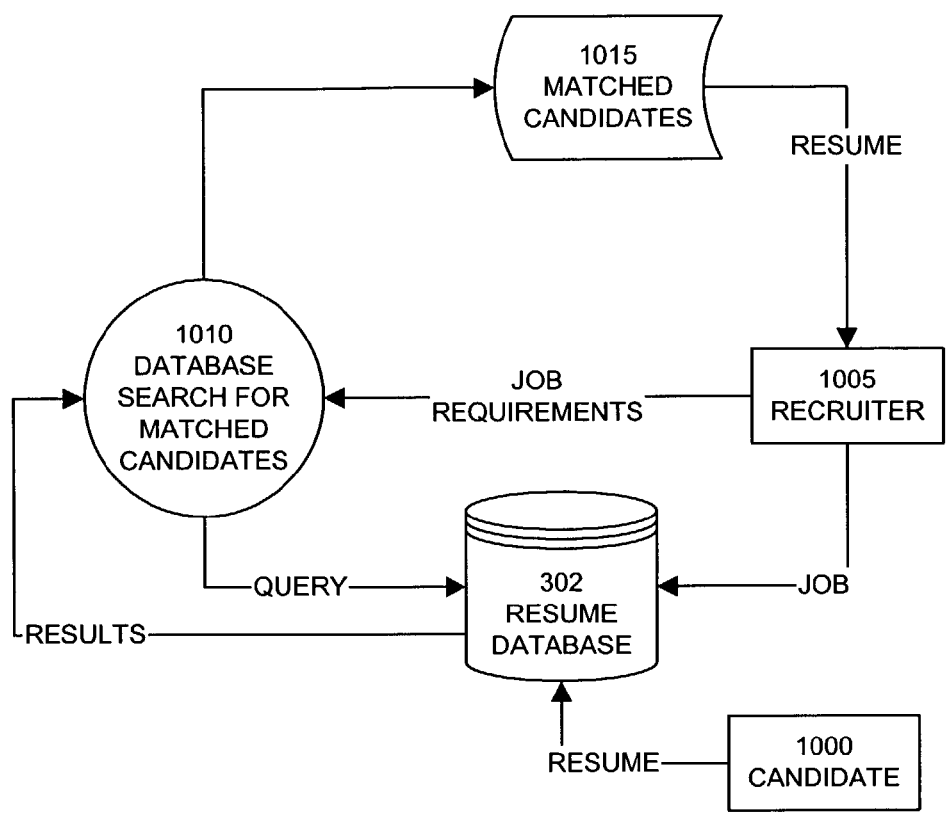
FIG. 10 is a data flow diagram of an embodiment of resume management and recruitment workflow system 140 illustrating an exemplary job search.

FIG. 10 is a data flow diagram of an embodiment of resume management and recruitment workflow system 140 illustrating an exemplary job search. Candidate 110a (shown as box 1000) populates resume database 302 by posting a resume to resume management and recruitment workflow system 140. Recruiter 120a (shown as box 1005) stores a description for a job in resume database 302. Recruiter 1005 also initiates a database search 1010 for matched candidates 1015 by sending the job requirements. The search sends a query to resume database 302 and receives a result set. Resume management and recruitment workflow system 140 stores the result set as matched candidates 1015. Resume management and recruitment workflow system 140 accesses matched candidates 1015 to display the results to recruiter 120a. When recruiter 120a is interested in a candidate, recruiter 120a retrieves the resume from matched candidates 1015.

Figure 11:
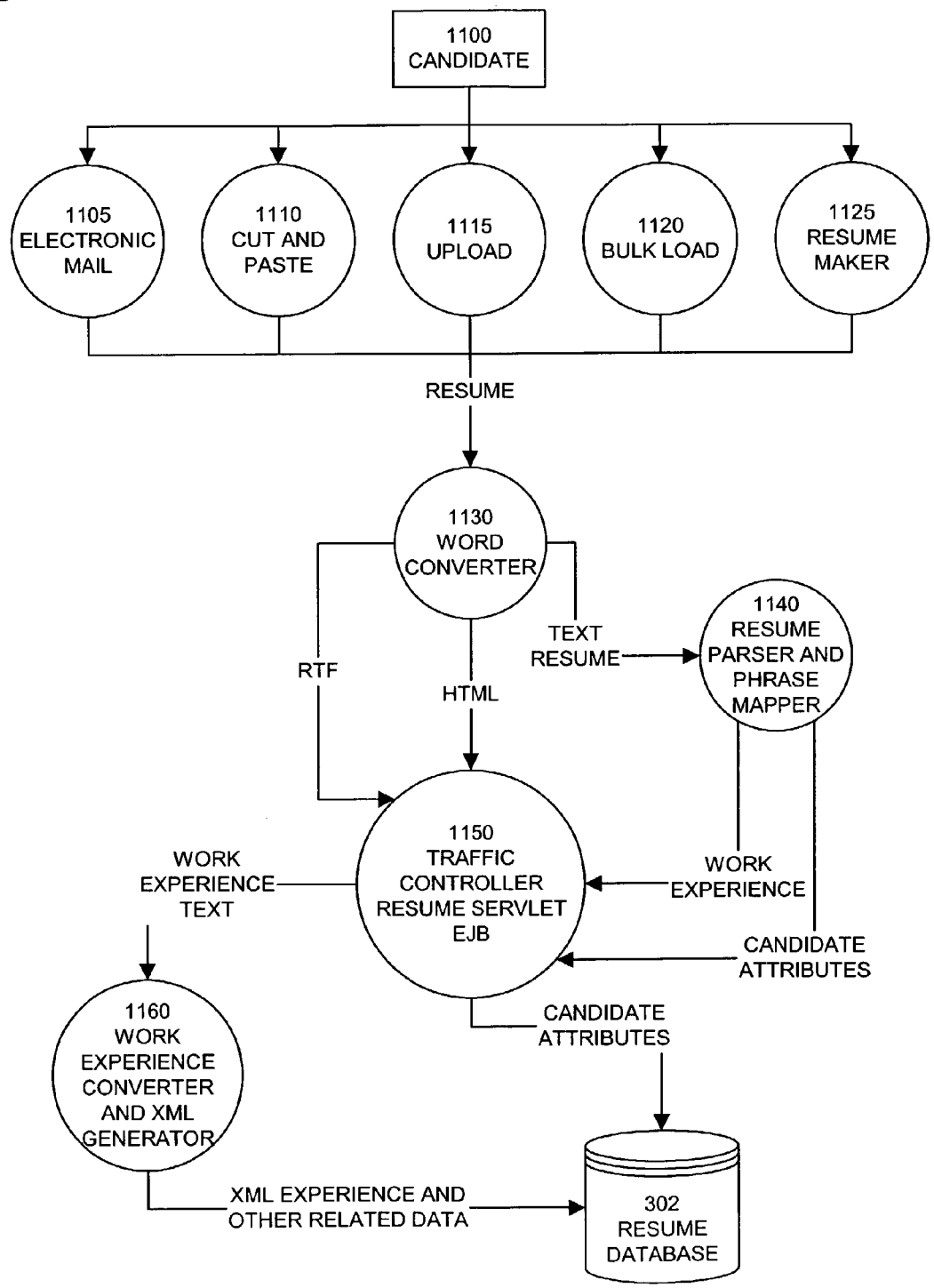
FIG. 11 is a data flow diagram of an embodiment of resume management and recruitment workflow system 140 illustrating the transmission of a resume from candidate 110a to resume database 302.

FIG. 11 is a data flow diagram of an embodiment of resume management and recruitment workflow system 140 illustrating the transmission of a resume from candidate 110a to resume database 302. Initially, candidate 110a (shown in box 1100) provides a resume to resume management and recruitment workflow system 140. Candidate 1100 may input the resume to resume management and recruitment workflow system 140 using electronic mail 1105, cut and paste 1110, upload 1115, bulk load 1120, or use resume maker 1125. Resume management and recruitment workflow system 140 receives the resume in word converter 1130. Word converter 1130 converts the resume into common document formats such as ASCII text, HTML, Rich Text Format (RTF), or the like. Word converter 1130 sends the text form of the resume to the resume parser 1140. Word converter 1130 also sends RTF and the HTML versions of the resume to the traffic controller resume servlet 1150. Resume parser 1140 parses the resume in text format to search for any and all information relating to a candidate work experience, generates the candidate's attributes, and forwards the data to the traffic controller resume servlet 1150.

The traffic-controller resume servlet 1150 forwards all the gathered information in text format to work experience converter and XML generator 1160. Traffic-controller resume servlet 1150 also sends the candidate's attributes to resume database 302 for storage. As discussed above, recruiters ultimately use resume database 302 to search for candidates that may satisfy the recruiter's search criteria, or by candidates to search for desired job openings.

In one embodiment, when matching incoming resumes to job requirements resume management and recruitment workflow system 140 utilizes a search mechanism that reverses the operation of a SELECT statement. The search retrieves all the jobs whose requirements are met by the incoming resume (i.e., the executed SELECT statement retrieves the incoming resume), among other resumes, in its output. This search is the reverse of a search for candidates who meet a job's criteria (i.e., the search is the reverse of a SELECT statement that results in a list of candidates that fit the job and are true to the SELECT statement). Resume management and recruitment workflow system 140 matches the incoming resume to the active jobs by implicitly executing all SELECT statements of all open and active jobs to determine which jobs would have picked up the candidate as a match.

In accordance with one embodiment of the present invention, events entered by recruiter 120a as events along with the various activities of presenting resumes to clients, scheduling interviews and scheduling hires are recorded in a private consolidated calendar for each of the recruiters.

In accordance with one embodiment of the present invention, resume management and recruitment workflow system 140 contains private, semi-private, and public resumes. Private ownership may belong to a recruitment team. Some resumes may belong to individual recruitment teams. Other resumes may still be private, but shared among several recruitment teams. The majority of the resumes are public resumes. Recruitment team members will have access to both the team's private resumes and public resumes and may share notes or activities on any resume or candidate among their individual team members. Team members may not share notes and activities across team boundaries even if the resume is a public resume. Only the owners of a job requirement may be able to modify a job.

Figure 12A:
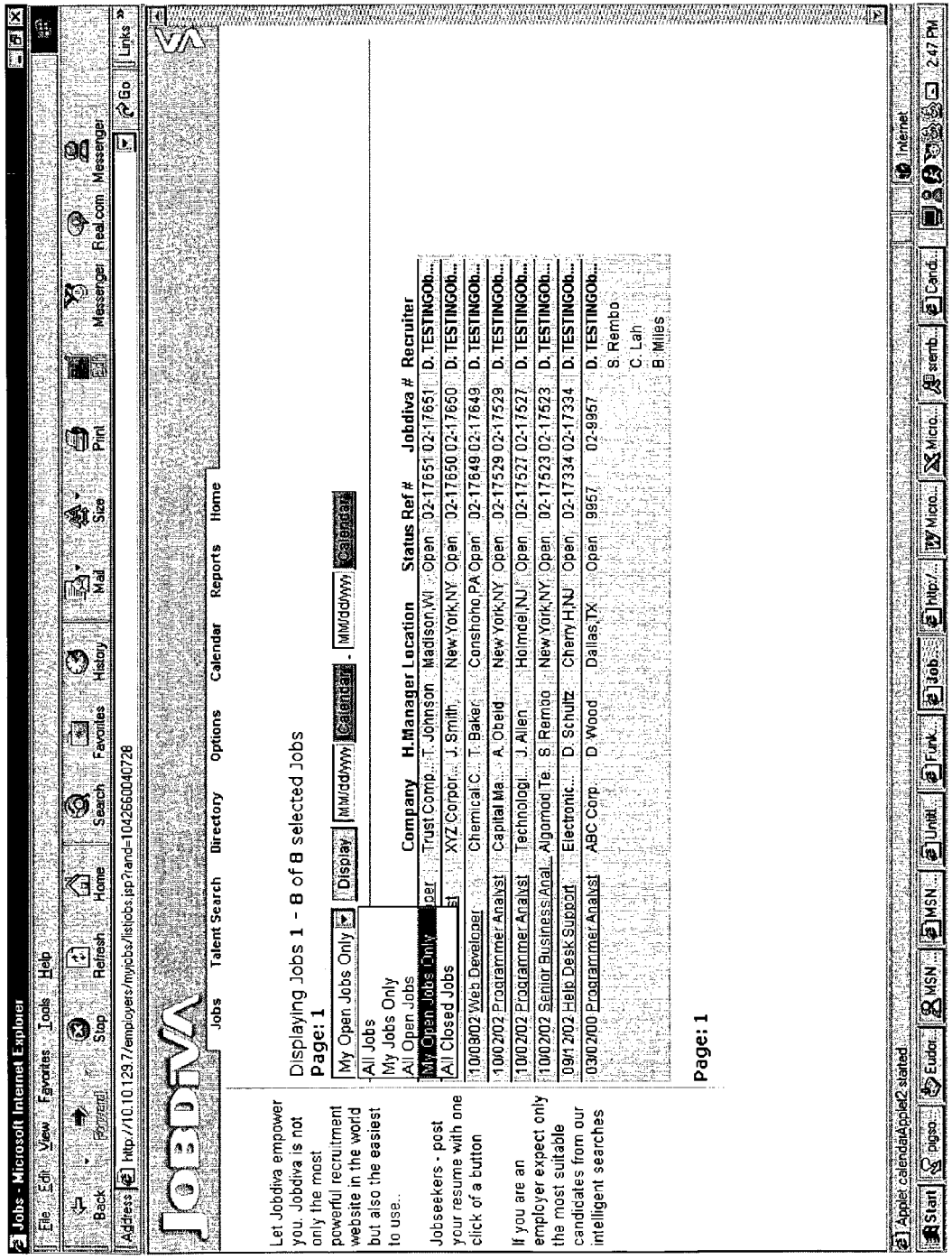
FIGS. 12A through 12L are exemplary screen images from an implementation of resume management and recruitment workflow system 140.
Figure 12B:
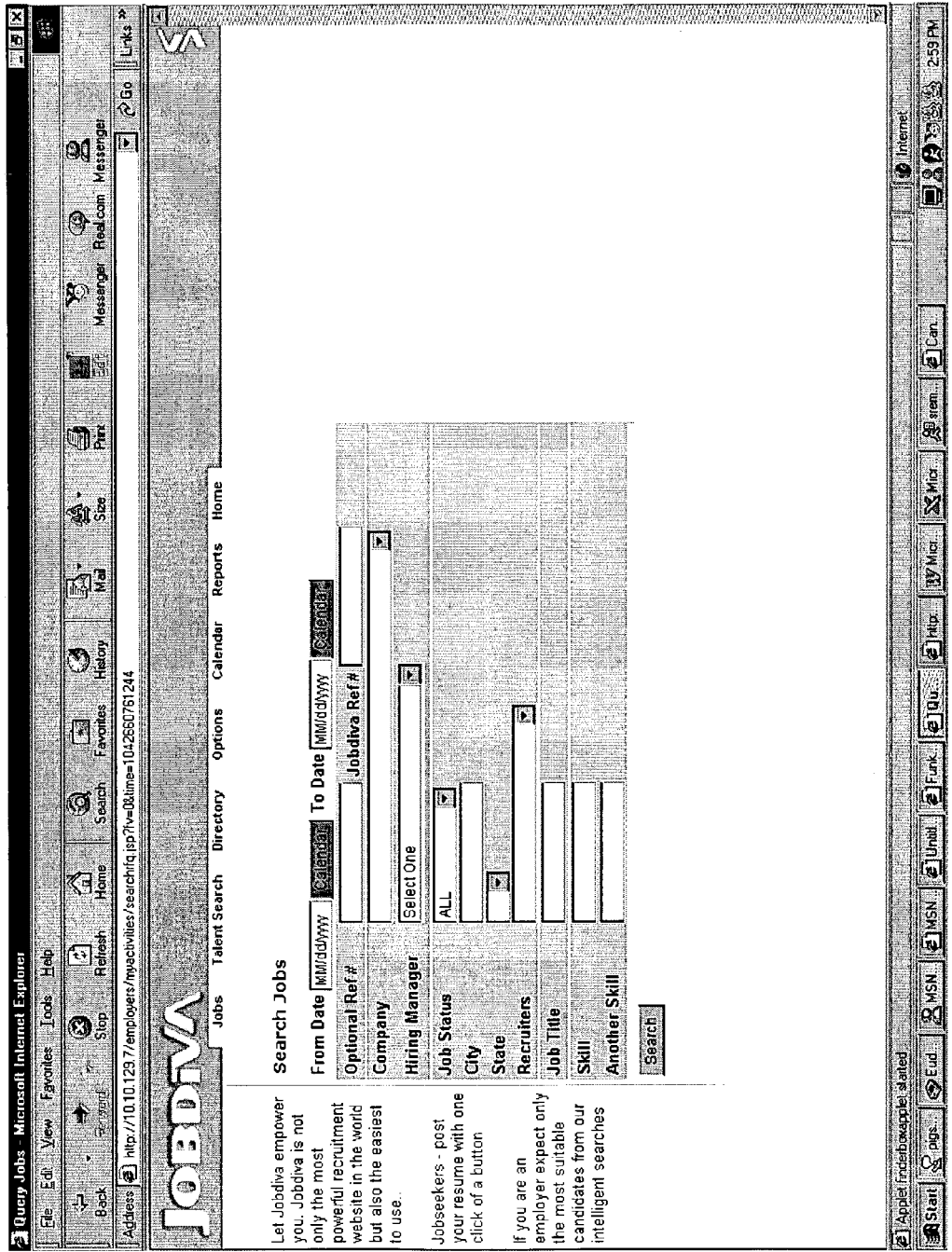
Figure 12C:
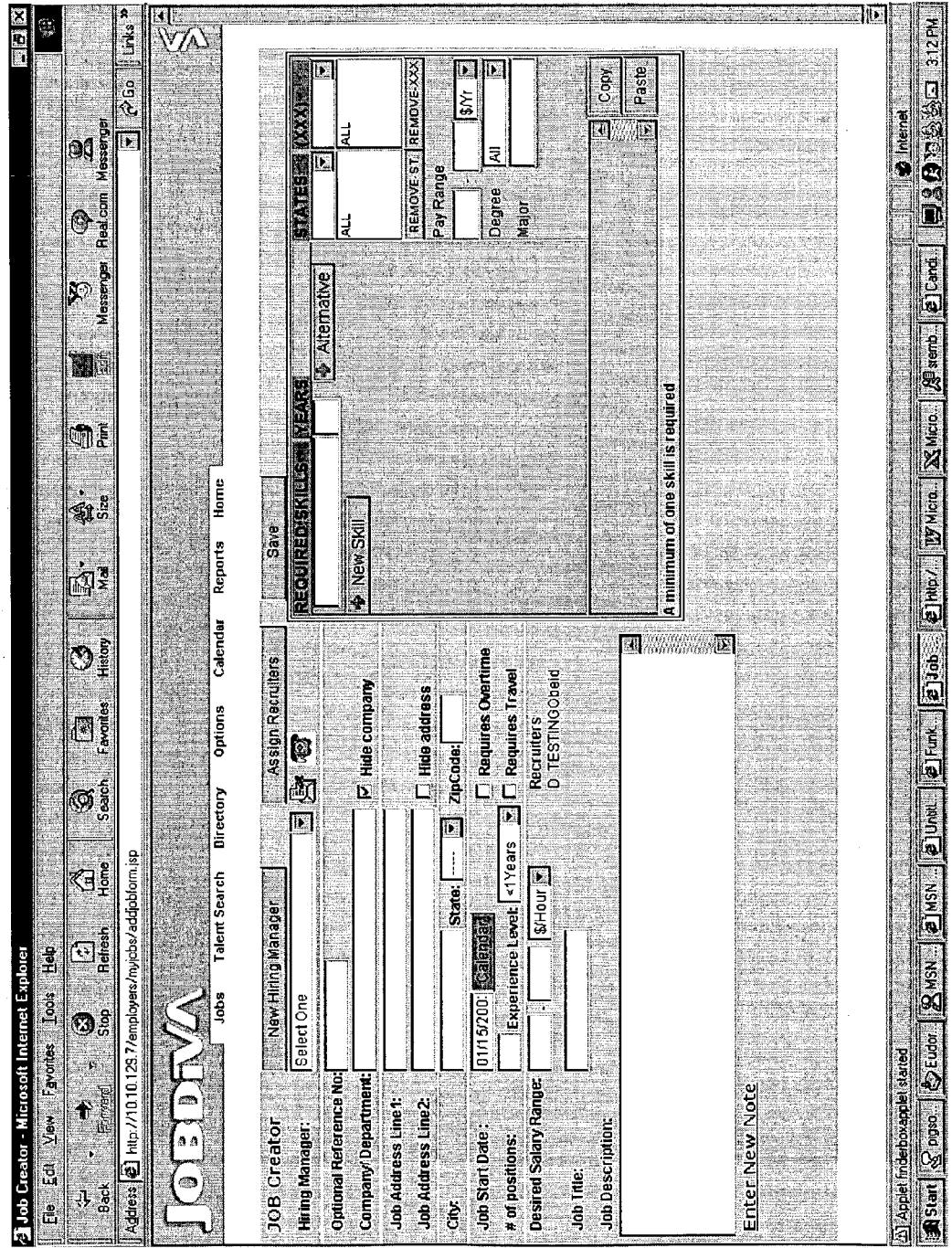
Figure 12D:
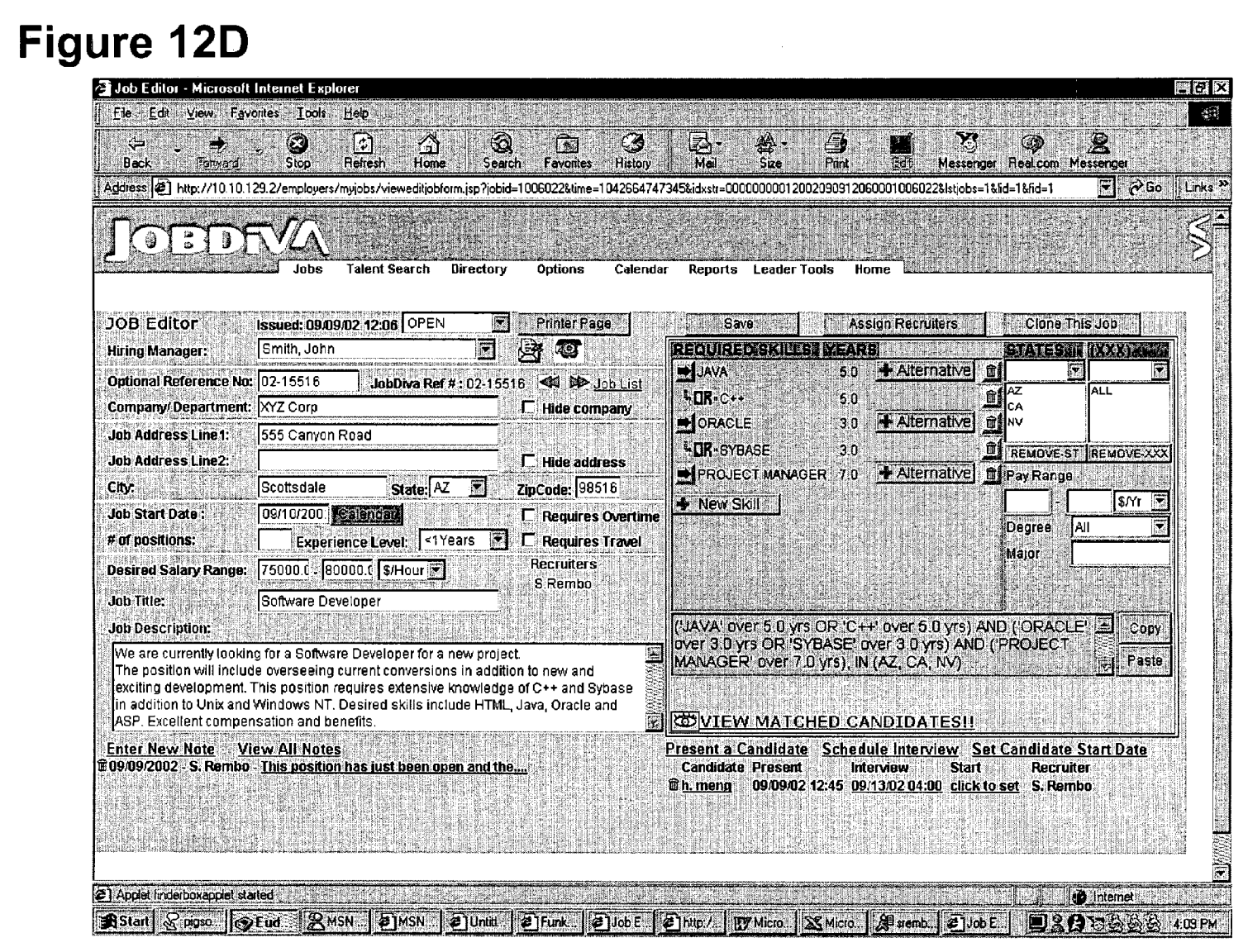
Figure 12E:
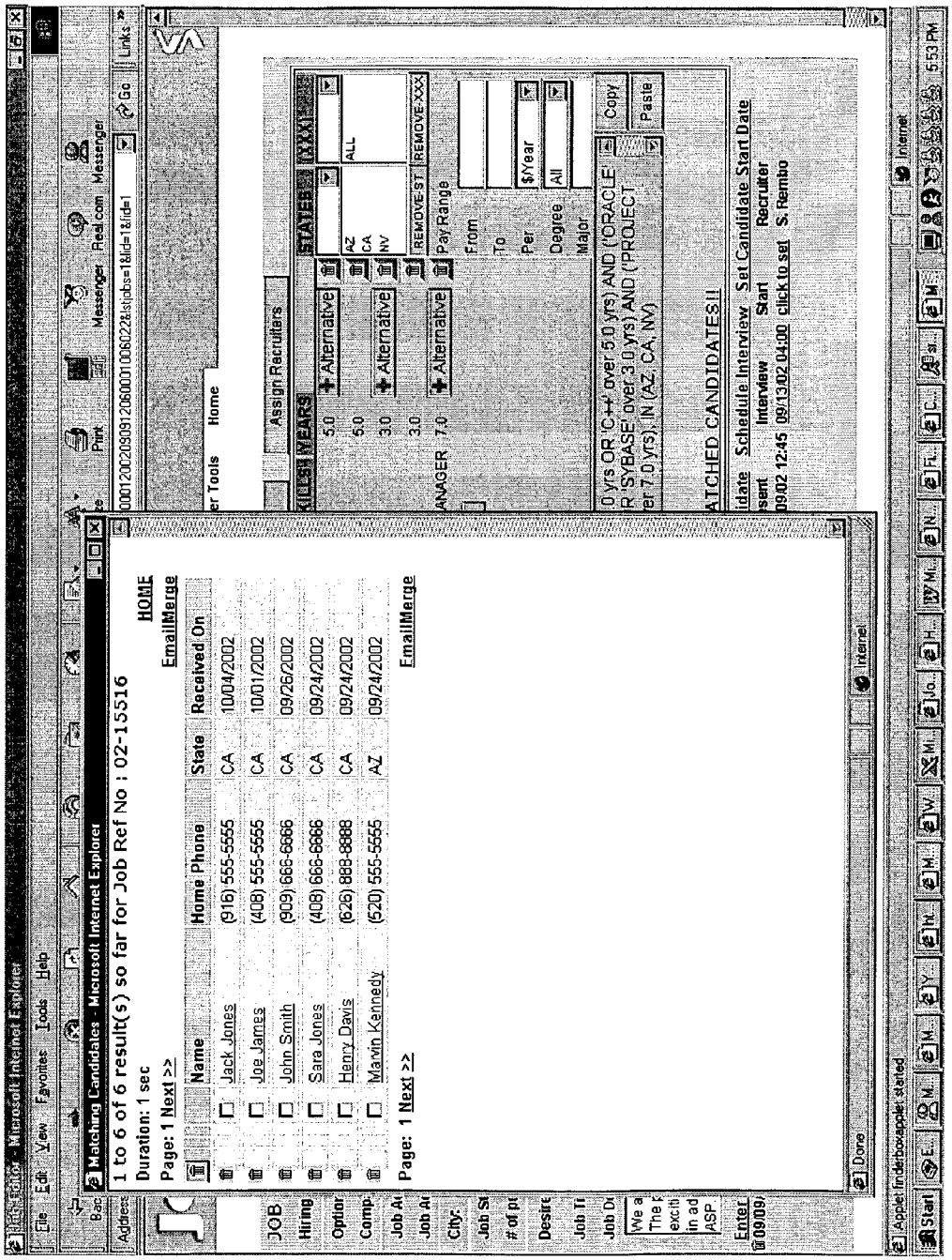

FIGS. 12A through 12M are exemplary screen images from an implementation of resume management and recruitment workflow system 140. FIG. 12A illustrates an exemplary screen image depicting the options of what a recruiter may view in respect to the job vacancies for which the recruiter or the recruiter's company is responsible. FIG. 12B illustrates an exemplary screen image depicting other options for searching for different jobs by recruiters using selected criteria. FIG. 12C illustrates an exemplary screen image for allowing recruiters to add a new job listing. FIG. 12D illustrates an exemplary screen image for viewing a job from a displayed list of jobs. The recruiter may click on a link to "View Matched Candidates" to display the candidates that have been matched to this job based on the required skill or experience-related phrases and length of time entered by the recruiter. FIG. 12E illustrates an exemplary screen image for viewing the matched candidate screen where the most recent candidates that fit the required skill or experience-related phrases appear. The recruiter is able to click and check off the candidates they have viewed in addition to being able to view which candidates have notes in the system on them already and who have been previously submitted to a job.

Figure 12F:
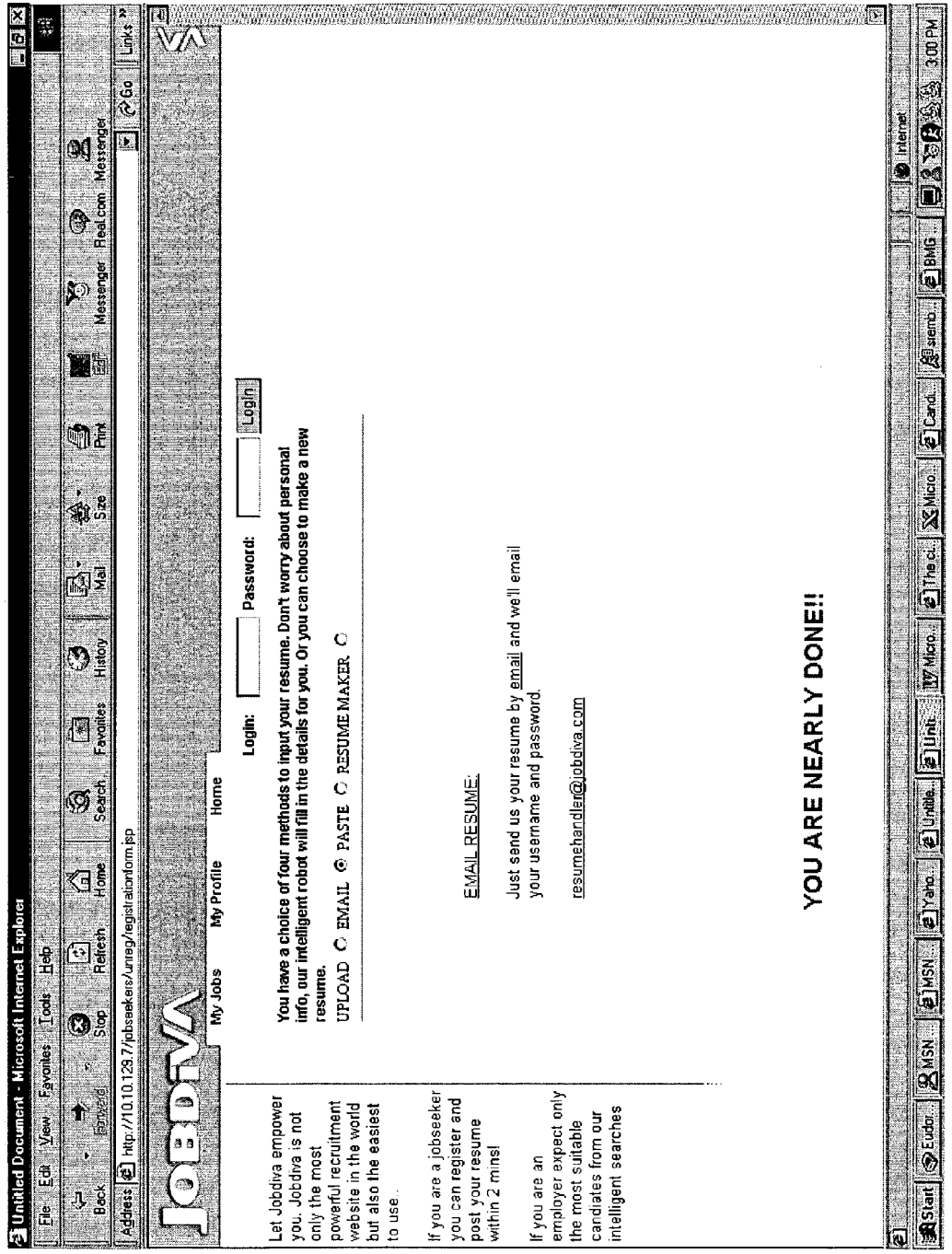

FIG. 12F illustrates an exemplary screen image for allowing the different methods of posting the resume to resume management and recruitment workflow system 140. As previously discussed, the options available to job candidates are to upload, e-mail, cut and paste, or use the resume maker. From there, resume management and recruitment workflow system 140 parses the resume and the process continues through the resume processing flow internally.

Figure 12G:
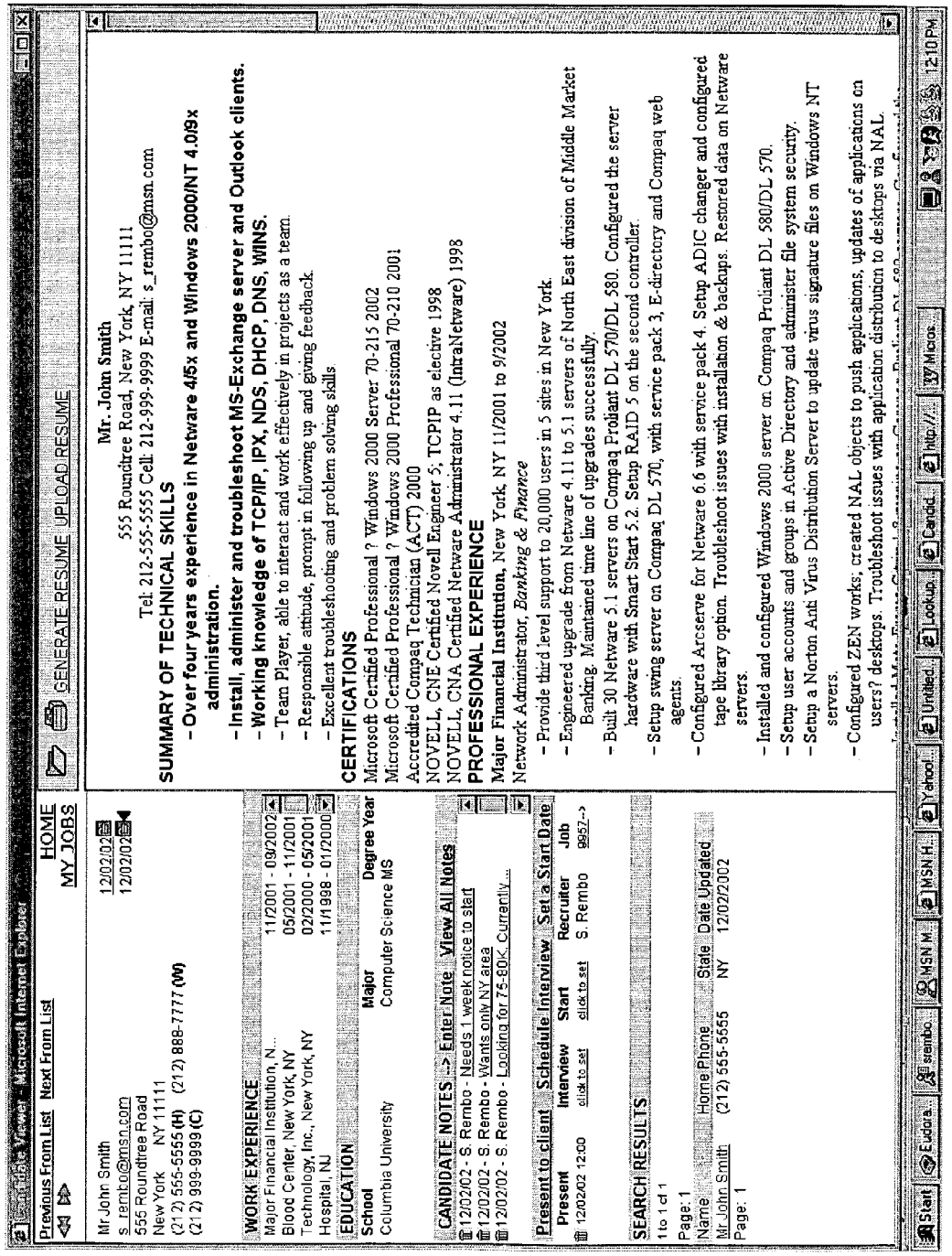

FIG. 12G illustrates an exemplary screen image for parsing the resume and creating its attributes. The system displays the extrapolated information in the top left-hand corner. The extrapolated information includes name, address, e-mail, etc. Then, resume management and recruitment workflow system 140 extrapolates the candidate's work experience and skill or experience-related phrases and displays the result in the work experience field.

Figure 12H:
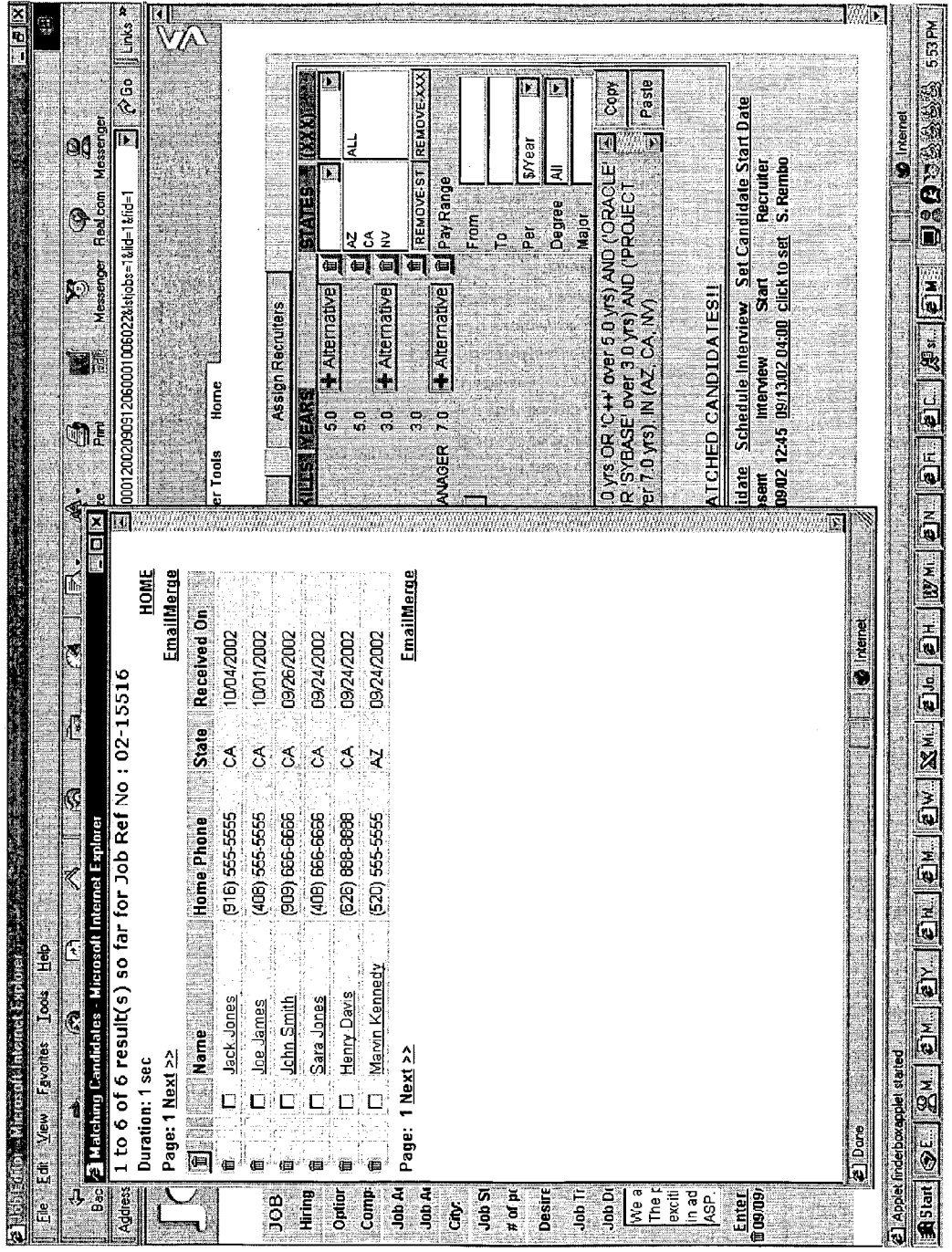

FIG. 12H illustrates an exemplary screen image after entering the resume, parsing the resume, and matching the resume to all open jobs that match the skill or experience-related phrases. Subsequently, resume management and recruitment workflow system 140 notifies the recruiter and the candidate names appear in the view matched candidates screen for that job.

Figure 12I:
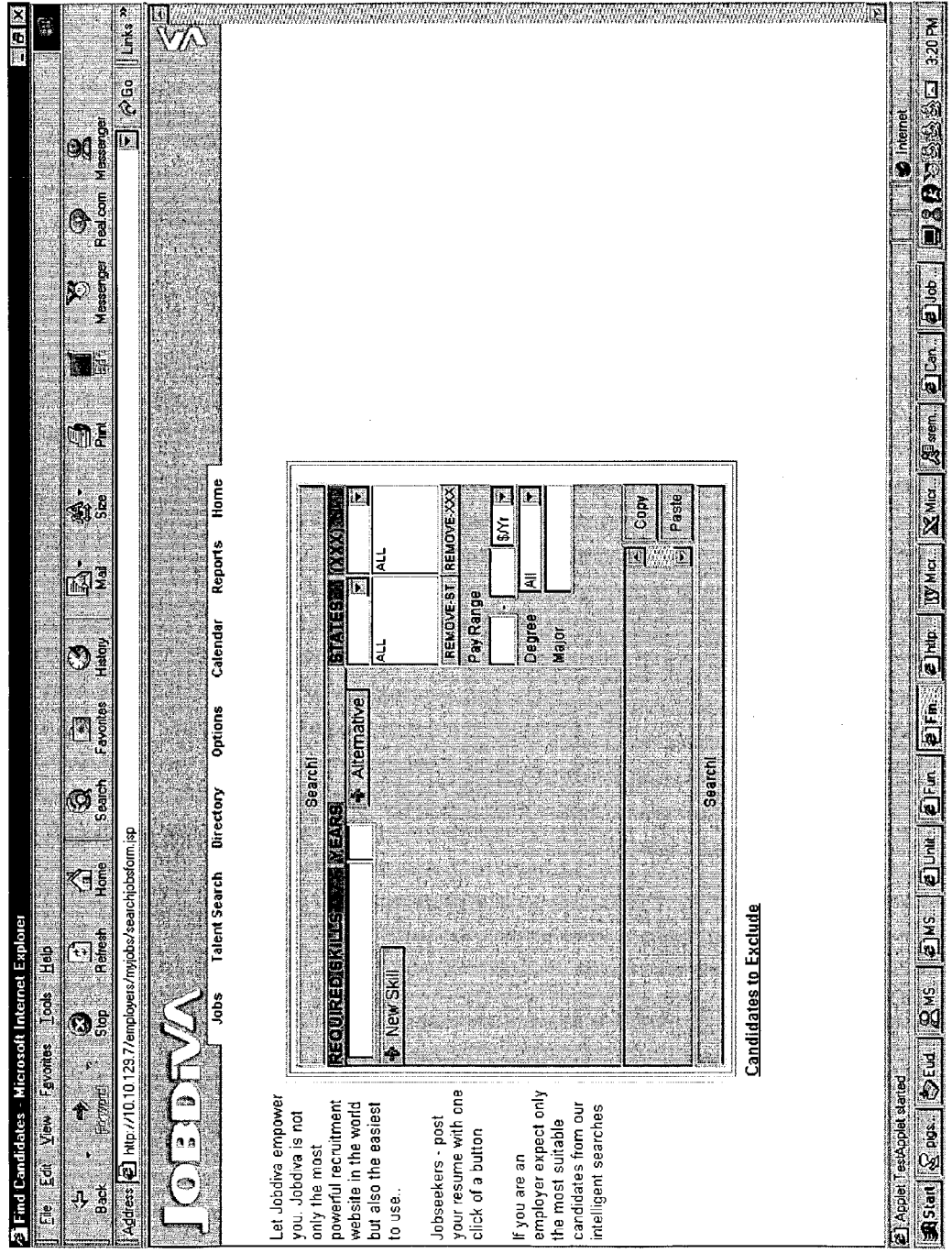
Figure 12J:
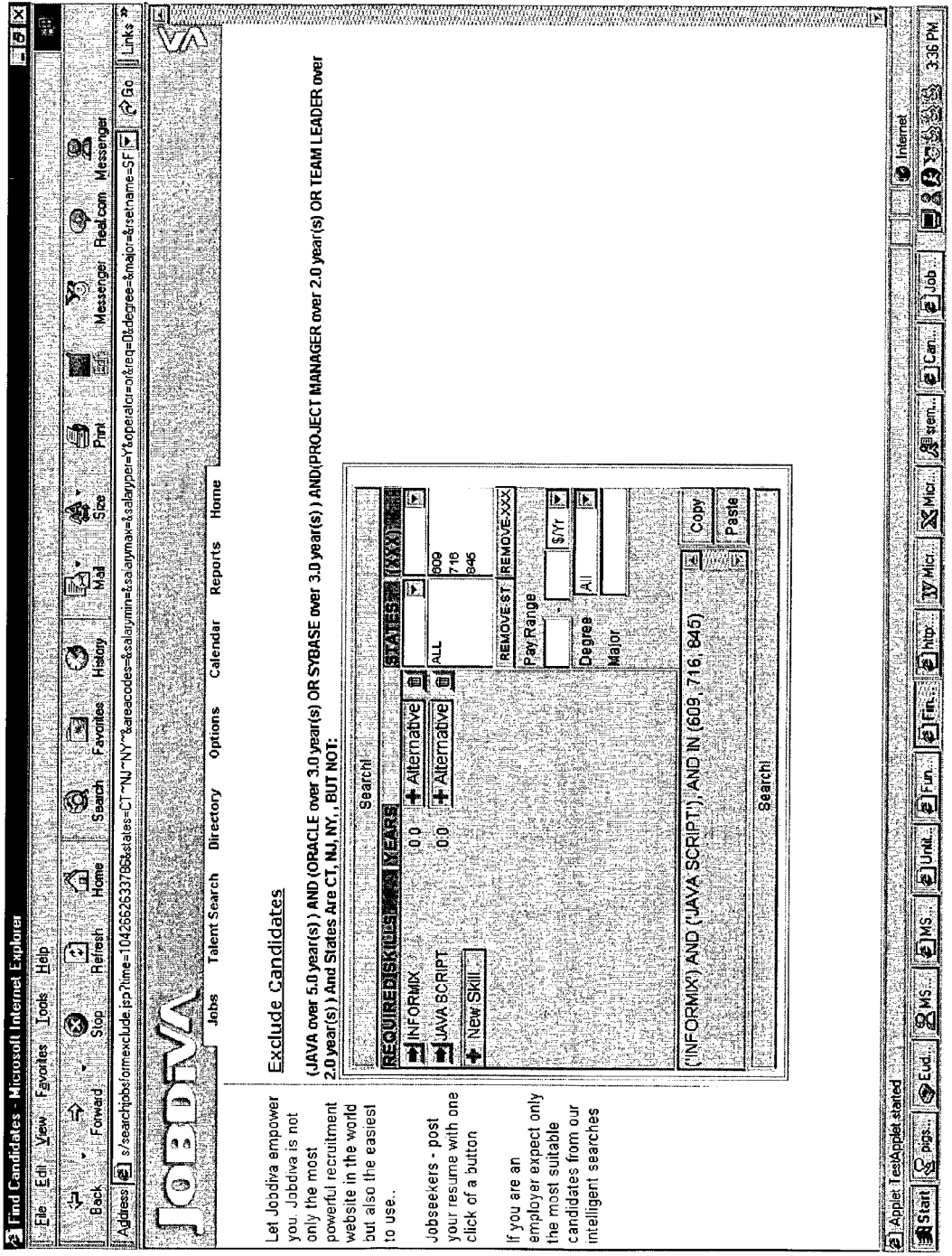
Figure 12K:
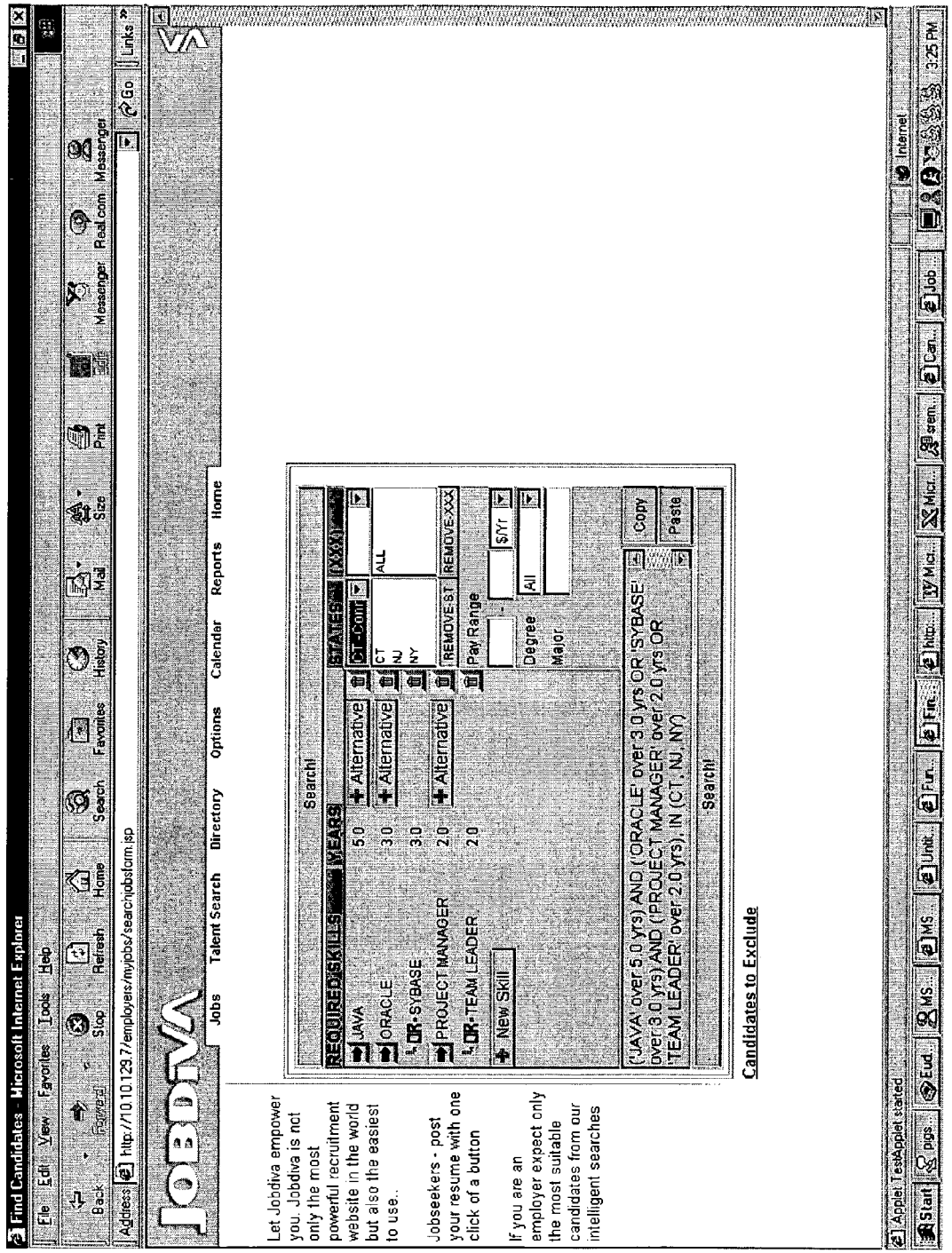

FIG. 12I illustrates an exemplary screen image for initiating a search for candidates from the resume database 302. FIG. 12J illustrates an exemplary screen image showing the capability to perform a search within a search by excluding specific candidates to narrow down the results more specifically. FIG. 12K illustrates an exemplary screen image for allowing recruiters to add skill or experience-related phrases and their alternatives in addition to length of experience required. From the screen, two methods of entry are available for the user, an intuitive layout (the top sections of entered skill or experience-related phrases in FIG. 12K) and a Boolean expression (the bottom box with the text and parentheses in FIG. 12K). Regardless of the method chosen, resume management and recruitment workflow system 140 automatically converts the data entered to the other method in the appropriate field.

Figure 12L:
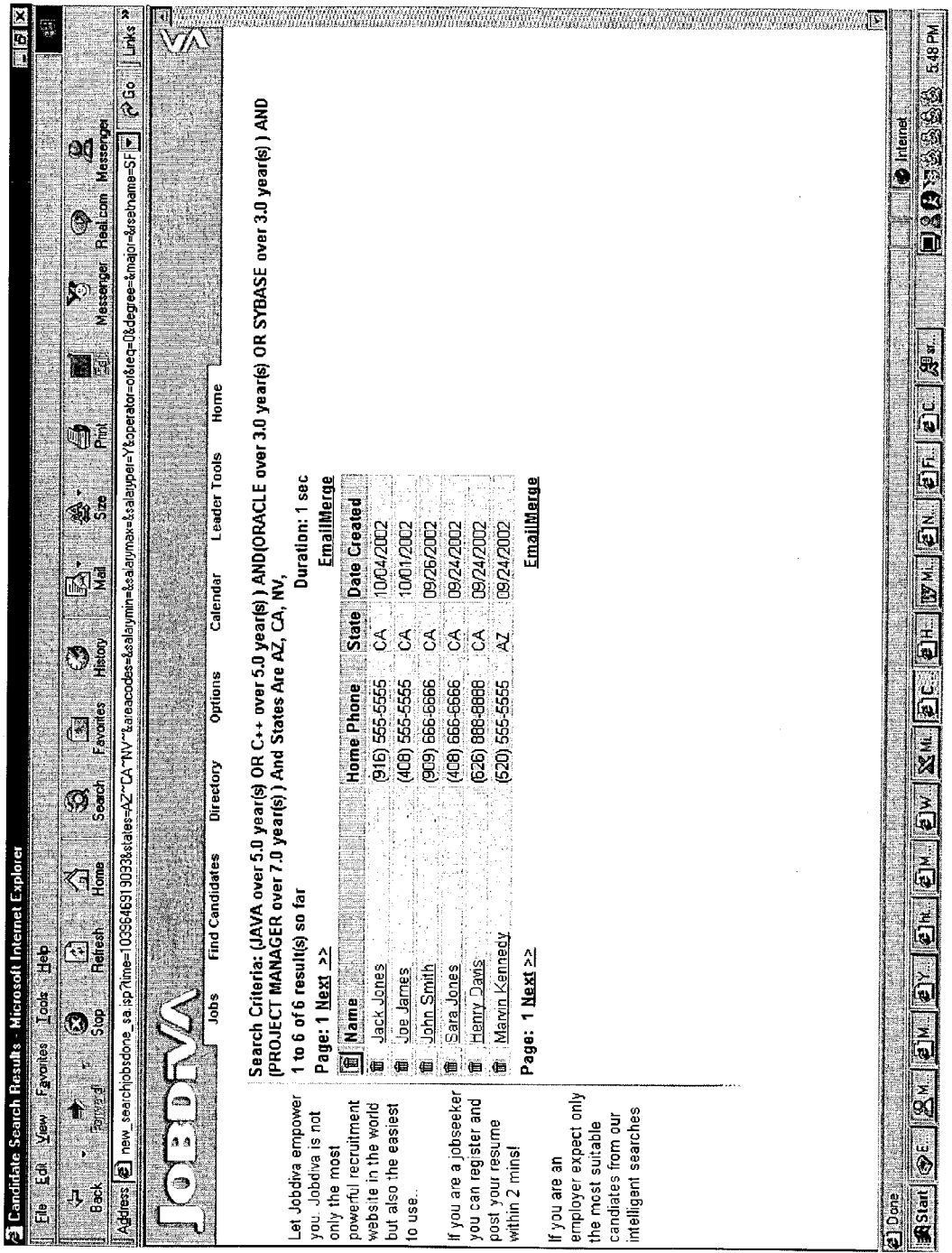

FIG. 12L illustrates an exemplary screen image for displaying the results of the search incrementally. When clicking on the "Next" button and the ">>" to the right of the "Next" button, additional results are displayed until the search has been exhausted.

Figure 12M:
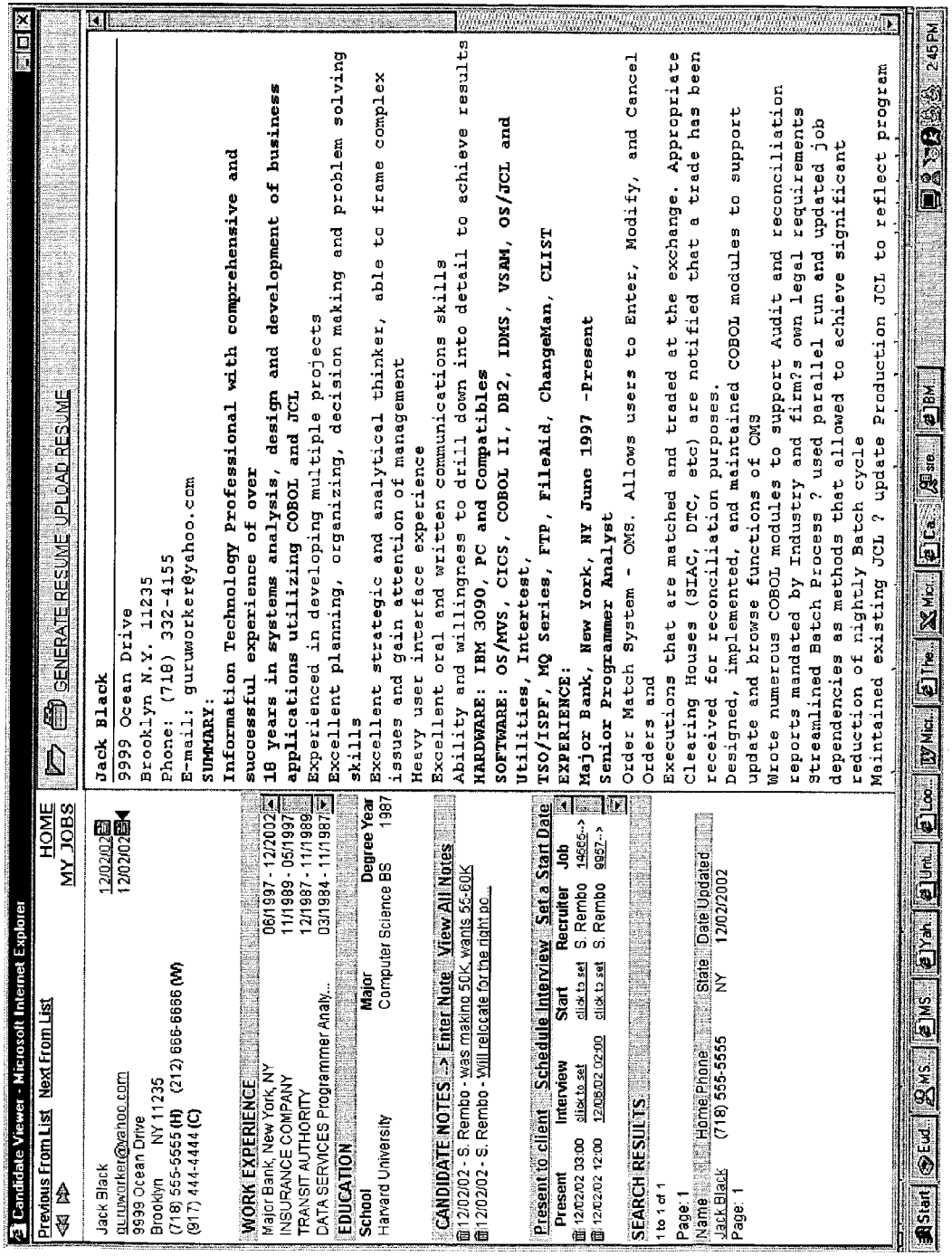

FIG. 12M illustrates an exemplary split screen image. The split screen allows a recruiter to view the multiple resumes of a candidate, the candidate's attributes, any notes written by any recruiter on the recruiter's team, candidate activity by members of the team, in addition to the search results including shaded candidates that have been viewed by the recruiter.

In another embodiment, resume management and recruitment workflow system 140 offers electronic mail capability from the site. A user can send individual e-mail messages using the e-mail address hyperlink from the candidate information screen. In addition, the user can send multiple e-mail messages within a very short time period. In another embodiment, resume management and recruitment workflow system 140 includes tool tips in the user interface. In another embodiment, resume management and recruitment workflow system 140 consolidates events into a calendar as well as a reporting form for the user to view different activities. In another embodiment, resume management and recruitment workflow system 140 provides the ability to find a candidate using the candidate's name, electronic mail address, postal address, phone number, and the like. In another embodiment, as the user views the candidate or the job, the system shades the list of candidates and jobs that result from a search and have been viewed. Thus, the screen display will indicate those candidates or jobs reviewed by the user. In another embodiment, resume management and recruitment workflow system 140 allows the user to open and print a resume from the candidate screen and re-format it or save it wherever the user wants. In another embodiment, resume management and recruitment workflow system 140 discerns that multiple resumes sharing the same electronic mail address belong to the same candidate attributes. Resume management and recruitment workflow system 140 resolves the latest most relevant data and presents that latest attributes to the user. In another embodiment, resume management and recruitment workflow system 140 allows the user to use the full resume as a search platform by selecting zero years or specifying no years for the phrases in the search criteria. In another embodiment, resume management and recruitment workflow system 140 utilizes a state, area code, education, and desired salary filtering for a search for candidates.

In another embodiment, resume management and recruitment workflow system 140 provides access to resume database 302 in a non-traditional employer-employee relationship. Exemplary non-traditional employer-employee relationships include internal placement of current employees to new tasks or projects, and coordination of the placement of current employees among the organizations that make-up a distributed network of organizations such as branches of the Federal government.

Although the disclosed embodiments describe a fully functioning resume management and recruitment workflow system and method, it is to be understood that other equivalent embodiments exist. Since numerous modifications and variations will occur to those who review this disclosure, the resume management and recruitment workflow system and method is not limited to the exact construction and operation illustrated and disclosed. Accordingly, this disclosure intends all suitable modifications and equivalents to fall within the scope of the claims.

I claim:

1. A system for using a computer to improve a precision ratio when searching a resume database, comprising:
   a memory device resident in the computer; and
   a processor disposed in communication with the memory device, the processor configured to:
      receive a resume;
      parse the resume to:
         locate at least one skill or experience-related phrase in the resume;
         determine an experience range for each said at least one skill or experience-related phrase by examining a use of each said at least one skill or experience-related phrase in the resume; and
         compute a term of experience for each said at least one skill or experience-related phrase based on the experience range,
         wherein the term of experience for each said at least one skill or experience-related phrase is a summation of the term of experience for each occurrence of the phrase associated with a different experience range;
      store the resume in the resume database;
      create a parsed resume based on the resume, the parsed resume including each said at least one skill or experience-related phrase located in the resume, the term of experience computed for each said at least one skill or experience-related phrase, and a relationship between the term of experience and each said at least one skill or experience-related phrase;

store the parsed resume in the resume database;

send a database query to the resume database, the database query including a job description that includes at least one job requirement, each said at least one job requirement including a required skill or experience-related phrase, and a required term of experience; and receive a result set in response to the database query, wherein the result set includes the resume when the parsed resume satisfies the job description.

2. The system of claim 1, wherein the resume comprises a document in an electronic format.

3. The system of claim 2, wherein the electronic format includes a standard digital document format.

4. The system of claim 1, wherein the resume comprises a curriculum vitae.

5. The system of claim 1, wherein the processor receives the resume from a candidate.

6. The system of claim 5, wherein the candidate creates the resume.

7. The system of claim 1, wherein the received resume is one of a number of resumes.

8. The system of claim 7, wherein the receipt of the number of resumes is automatic, scheduled, or periodic.

9. The system of claim 1, wherein the resume includes at least one word, and wherein said at least one skill or experience-related phrase comprises said at least one word.

10. The system of claim 9, wherein, when the resume includes at least two words, said at least one skill or experience-related phrase further comprises at least one word group, each said at least one word group including consecutive words from the resume.

11. The system of claim 1, wherein each said at least one skill or experience-related phrase comprises a skill, a job location, a title, a department, a responsibility, a duty, an action, an achievement, an accomplishment, a relationship, a product, a consultation, a group, a team, a field, a space, an area of endeavor, a company, an industry, a technical package, or a tool.

12. The system of claim 1, wherein to store the resume, the processor is further configured to:

store the resume as a public resume, wherein the resume database is accessible by at least one recruiter, and the public resume is accessible by every recruiter.

13. The system of claim 1, wherein to store the resume, the processor is further configured to:

store the resume as a private resume, wherein the resume database is accessible by at least one recruiter, and the private resume is accessible by only one recruiter of said at least one recruiter.

14. The system of claim 1, wherein to store the resume, the processor is further configured to:

store the resume as a private resume, wherein the resume database is accessible by at least one recruitment team, each said at least one recruitment team including at least one recruitment team member, and the private resume is accessible by only one recruitment team of said at least one recruitment team.

15. The system of claim 1, wherein said at least one skill or experience-related phrase includes at least one attribute for a candidate.

16. The system of claim 15, wherein said at least one attribute includes a name, a residence or business address, a telephone number, an electronic mail address, education data, past employer data, or salary data.

17. The system of claim 16, wherein the telephone number includes a home number, a work number, a facsimile number, or a cellular number.

18. The system of claim 16, wherein the education data includes a degree, a major, a year, or a school name.

19. The system of claim 16, wherein the past employer data includes an employer name, a last title, and a period of employment.

20. The system of claim 16, wherein the salary data includes a current salary and an expected salary.

21. The system of claim 1, wherein the examining of the use of each said at least one skill or experience-related phrase in the resume includes examining a portion of the resume that surrounds each said at least one skill or experience-related phrase for a context.

22. The system of claim 21, wherein the processor is further configured to:

when the experience range is zero:
set the term of experience to zero; and when the experience range is greater than zero:
determine a start time for the experience range;
determine an end time for the experience range;
compute a time difference between the start time and the end time; and
set the term of experience to the time difference, wherein the term of experience is rounded down to a unit of time.

23. The system of claim 22, wherein the unit of time is a number of seconds, minutes, hours, days, weeks, months, years, or decades.

24. The system of claim 22, wherein the unit of time is an integer.

25. The system of claim 22, wherein the unit of time is not an integer.

26. The system of claim 22, wherein to set the term of experience to the time difference, the processor is further configured to:

compute a repeated entry time difference for each said at least one skill or experience-related phrase that is a repeated entry and is associated with an other experience range; and add to the time difference each repeated entry time difference, wherein the other experience range includes an other start time and an other end time, and wherein the other start time and the start time are different, or the other end time and the end time are different.

27. The system of claim 26, wherein to store the parsed resume, the processor is further configured to:

store each said at least one skill or experience-related phrase having an identical term of experience as an element defined by a markup language, the element comprising a start tag, content data, and an end tag, wherein the start tag and the end tag include the identical term of experience, and wherein the content data includes each said at least one skill or experience-related phrase having the identical term of experience.

28. The system of claim 27, wherein the content data further includes a nested element comprising a nested start tag, nested content data, and a nested end tag, wherein the nested start tag and the nested end tag include a nested term of experience, and wherein the nested content data includes each said at least one skill or experience-related phrase having the nested term of experience.

29. The system of claim 28, wherein the nested term of experience is greater than the identical term of experience.

30. The system of claim 27, wherein the storing of the element is to a file.

31. The system of claim 30, wherein the file comprises an XML file.

32. The system of claim 1, wherein the processor is further configured to:
send a portion of the parsed resume to a candidate.

33. The system of claim 32, wherein the portion of the parsed resume is sent in a message to the candidate.

34. The system of claim 33, wherein the message includes an electronic mail message.

35. The system of claim 33, wherein the portion of the parsed resume is an attachment to an electronic mail message.

36. The system of claim 32, wherein a reference to the portion of the parsed resume is sent in a message to the candidate.

37. The system of claim 32, wherein the processor is further configured to:
receive a modified copy of the portion of the parsed resume.

38. The system of claim 37, wherein the processor is further configured to:
create a replacement resume based on the modified copy of the portion of the parsed resume.

39. The system of claim 1, wherein the resume comprises a replacement resume.

40. The system of claim 1, wherein the processor is further configured to:
receive the job description;
store the job description in the resume database; and
send a portion of the result set to a recruiter,
wherein the result set includes at least one matching resume from the resume database, each said at least one matching resume satisfying the job description.

41. The system of claim 40, wherein the required term of experience is rounded up to a unit of time.

42. The system of claim 41, wherein the unit of time is a number of seconds, minutes, hours, days, weeks, months, years, or decades.

43. The system of claim 41, wherein the unit of time is an integer.

44. The system of claim 41, wherein the unit of time is not an integer.

45. The system of claim 41, wherein each said at least one matching resume satisfies the job description when the parsed resume includes the required skill or experience-related phrase for each said at least one job requirement, and the term of experience for the required skill or experience-related phrase in the parsed resume is greater than or equal to the required term of experience.

46. The system of claim 45, wherein at least one of said at least one job requirement includes at least one alternative job requirement, each said at least one alternative job requirement comprising an alternative required skill or experience-related phrase and an alternative required term of experience, and wherein each said at least one matching resume satisfies said at least one of said at least one job requirement when the parsed resume includes either:
the required skill or experience-related phrase for said at least one of said at least one job requirement, and the term of experience for the required skill or experience-related phrase in the parsed resume is greater than or equal to the required term of experience; or
the alternative required skill or experience-related phrase for any said at least one alternative job requirement, and the term of experience for the alternative required skill or experience-related phrase in the parsed resume is greater than or equal to the alternative required term of experience.

47. The system of claim 41, wherein each said at least one matching resume satisfies the job description when the parsed resume includes the required skill or experience-related phrase for any said at least one job requirement, and the term of experience for the required skill or experience-related phrase in the parsed resume is greater than or equal to the required term of experience.

48. The system of claim 40, wherein the processor receives the job description from a recruiter.

49. The system of claim 48, wherein the recruiter creates the job description.

50. The system of claim 40, wherein the job description is a clone of an existing job description stored in the resume database.

51. The system of claim 40, wherein the received job description is one of a number of job descriptions.

52. The system of claim 51, wherein the receipt of the number of job descriptions is automatic, scheduled, or periodic.

53. The system of claim 40, wherein a reference to the portion of the result set is sent.

54. The system of claim 40, wherein the processor is further configured to:
identify as a selected resume one of said at least one matching resume; and
display the selected resume on a display screen having a left side and a right side, the left side showing a parsed representation of the selected resume, and the right side showing a marked-up representation of the selected resume.

55. The system of claim 54, wherein the marked-up representation includes at least one occurrence of the required skill or experience-related phrase for each said at least one job requirement, and wherein to display the selected resume, the processor is further configured to:
mark each said at least one occurrence of the required skill or experience-related phrase for each said at least one job requirement.

56. The system of claim 55, wherein the marking includes highlighting each said at least one occurrence of the required skill or experience-related phrase for each said at least one job requirement, or displaying in reverse video each said at least one occurrence of the required skill or experience-related phrase for each said at least one job requirement.

57. The system of claim 1, wherein the job description further includes a required level of education or a required field of specialization, and wherein the processor is further configured to:
store the job description in the resume database; and
send a portion of the result set,
wherein the result set includes at least one matching resume from the resume database, each said at least one matching resume satisfying the job description.

58. The system of claim 57, wherein each said at least one matching resume satisfies the job description when the parsed resume includes the required level of education, the required field of specialization, or a phrase implying the required level of education or the required field of specialization.

59. The system of claim 1, wherein the job description further includes a required salary range comprising a minimum required salary and a maximum required salary, and wherein the processor is further configured to:

store the job description; and send a portion of the result set, wherein the result set includes at least one matching resume from the resume database, each said at least one matching resume satisfying the job description.

60. The system of claim 59, wherein each said at least one matching resume satisfies the job description when the parsed resume includes an expected salary that falls within the required salary range.

61. The system of claim 60, wherein the expected salary falls within the required salary range when:

the expected salary is greater than or equal to the minimum required salary, and the expected salary is less than or equal to the maximum required salary.

62. The system of claim 61, wherein the parsed resume includes at least one salary range set to represent the expected salary, each said at least one salary range set including a salary range unit, and a multiplier, and wherein a multiplication of the salary range unit and the multiplier yields a result that is the greatest integer that is less than or equal to the expected salary.

63. The system of claim 1, wherein the processor is further configured to:

extract education data from the resume; and store the education data in the parsed resume.

64. The system of claim 63, wherein to store the education data, the processor is further configured to:

store the education data in an element defined by a markup language, the element comprising a start tag, content data, and an end tag, wherein the content data includes the education data.

65. The system of claim 64, wherein the storing of the element is to a file.

66. The system of claim 65, wherein the file comprises an XML file.

67. The system of claim 64, wherein the education data includes at least one education summary, and wherein to store the education data, the processor is further configured to:

store each said at least one education summary in an education summary element defined by a markup language, the education summary element comprising an education summary start tag, education summary content data, and an education summary end tag, wherein the education summary content data includes each said at least one education summary.

68. The system of claim 67, wherein each said at least one education summary includes a degree, a field of specialization, a school name, and a graduation year, and wherein to store the education data, the processor is further configured to:

store the education summary content data in an education element defined by a markup language, the education element comprising an education start tag, education content data, and an education end tag, wherein the education start tag and the education end tag include an indication of the degree, and wherein the education content data includes each said at least one education summary.

69. The system of claim 68, wherein the education content data further includes a nested education element comprising a nested education start tag, nested education content data, and a nested education end tag, wherein the nested education start tag and the nested education end tag include an indication of a prerequisite degree implied by the degree, and wherein the nested education content data includes each said at least one education summary.

70. The system of claim 64, wherein to store the education data, the processor is further configured to:

store degree data in a degree element defined by a markup language, the degree element comprising an degree start tag, degree content data, and a degree end tag, wherein the education data includes at least one education summary, each said at least one education summary including a degree and at least one prerequisite degree implied by the degree, and wherein the degree content data includes, for each said at least one education summary, the degree and each said at least one prerequisite degree.

71. The system of claim 1, wherein the processor is further configured to:

obtain an expected salary for a candidate;

convert the expected salary to at least one multiplier; and store each said at least one multiplier in the parsed resume, wherein each said at least one multiplier is associated with a salary range unit, and wherein each said at least one multiplier is the greatest integer that is less than or equal to a result of a division of the expected salary by the salary range unit.

72. The system of claim 71, wherein the resume further comprises the expected salary.

73. The system of claim 71, wherein to store each said at least one multiplier, the processor is further configured to:

store each said at least one multiplier as an element defined by a markup language, the element comprising a start tag, content data, and an end tag, wherein the start tag and the end tag include an indication of the salary range unit associated with each said at least one multiplier, and wherein the content data includes each said at least one multiplier.

74. The system of claim 73, wherein the storing of the element is to a file.

75. The system of claim 74, wherein the file comprises an XML file.

76. A method for using a computer to improve a precision ratio when searching a resume database, comprising:

receiving a resume in a memory device resident in the computer;

parsing the resume to:

locate at least one skill or experience-related phrase in the resume;

determine an experience range for each said at least one skill or experience-related phrase by examining a use of each said at least one skill or experience-related phrase in the resume; and compute, by the computer, a term of experience for each said at least one skill or experience-related phrase based on the experience range, wherein the term of experience for each said at least one skill or experience-related phrase is a summation of the term of experience for each occurrence of the phrase associated with a different experience range;

storing the resume in the resume database;

creating a parsed resume based on the resume, the parsed resume including each said at least one skill or experience-related phrase located in the resume, the term of experience computed for each said at least one skill or experience-related phrase, and a relationship between the term of experience and each said at least one skill or experience-related phrase;

storing the parsed resume in the resume database;

sending a database query to the resume database, the database query including a job description that includes at least one job requirement, each said at least one job requirement including a required skill or experience-related phrase, and a required term of experience; and receiving a result set in response to the database query, wherein the result set includes the resume when the parsed resume satisfies the job description.

77. The method of claim 76, wherein the resume comprises a document in an electronic format.

78. The method of claim 77, wherein the electronic format includes a standard digital document format.

79. The method of claim 76, wherein the resume comprises a curriculum vitae.

80. The method of claim 76, wherein the receiving of the resume is from a candidate.

81. The method of claim 80, wherein the candidate creates the resume.

82. The method of claim 76, wherein the received resume is one of a number of resumes.

83. The method of claim 82, wherein the receipt of the number of resumes is automatic, scheduled, or periodic.

84. The method of claim 76, wherein the resume includes at least one word, and wherein said at least one skill or experience-related phrase comprises said at least one word.

85. The method of claim 84, wherein, when the resume includes at least two words, said at least one skill or experience-related phrase further comprises at least one word group, each said at least one word group including consecutive words from the resume.

86. The method of claim 76, wherein each said at least one skill or experience-related phrase comprises a skill, a job location, a title, a department, a responsibility, a duty, an action, an achievement, an accomplishment, a relationship, a product, a consultation, a group, a team, a field, a space, an area of endeavor, a company, an industry, a technical package, or a tool.

87. The method of claim 76, wherein the storing of the resume further comprises:

storing the resume as a public resume, wherein the resume database is accessible by at least one recruiter, and the public resume is accessible by every recruiter.

88. The method of claim 76, wherein the storing of the resume further comprises:

storing the resume as a private resume, wherein the resume database is accessible by at least one recruiter, and the private resume is accessible by only one recruiter of said at least one recruiter.

89. The method of claim 76, wherein the storing of the resume further comprises:

storing the resume as a private resume, wherein the resume database is accessible by at least one recruitment team, each said at least one recruitment team including at least one recruitment team member, and the private resume is accessible by only one recruitment team of said at least one recruitment team.

90. The method of claim 76, wherein said at least one skill or experience-related phrase includes at least one attribute for a candidate.

91. The method of claim 90, wherein said at least one attribute includes a name, a residence or business address, a telephone number, an electronic mail address, education data, past employer data, or salary data.

92. The method of claim 91, wherein the telephone number includes a home number, a work number, a facsimile number, or a cellular number.

93. The method of claim 91, wherein the education data includes a degree, a major, a year, or a school name.

94. The method of claim 91, wherein the past employer data includes an employer name, a last title, and a period of employment.

95. The method of claim 91, wherein the salary data includes a current salary and an expected salary.

96. The method of claim 76, wherein the examining of the use of each said at least one skill or experience-related phrase in the resume includes examining a portion of the resume that surrounds each said at least one skill or experience-related phrase for a context.

97. The method of claim 96, further comprising:

when the experience range is zero:

setting the term of experience to zero; and when the experience range is greater than zero:

determining a start time for the experience range;

determining an end time for the experience range;

computing a time difference between the start time and the end time; and setting the term of experience to the time difference, wherein the term of experience is rounded down to a unit of time.

98. The method of claim 97, wherein the unit of time is a number of seconds, minutes, hours, days, weeks, months, years, or decades.

99. The method of claim 97, wherein the unit of time is an integer.

100. The method of claim 97, wherein the unit of time is not an integer.

101. The method of claim 97, wherein the setting of the term of experience to the time difference further comprises:

computing a repeated entry time difference for each said at least one skill or experience-related phrase that is a repeated entry and is associated with an other experience range; and adding to the time difference each repeated entry time difference, wherein the other experience range includes an other start time and an other end time, and wherein the other start time and the start time are different, or the other end time and the end time are different.

102. The method of claim 101, wherein the storing of the parsed resume further comprises:

storing each said at least one skill or experience-related phrase having an identical term of experience as an element defined by a markup language, the element comprising a start tag, content data, and an end tag, wherein the start tag and the end tag include the identical term of experience, and wherein the content data includes each said at least one skill or experience-related phrase having the identical term of experience.

103. The method of claim 102, wherein the content data further includes a nested element comprising a nested start tag, nested content data, and a nested end tag, wherein the nested start tag and the nested end tag include a nested term of experience, and wherein the nested content data includes each said at least one skill or experience-related phrase having the nested term of experience.

104. The method of claim 103, wherein the nested term of experience is greater than the identical term of experience.

105. The method of claim 102, wherein the storing of the element is to a file.

106. The method of claim 105, wherein the file comprises an XML file.

107. The method of claim 76, further comprising:
sending a portion of the parsed resume to a candidate.

108. The method of claim 107, wherein the portion of the parsed resume is sent in a message to the candidate.

109. The method of claim 108, wherein the message includes an electronic mail message.

110. The method of claim 108, wherein the portion of the parsed resume is an attachment to an electronic mail message.

111. The method of claim 107, wherein a reference to the portion of the parsed resume is sent in a message to the candidate.

112. The method of claim 107, further comprising:
receiving a modified copy of the portion of the parsed resume.

113. The method of claim 112, further comprising:
creating a replacement resume based on the modified copy of the portion of the parsed resume.

114. The method of claim 76, wherein the resume comprises a replacement resume.

115. The method of claim 76, further comprising:
receiving the job description;
storing the job description in the resume database; and
sending a portion of the result set to a recruiter,
wherein the result set includes at least one matching resume from the resume database, each said at least one matching resume satisfying the job description.

116. The method of claim 115, wherein the required term of experience is rounded up to a unit of time.

117. The method of claim 116, wherein the unit of time is a number of seconds, minutes, hours, days, weeks, months, years, or decades.

118. The method of claim 116, wherein the unit of time is an integer.

119. The method of claim 116, wherein the unit of time is not an integer.

120. The method of claim 116, wherein each said at least one matching resume satisfies the job description when the parsed resume includes the required skill or experience-related phrase for each said at least one job requirement, and the term of experience for the required skill or experience-related phrase in the parsed resume is greater than or equal to the required term of experience.

121. The method of claim 120, wherein at least one of said at least one job requirement includes at least one alternative job requirement, each said at least one alternative job requirement comprising an alternative required skill or experience-related phrase and an alternative required term of experience, and wherein each said at least one matching resume satisfies said at least one of said at least one job requirement when the parsed resume includes either:
the required skill or experience-related phrase for said at least one of said at least one job requirement, and the term of experience for the required skill or experience-related phrase in the parsed resume is greater than or equal to the required term of experience; or
the alternative required skill or experience-related phrase for any said at least one alternative job requirement, and the term of experience for the alternative required skill or experience-related phrase in the parsed resume is greater than or equal to the alternative required term of experience.

122. The method of claim 116, wherein each said at least one matching resume satisfies the job description when the parsed resume includes the required skill or experience-related phrase for any said at least one job requirement, and the term of experience for the required skill or experience-related phrase in the parsed resume is greater than or equal to the required term of experience.

123. The method of claim 115, wherein the receiving of the job description is from a recruiter.

124. The method of claim 123, wherein the recruiter creates the job description.

125. The method of claim 115, wherein the job description is a clone of an existing job description stored in the resume database.

126. The method of claim 115, wherein the received job description is one of a number of job descriptions.

127. The method of claim 126, wherein the receipt of the number of job descriptions is automatic, scheduled, or periodic.

128. The method of claim 115, wherein a reference to the portion of the result set is sent.

129. The method of claim 115, further comprising:
identifying as a selected resume one of said at least one matching resume; and
displaying the selected resume on a display screen having a left side and a right side, the left side showing a parsed representation of the selected resume, and the right side showing a marked-up representation of the selected resume.

130. The method of claim 129, wherein the marked-up representation includes at least one occurrence of the required skill or experience-related phrase for each said at least one job requirement, and wherein the displaying of the selected resume further comprises:
marking each said at least one occurrence of the required skill or experience-related phrase for each said at least one job requirement.

131. The method of claim 130, wherein the marking includes highlighting each said at least one occurrence of the required skill or experience-related phrase for each said at least one job requirement, or displaying in reverse video each said at least one occurrence of the required skill or experience-related phrase for each said at least one job requirement.

132. The method of claim 76, wherein the job description further includes a required level of education or a required field of specialization, the method further comprising:
storing the job description in the resume database; and
sending a portion of the result set,
wherein the result set includes at least one matching resume from the resume database, each said at least one matching resume satisfying the job description.

133. The method of claim 132, wherein each said at least one matching resume satisfies the job description when the parsed resume includes the required level of education, the required field of specialization, or a phrase implying the required level of education or the required field of specialization.

134. The method of claim 76, wherein the job description further includes a required salary range comprising a minimum required salary and a maximum required salary, the method further comprising:
storing the job description; and
sending a portion of the result set,
wherein the result set includes at least one matching resume from the resume database, each said at least one matching resume satisfying the job description.

135. The method of claim 134, wherein each said at least one matching resume satisfies the job description when the parsed resume includes an expected salary that falls within the required salary range.

136. The method of claim 135, wherein the expected salary falls within the required salary range when:
the expected salary is greater than or equal to the minimum required salary, and
the expected salary is less than or equal to the maximum required salary.

137. The method of claim 136, wherein the parsed resume includes at least one salary range set to represent the expected salary, each said at least one salary range set including a salary range unit, and a multiplier, and wherein a multiplication of the salary range unit and the multiplier yields a result that is the greatest integer that is less than or equal to the expected salary.

138. The method of claim 76, further comprising:
extracting education data from the resume; and
storing the education data in the parsed resume.

139. The method of claim 138, wherein the storing of the education data further comprises:
storing the education data in an element defined by a markup language, the element comprising a start tag, content data, and an end tag,
wherein the content data includes the education data.

140. The method of claim 139, wherein the storing of the element is to a file.

141. The method of claim 140, wherein the file comprises an XML file.

142. The method of claim 139, wherein the education data includes at least one education summary, and wherein the storing of the education data further comprises:
storing each said at least one education summary in an education summary element defined by a markup language, the education summary element comprising an education summary start tag, education summary content data, and an education summary end tag,
wherein the education summary content data includes each said at least one education summary.

143. The method of claim 142, wherein each said at least one education summary includes a degree, a field of specialization, a school name, and a graduation year, and wherein the storing of the education data further comprises:
storing the education summary content data in an education element defined by a markup language, the education element comprising an education start tag, education content data, and an education end tag,
wherein the education start tag and the education end tag include an indication of the degree, and
wherein the education content data includes each said at least one education summary.

144. The method of claim 143, wherein the education content data further includes a nested education element comprising a nested education start tag, nested education content data, and a nested education end tag,
wherein the nested education start tag and the nested education end tag include an indication of a prerequisite degree implied by the degree, and
wherein the nested education content data includes each said at least one education summary.

145. The method of claim 139, wherein the storing of the education data further comprises:
storing degree data in a degree element defined by a markup language, the degree element comprising an degree start tag, degree content data, and a degree end tag,
wherein the education data includes at least one education summary, each said at least one education summary including a degree and at least one prerequisite degree implied by the degree, and
wherein the degree content data includes, for each said at least one education summary, the degree and each said at least one prerequisite degree.

146. The method of claim 76, further comprising:
obtaining an expected salary for a candidate;
converting the expected salary to at least one multiplier; and
storing each said at least one multiplier in the parsed resume,
wherein each said at least one multiplier is associated with a salary range unit, and
wherein each said at least one multiplier is the greatest integer that is less than or equal to a result of a division of the expected salary by the salary range unit.

147. The method of claim 146, wherein the resume further comprises the expected salary.

148. The method of claim 146, wherein the storing of each said at least one multiplier further comprises:
storing each said at least one multiplier as an element defined by a markup language, the element comprising a start tag, content data, and an end tag,
wherein the start tag and the end tag include an indication of the salary range unit associated with each said at least one multiplier, and
wherein the content data includes each said at least one multiplier.

149. The method of claim 148, wherein the storing of the element is to a file.

150. The method of claim 149, wherein the file comprises an XML file.

151. A computer program product, to be used on a computer, for improving a precision ratio when searching a resume database, comprising:
a computer readable medium storing:
program code for receiving a resume;
program code for parsing the resume to:
locate at least one skill or experience-related phrase in the resume;
determine an experience range for each said at least one skill or experience-related phrase by examining a use of each said at least one skill or experience-related phrase in the resume; and
compute a term of experience for each said at least one skill or experience-related phrase based on the experience range,
wherein the term of experience for each said at least one skill or experience-related phrase is a summation of the term of experience for each occurrence of the phrase associated with a different experience range;
program code for storing the resume in the resume database;
program code for creating a parsed resume based on the resume, the parsed resume including each said at least one skill or experience-related phrase located in the resume, the term of experience computed for each said at least one skill or experience-related phrase, and a relationship between the term of experience and each said at least one skill or experience-related phrase;
program code for storing a parsed resume in the resume database;
program code for sending a database query to the resume database, the database query including a job description that includes at least one job requirement, each said at least one job requirement including a required skill or experience-related phrase, and a required term of experience; and program code for receiving a result set in response to the database query, wherein the result set includes the resume when the parsed resume satisfies the job description.

152. The computer program product of claim 151, wherein the received resume is one of a number of resumes.

153. The computer program product of claim 152, wherein the receipt of the number of resumes is automatic, scheduled, or periodic.

154. The computer program product of claim 151, wherein the resume includes at least one word, and wherein said at least one skill or experience-related phrase comprises said at least one word.

155. The computer program product of claim 154, wherein, when the resume includes at least two words, said at least one skill or experience-related phrase further comprises at least one word group, each said at least one word group including consecutive words from the resume.

156. The computer program product of claim 151, wherein the program code for storing the resume further comprises:
program code for storing the resume as a public resume, wherein the resume database is accessible by at least one recruiter, and the public resume is accessible by every recruiter.

157. The computer program product of claim 151, wherein the program code for storing the resume further comprises:
program code for storing the resume as a private resume, wherein the resume database is accessible by at least one recruiter, and the private resume is accessible by only one recruiter of said at least one recruiter.

158. The computer program product of claim 151, wherein the program code for storing the resume further comprises:
program code for storing the resume as a private resume, wherein the resume database is accessible by at least one recruitment team, each said at least one recruitment team including at least one recruitment team member, and the private resume is accessible by only one recruitment team of said at least one recruitment team.

159. The computer program product of claim 151, wherein said at least one skill or experience-related phrase includes at least one attribute for a candidate.

160. The computer program product of claim 151, wherein the examining of the use of each said at least one skill or experience-related phrase in the resume includes examining a portion of the resume that surrounds each said at least one skill or experience-related phrase for a context.

161. The computer program product of claim 160, the computer readable medium further storing:
program code for setting the term of experience to zero when the experience range is zero;
program code for determining a start time for the experience range when the experience range is greater than zero;
program code for determining an end time for the experience range when the experience range is greater than zero;
program code for computing a time difference between the start time and the end time when the experience range is greater than zero; and
program code for setting the term of experience to the time difference when the experience range is greater than zero,
wherein the term of experience is rounded down to a unit of time.

162. The computer program product of claim 161, wherein the program code for setting the term of experience to the time difference further comprises:
program code for computing a repeated entry time difference for each said at least one skill or experience-related phrase that is a repeated entry and is associated with an other experience range; and
program code for adding to the time difference each repeated entry time difference,
wherein the other experience range includes an other start time and an other end time, and
wherein the other start time and the start time are different, or the other end time and
the end time are different.

163. The computer program product of claim 162, wherein the program code for storing the parsed resume further comprises:
program code for storing each said at least one skill or experience-related phrase having an identical term of experience as an element defined by a markup language, the element comprising a start tag, content data, and an end tag,
wherein the start tag and the end tag include the identical term of experience, and
wherein the content data includes each said at least one skill or experience-related phrase having the identical term of experience.

164. The computer program product of claim 163, wherein the content data further includes a nested element comprising a nested start tag, nested content data, and a nested end tag, wherein the nested start tag and the nested end tag include a nested term of experience, and wherein the nested content data includes each said at least one skill or experience-related phrase having the nested term of experience.

165. The computer program product of claim 164, wherein the nested term of experience is greater than the identical term of experience.

166. The computer program product of claim 163, wherein the storing of the element is to a file.

167. The computer program product of claim 166, wherein the file comprises an XML file.

168. The computer program product of claim 151, further comprising:
program code for sending a portion of the parsed resume to a candidate.

169. The computer program product of claim 168, wherein a reference to the portion of the parsed resume is sent in a message to the candidate.

170. The computer program product of claim 168, the computer readable medium further storing:
program code for receiving a modified copy of the portion of the parsed resume.

171. The computer program product of claim 170, the computer readable medium further storing:
program code for creating a replacement resume based on the modified copy of the portion of the parsed resume.

172. The computer program product of claim 151, the computer readable medium further storing:
program code for receiving the job description;
program code for storing the job description in the resume database; and
program code for sending a portion of the result set to a recruiter,
wherein the result set includes at least one matching resume from the resume database, each said at least one matching resume satisfying the job description.

173. The computer program product of claim 172, wherein the required term of experience is rounded up to a unit of time.

174. The computer program product of claim 173, wherein each said at least one matching resume satisfies the job description when the parsed resume includes the required skill or experience-related phrase for each said at least one job requirement, and the term of experience for the required skill or experience-related phrase in the parsed resume is greater than or equal to the required term of experience.

175. The computer program product of claim 174, wherein at least one of said at least one job requirement includes at least one alternative job requirement, each said at least one alternative job requirement comprising an alternative required skill or experience-related phrase and an alternative required term of experience, and wherein each said at least one matching resume satisfies said at least one of said at least one job requirement when the parsed resume includes either:
- the required skill or experience-related phrase for said at least one of said at least one job requirement, and the term of experience for the required skill or experience-related phrase in the parsed resume is greater than or equal to the required term of experience; or
- the alternative required skill or experience-related phrase for any said at least one alternative job requirement, and the term of experience for the alternative required skill or experience-related phrase in the parsed resume is greater than or equal to the alternative required term of experience.

176. The computer program product of claim 173, wherein each said at least one matching resume satisfies the job description when the parsed resume includes the required skill or experience-related phrase for any said at least one job requirement, and the term of experience for the required skill or experience-related phrase in the parsed resume is greater than or equal to the required term of experience.

177. The computer program product of claim 172, wherein the job description is a clone of an existing job description stored in the resume database.

178. The computer program product of claim 172, wherein the received job description is one of a number of job descriptions.

179. The computer program product of claim 178, wherein the receipt of the number of job descriptions is automatic, scheduled, or periodic.

180. The computer program product of claim 172, wherein a reference to the portion of the result set is sent.

181. The computer program product of claim 172, the computer readable medium further storing:
- program code for identifying as a selected resume one of said at least one matching resume; and
- program code for displaying the selected resume on a display screen having a left side and a right side, the left side showing a parsed representation of the selected resume, and the right side showing a marked-up representation of the selected resume.

182. The computer program product of claim 181, wherein the marked-up representation includes at least one occurrence of the required skill or experience-related phrase for each said at least one job requirement, and wherein the program code for displaying the selected resume further comprises:
- program code for marking each said at least one occurrence of the required skill or experience-related phrase for each said at least one job requirement.

183. The computer program product of claim 182, wherein the marking includes highlighting each said at least one occurrence of the required skill or experience-related phrase for each said at least one job requirement, or displaying in reverse video each said at least one occurrence of the required skill or experience-related phrase for each said at least one job requirement.

184. The computer program product of claim 151, wherein the job description further includes a required level of education or a required field of specialization, the computer readable medium further storing:
- program code for storing the job description in the resume database; and
- program code for sending a portion of the result set,
  wherein the result set includes at least one matching resume from the resume database, each said at least one matching resume satisfying the job description.

185. The computer program product of claim 184, wherein each said at least one matching resume satisfies the job description when the parsed resume includes the required level of education, the required field of specialization, or a phrase implying the required level of education or the required field of specialization.

186. The computer program product of claim 151, wherein the job description further includes a required salary range comprising a minimum required salary and a maximum required salary, the computer readable medium further storing:
- program code for storing the job description; and
- program code for sending a portion of the result set,
  wherein the result set includes at least one matching resume from the resume database, each said at least one matching resume satisfying the job description.

187. The computer program product of claim 186, wherein each said at least one matching resume satisfies the job description when the parsed resume includes an expected salary that falls within the required salary range.

188. The computer program product of claim 187, wherein the expected salary falls within the required salary range when:
- the expected salary is greater than or equal to the minimum required salary, and
- the expected salary is less than or equal to the maximum required salary.

189. The computer program product of claim 188, wherein the parsed resume includes at least one salary range set to represent the expected salary, each said at least one salary range set including a salary range unit, and a multiplier, and wherein a multiplication of the salary range unit and the multiplier yields a result that is the greatest integer that is less than or equal to the expected salary.

190. The computer program product of claim 151, the computer readable medium further storing:
- program code for extracting education data from the resume; and
- program code for storing the education data in the parsed resume.

191. The computer program product of claim 190, wherein the program code for storing the education data further comprises:
- program code for storing the education data in an element defined by a markup language, the element comprising a start tag, content data, and an end tag,
  wherein the content data includes the education data.

192. The computer program product of claim 191, wherein the storing of the element is to a file.

193. The computer program product of claim 192, wherein the file comprises an XML file.

194. The computer program product of claim 191, wherein the education data includes at least one education summary, and wherein the program code for storing the education data further comprises:

program code for storing each said at least one education summary in an education summary element defined by a markup language, the education summary element comprising an education summary start tag, education summary content data, and an education summary end tag, wherein the education summary content data includes each said at least one education summary.

195. The computer program product of claim 194, wherein each said at least one education summary includes a degree, a field of specialization, a school name, and a graduation year, and wherein the program code for storing the education data further comprises:

program code for storing the education summary content data in an education element defined by a markup language, the education element comprising an education start tag, education content data, and an education end tag, wherein the education start tag and the education end tag include an indication of the degree, and wherein the education content data includes each said at least one education summary.

196. The computer program product of claim 195, wherein the education content data further includes a nested education element comprising a nested education start tag, nested education content data, and a nested education end tag, wherein the nested education start tag and the nested education end tag include an indication of a prerequisite degree implied by the degree, and wherein the nested education content data includes each said at least one education summary.

197. The computer program product of claim 191, wherein the program code for storing the education data further comprises:

program code for storing degree data in a degree element defined by a markup language, the degree element comprising an degree start tag, degree content data, and a degree end tag, wherein the education data includes at least one education summary, each said at least one education summary including a degree and at least one prerequisite degree implied by the degree, and wherein the degree content data includes, for each said at least one education summary, the degree and each said at least one prerequisite degree.

198. The computer program product of claim 151, the computer readable medium further storing:

program code for obtaining an expected salary for a candidate;

program code for converting the expected salary to at least one multiplier; and program code for storing each said at least one multiplier in the parsed resume, wherein each said at least one multiplier is associated with a salary range unit, and wherein each said at least one multiplier is the greatest integer that is less than or equal to a result of a division of the expected salary by the salary range unit.

199. The computer program product of claim 198, wherein the resume further comprises the expected salary.

200. The computer program product of claim 198, wherein the program code for storing each said at least one multiplier further comprises:

program code for storing each said at least one multiplier as an element defined by a markup language, the element comprising a start tag, content data, and an end tag, wherein the start tag and the end tag include an indication of the salary range unit associated with each said at least one multiplier, and wherein the content data includes each said at least one multiplier.

201. The computer program product of claim 200, wherein the storing of the element is to a file.

202. The computer program product of claim 201, wherein the file comprises an XML file.

203. A system for using a computer to improve a precision ratio when searching a resume database, comprising:

means for receiving a resume;

means for parsing the resume to:

locate at least one skill or experience-related phrase in the resume;

determine an experience range for each said at least one skill or experience-related phrase by examining a use of each said at least one skill or experience-related phrase in the resume; and compute a term of experience for each said at least one skill or experience-related phrase based on the experience range, wherein the term of experience for each said at least one skill or experience-related phrase is a summation of the term of experience for each occurrence of the phrase associated with a different experience range;

means for storing the resume in the resume database;

means for creating a parsed resume based on the resume, the parsed resume including each said at least one skill or experience-related phrase located in the resume, the term of experience computed for each said at least one skill or experience-related phrase, and a relationship between the term of experience and each said at least one skill or experience-related phrase;

means for storing the parsed resume in the resume database;

means for sending a database query to the resume database, the database query including a job description that includes at least one job requirement, each said at least one job requirement including a required skill or experience-related phrase, and a required term of experience; and means for receiving a result set in response to the database query, wherein the result set includes the resume when the parsed resume satisfies the job description.

204. The system of claim 203, wherein the received resume is one of a number of resumes.

205. The system of claim 204, wherein the receipt of the number of resumes is automatic, scheduled, or periodic.

206. The system of claim 203, wherein the resume includes at least one word, and wherein said at least one skill or experience-related phrase comprises said at least one word.

207. The system of claim 206, wherein, when the resume includes at least two words, said at least one skill or experience-related phrase further comprises at least one word group, each said at least one word group including consecutive words from the resume.

208. The system of claim 203, wherein the means for storing the resume further comprises:

means for storing the resume as a public resume, wherein the resume database is accessible by at least one recruiter, and the public resume is accessible by every recruiter.

209. The system of claim 203, wherein the means for storing the resume further comprises:
  means for storing the resume as a private resume,
  wherein the resume database is accessible by at least one recruiter, and the private resume is accessible by only one recruiter of said at least one recruiter.

210. The system of claim 203, wherein the means for storing the resume further comprises:
  means for storing the resume as a private resume,
  wherein the resume database is accessible by at least one recruitment team, each said at least one recruitment team including at least one recruitment team member, and the private resume is accessible by only one recruitment team of said at least one recruitment team.

211. The system of claim 203, wherein said at least one skill or experience-related phrase includes at least one attribute for a candidate.

212. The system of claim 203, wherein the examining of the use of each said at least one skill or experience-related phrase in the resume includes examining a portion of the resume that surrounds each said at least one skill or experience-related phrase for a context.

213. The system of claim 212, further comprising:
  means for setting the term of experience to zero when the experience range is zero;
  means for determining a start time for the experience range when the experience range is greater than zero;
  means for determining an end time for the experience range when the experience range is greater than zero;
  means for computing a time difference between the start time and the end time when the experience range is greater than zero; and
  means for setting the term of experience to the time difference when the experience range is greater than zero,
  wherein the term of experience is rounded down to a unit of time.

214. The system of claim 213, wherein the means for setting the term of experience to the time difference further comprises:
  means for computing a repeated entry time difference for each said at least one skill or experience-related phrase that is a repeated entry and is associated with an other experience range; and
  means for adding to the time difference each repeated entry time difference,
  wherein the other experience range includes an other start time and an other end time, and
  wherein the other start time and the start time are different, or the other end time and the end time are different.

215. The system of claim 214, wherein the means for storing the parsed resume further comprises:
  means for storing each said at least one skill or experience-related phrase having an identical term of experience as an element defined by a markup language, the element comprising a start tag, content data, and an end tag,
  wherein the start tag and the end tag include the identical term of experience, and
  wherein the content data includes each said at least one skill or experience-related phrase having the identical term of experience.

216. The system of claim 215, wherein the content data further includes a nested element comprising a nested start tag, nested content data, and a nested end tag, wherein the nested start tag and the nested end tag include a nested term of experience, and wherein the nested content data includes each said at least one skill or experience-related phrase having the nested term of experience.

217. The system of claim 216, wherein the nested term of experience is greater than the identical term of experience.

218. The system of claim 215, wherein the storing of the element is to a file.

219. The system of claim 218, wherein the file comprises an XML file.

220. The system of claim 203, further comprising:
  means for sending a portion of the parsed resume to a candidate.

221. The system of claim 220, wherein a reference to the portion of the parsed resume is sent in a message to the candidate.

222. The system of claim 220, further comprising:
  means for receiving a modified copy of the portion of the parsed resume.

223. The system of claim 222, further comprising:
  means for creating a replacement resume based on the modified copy of the portion of the parsed resume.

224. The system of claim 203, further comprising:
  means for receiving the job description;
  means for storing the job description in the resume database; and
  means for sending a portion of the result set to a recruiter,
  wherein the result set includes at least one matching resume from the resume database, each said at least one matching resume satisfying the job description.

225. The system of claim 224, wherein the required term of experience is rounded up to a unit of time.

226. The system of claim 225, wherein each said at least one matching resume satisfies the job description when the parsed resume includes the required skill or experience-related phrase for each said at least one job requirement, and the term of experience for the required skill or experience-related phrase in the parsed resume is greater than or equal to the required term of experience.

227. The system of claim 226, wherein at least one of said at least one job requirement includes at least one alternative job requirement, each said at least one alternative job requirement comprising an alternative required skill or experience-related phrase and an alternative required term of experience, and wherein each said at least one matching resume satisfies said at least one of said at least one job requirement when the parsed resume includes either:
  the required skill or experience-related phrase for said at least one of said at least one job requirement, and the term of experience for the required skill or experience-related phrase in the parsed resume is greater than or equal to the required term of experience; or
  the alternative required skill or experience-related phrase for any said at least one alternative job requirement, and the term of experience for the alternative required skill or experience-related phrase in the parsed resume is greater than or equal to the alternative required term of experience.

228. The system of claim 225, wherein each said at least one matching resume satisfies the job description when the parsed resume includes the required skill or experience-related phrase for any said at least one job requirement, and the term of experience for the required skill or experience-related phrase in the parsed resume is greater than or equal to the required term of experience.

229. The system of claim 224, wherein the job description is a clone of an existing job description stored in the resume database.

230. The system of claim 224, wherein the received job description is one of a number of job descriptions.

231. The system of claim 230, wherein the receipt of the number of job descriptions is automatic, scheduled, or periodic.

232. The system of claim 224, wherein a reference to the portion of the result set is sent.

233. The system of claim 224, further comprising:
means for identifying as a selected resume one of said at least one matching resume; and
means for displaying the selected resume on a display screen having a left side and a right side, the left side showing a parsed representation of the selected resume, and the right side showing a marked-up representation of the selected resume.

234. The system of claim 233, wherein the marked-up representation includes at least one occurrence of the required skill or experience-related phrase for each said at least one job requirement, and wherein the means for displaying the selected resume further comprises:
means for marking each said at least one occurrence of the required skill or experience-related phrase for each said at least one job requirement.

235. The system of claim 234, wherein the marking includes highlighting each said at least one occurrence of the required skill or experience-related phrase for each said at least one job requirement, or displaying in reverse video each said at least one occurrence of the required skill or experience-related phrase for each said at least one job requirement.

236. The system of claim 203, wherein the job description further includes a required level of education or a required field of specialization, the system further comprising:
means for storing the job description in the resume database; and
means for sending a portion of the result set,
wherein the result set includes at least one matching resume from the resume database, each said at least one matching resume satisfying the job description.

237. The system of claim 236, wherein each said at least one matching resume satisfies the job description when the parsed resume includes the required level of education, the required field of specialization, or a phrase implying the required level of education or the required field of specialization.

238. The system of claim 203, wherein the job description further includes a required salary range comprising a minimum required salary and a maximum required salary, the system further comprising:
means for storing the job description; and
means for sending a portion of the result set,
wherein the result set includes at least one matching resume from the resume database, each said at least one matching resume satisfying the job description.

239. The system of claim 238, wherein each said at least one matching resume satisfies the job description when the parsed resume includes an expected salary that falls within the required salary range.

240. The system of claim 239, wherein the expected salary falls within the required salary range when:
the expected salary is greater than or equal to the minimum required salary, and
the expected salary is less than or equal to the maximum required salary.

241. The system of claim 240, wherein the parsed resume includes at least one salary range set to represent the expected salary, each said at least one salary range set including a salary range unit, and a multiplier, and wherein a multiplication of the salary range unit and the multiplier yields a result that is the greatest integer that is less than or equal to the expected salary.

242. The system of claim 203, further comprising:
means for extracting education data from the resume; and
means for storing the education data in the parsed resume.

243. The system of claim 242, wherein the means for storing the education data further comprises:
means for storing the education data in an element defined by a markup language, the element comprising a start tag, content data, and an end tag,
wherein the content data includes the education data.

244. The system of claim 243, wherein the storing of the element is to a file.

245. The system of claim 244, wherein the file comprises an XML file.

246. The system of claim 243, wherein the education data includes at least one education summary, and wherein the means for storing the education data further comprises:
means for storing each said at least one education summary in an education summary element defined by a markup language, the education summary element comprising an education summary start tag, education summary content data, and an education summary end tag,
wherein the education summary content data includes each said at least one education summary.

247. The system of claim 246, wherein each said at least one education summary includes a degree, a field of specialization, a school name, and a graduation year, and wherein the means for storing the education data further comprises:
means for storing the education summary content data in an education element defined by a markup language, the education element comprising an education start tag, education content data, and an education end tag,
wherein the education start tag and the education end tag include an indication of the degree, and
wherein the education content data includes each said at least one education summary.

248. The system of claim 247, wherein the education content data further includes a nested education element comprising a nested education start tag, nested education content data, and a nested education end tag,
wherein the nested education start tag and the nested education end tag include an indication of a prerequisite degree implied by the degree, and
wherein the nested education content data includes each said at least one education summary.

249. The system of claim 243, wherein the means for storing the education data further comprises:
means for storing degree data in a degree element defined by a markup language, the degree element comprising an degree start tag, degree content data, and a degree end tag,
wherein the education data includes at least one education summary, each said at least one education summary including a degree and at least one prerequisite degree implied by the degree, and
wherein the degree content data includes, for each said at least one education summary, the degree and each said at least one prerequisite degree.

250. The system of claim 203, further comprising:
means for obtaining an expected salary for a candidate;
means for converting the expected salary to at least one multiplier; and
means for storing each said at least one multiplier in the parsed resume, wherein each said at least one multiplier is associated with a salary range unit, and wherein each said at least one multiplier is the greatest integer that is less than or equal to a result of a division of the expected salary by the salary range unit.

251. The system of claim 250, wherein the resume further comprises the expected salary.

252. The system of claim 250, wherein the means for storing each said at least one multiplier further comprises:

means for storing each said at least one multiplier as an element defined by a markup language, the element comprising a start tag, content data, and an end tag, wherein the start tag and the end tag include an indication of the salary range unit associated with each said at least one multiplier, and wherein the content data includes each said at least one multiplier.

253. The system of claim 252, wherein the storing of the element is to a file.

254. The system of claim 253, wherein the file comprises an XML file.

255. A system for using a computer to improve a precision ratio when searching a resume database, comprising:

a memory device resident in the computer; and a processor disposed in communication with the memory device, the processor configured to:

receive a resume;

parse the resume to:

locate at least one skill or experience-related phrase in the resume;

determine an experience range for each said at least one skill or experience-related phrase by examining a use of each said at least one skill or experience-related phrase in the resume; and compute a term of experience for each said at least one skill or experience-related phrase based on the experience range, wherein the term of experience for each said at least one skill or experience-related phrase is a summation of the term of experience for each occurrence of the phrase associated with a different experience range;

store the resume in the resume database;

associate at least one of said at least one skill or experience-related phrase located in the resume with at least one implied skill or experience-related phrase, wherein a term of experience for each said at least one implied skill or experience-related phrase is the term of experience computed for said at least one of said at least one skill or experience-related phrase, and wherein said at least one skill or experience-related phrase and said at least one implied skill or experience-related phrase are searchable phrases in the resume;

create a parsed resume based on the resume, the parsed resume including each searchable phrase in the resume, the term of experience for each searchable phrase, and a relationship between the term of experience and each searchable phrase;

store the parsed resume in the resume database;

send a database query to the resume database, the database query including a job description that includes at least one job requirement, each said at least one job requirement including a required skill or experience-related phrase, and a required term of experience; and receive a result set in response to the database query, wherein the result set includes the resume when the parsed resume satisfies the job description.

256. The system of claim 255, wherein at least one of each said at least one implied skill or experience-related phrase comprises a broader skill or experience-related phrase.

257. The system of claim 255, wherein the resume comprises a document in an electronic format.

258. The system of claim 257, wherein the electronic format includes a standard digital document format.

259. The system of claim 255, wherein the resume comprises a curriculum vitae.

260. The system of claim 255, wherein the processor receives the resume from a candidate.

261. The system of claim 260, wherein the candidate creates the resume.

262. The system of claim 255, wherein the received resume is one of a number of resumes.

263. The system of claim 262, wherein the receipt of the number of resumes is automatic, scheduled, or periodic.

264. The system of claim 255, wherein the resume includes at least one word, and wherein said at least one skill or experience-related phrase comprises said at least one word.

265. The system of claim 264, wherein, when the resume includes at least two words, said at least one skill or experience-related phrase further comprises at least one word group, each said at least one word group including consecutive words from the resume.

266. The system of claim 255, wherein each said at least one skill or experience-related phrase comprises a skill, a job location, a title, a department, a responsibility, a duty, an action, an achievement, an accomplishment, a relationship, a product, a consultation, a group, a team, a field, a space, an area of endeavor, a company, an industry, a technical package, or a tool.

267. The system of claim 255, wherein to store the resume, the processor is further configured to:

store the resume as a public resume, wherein the resume database is accessible by at least one recruiter, and the public resume is accessible by every recruiter.

268. The system of claim 255, wherein to store the resume, the processor is further configured to:

store the resume as a private resume, wherein the resume database is accessible by at least one recruiter, and the private resume is accessible by only one recruiter of said at least one recruiter.

269. The system of claim 255, wherein to store the resume, the processor is further configured to:

store the resume as a private resume, wherein the resume database is accessible by at least one recruitment team, each said at least one recruitment team including at least one recruitment team member, and the private resume is accessible by only one recruitment team of said at least one recruitment team.

270. The system of claim 255, wherein to associate said at least one of said at least one skill or experience-related phrase with each said at least one implied skill or experience-related phrase, the processor is further configured to:

retrieve each said at least one implied skill or experience-related phrase from a phrase mapping table that relates each said at least one of said at least one skill or experience-related phrase to each said at least one implied skill or experience-related phrase.

271. The system of claim 255, wherein said at least one skill or experience-related phrase includes at least one attribute for a candidate.

272. The system of claim 271, wherein said at least one attribute includes a name, a residence or business address, a telephone number, an electronic mail address, education data, past employer data, or salary data.

273. The system of claim 272, wherein the telephone number includes a home number, a work number, a facsimile number, or a cellular number.

274. The system of claim 272, wherein the education data includes a degree, a major, a year, or a school name.

275. The system of claim 272, wherein the past employer data includes an employer name, a last title, and a period of employment.

276. The system of claim 272, wherein the salary data includes a current salary and an expected salary.

277. The system of claim 255, wherein the examining of the use of each said at least one skill or experience-related phrase in the resume includes examining a portion of the resume that surrounds each said at least one skill or experience-related phrase for a context.

278. The system of claim 277, wherein a context for each said at least one implied skill or experience-related phrase is the context of the implying said at least one skill or experience-related phrase.

279. The system of claim 278, wherein the processor is further configured to:
when the experience range is zero:
set the term of experience to zero; and
when the experience range is greater than zero:
determine a start time for the experience range;
determine an end time for the experience range;
compute a time difference between the start time and the end time; and
set the term of experience to the time difference,
wherein the term of experience is rounded down to a unit of time.

280. The system of claim 279, wherein the unit of time is a number of seconds, minutes, hours, days, weeks, months, years, or decades.

281. The system of claim 279, wherein the unit of time is an integer.

282. The system of claim 279, wherein the unit of time is not an integer.

283. The system of claim 279, wherein to set the term of experience to the time difference, the processor is further configured to:
compute a repeated entry time difference for each of the searchable phrases that is a repeated entry and is associated with an other experience range; and
add to the time difference each repeated entry time difference,
wherein the other experience range includes an other start time and an other end time, and
wherein the other start time and the start time are different, or the other end time and the end time are different.

284. The system of claim 283, wherein to store the parsed resume, the processor is further configured to:
store each of the searchable phrases having an identical term of experience as an element defined by a markup language, the element comprising a start tag, content data, and an end tag,
wherein the start tag and the end tag include the identical term of experience, and
wherein the content data includes each of the searchable phrases having the identical term of experience.

285. The system of claim 284, wherein the content data further includes a nested element comprising a nested start tag, nested content data, and a nested end tag, wherein the nested start tag and the nested end tag include a nested term of experience, and wherein the nested content data includes each of the searchable phrases having the nested term of experience.

286. The system of claim 285, wherein the nested term of experience is greater than the identical term of experience.

287. The system of claim 284, wherein the storing of the element is to a file.

288. The system of claim 287, wherein the file comprises an XML file.

289. The system of claim 255, wherein the processor is further configured to:
send a portion of the parsed resume to a candidate.

290. The system of claim 289, wherein the portion of the parsed resume is sent in a message to the candidate.

291. The system of claim 290, wherein the message includes an electronic mail message.

292. The system of claim 290, wherein the portion of the parsed resume is an attachment to an electronic mail message.

293. The system of claim 289, wherein a reference to the portion of the parsed resume is sent in a message to the candidate.

294. The system of claim 289, wherein the processor is further configured to:
receive a modified copy of the portion of the parsed resume.

295. The system of claim 294, wherein the processor is further configured to:
create a replacement resume based on the modified copy of the portion of the parsed resume.

296. The system of claim 255, wherein the resume comprises a replacement resume.

297. The system of claim 255, wherein the processor is further configured to:
receive the job description;
store the job description in the resume database; and
send a portion of the result set to a recruiter,
wherein the result set includes at least one matching resume from the resume database, each said at least one matching resume satisfying the job description.

298. The system of claim 297, wherein the required term of experience is rounded up to a unit of time.

299. The system of claim 298, wherein the unit of time is a number of seconds, minutes, hours, days, weeks, months, years, or decades.

300. The system of claim 298, wherein the unit of time is an integer.

301. The system of claim 298, wherein the unit of time is not an integer.

302. The system of claim 298, wherein each said at least one matching resume satisfies the job description when the parsed resume includes the required skill or experience-related phrase for each said at least one job requirement, and the term of experience for the required skill or experience-related phrase in the parsed resume is greater than or equal to the required term of experience.

303. The system of claim 302, wherein at least one of said at least one job requirement includes at least one alternative job requirement, each said at least one alternative job requirement comprising an alternative required skill or experience-related phrase and an alternative required term of experience, and wherein each said at least one matching resume satisfies said at least one of said at least one job requirement when the parsed resume includes either:
the required skill or experience-related phrase for said at least one of said at least one job requirement, and the term of experience for the required skill or experience-related phrase in the parsed resume is greater than or equal to the required term of experience; or the alternative required skill or experience-related phrase for any said at least one alternative job requirement, and the term of experience for the alternative required skill or experience-related phrase in the parsed resume is greater than or equal to the alternative required term of experience.

304. The system of claim 298, wherein each said at least one matching resume satisfies the job description when the parsed resume includes the required skill or experience-related phrase for any said at least one job requirement, and the term of experience for the required skill or experience-related phrase in the parsed resume is greater than or equal to the required term of experience.

305. The system of claim 297, wherein the processor receives the job description from a recruiter.

306. The system of claim 305, wherein a recruiter creates the job description.

307. The system of claim 297, wherein the job description is a clone of an existing job description stored in the resume database.

308. The system of claim 297, wherein the received job description is one of a number of job descriptions.

309. The system of claim 308, wherein the receipt of the number of job descriptions is automatic, scheduled, or periodic.

310. The system of claim 297, wherein a reference to the portion of the result set is sent.

311. The system of claim 297, wherein the processor is further configured to:
  identify as a selected resume one of said at least one matching resume; and
  display the selected resume on a display screen having a left side and a right side, the left side showing a parsed representation of the selected resume, and the right side showing a marked-up representation of the selected resume.

312. The system of claim 311, wherein the marked-up representation includes at least one occurrence of the required skill or experience-related phrase or at least one implying phrase of the required skill or experience-related phrase for said at least one job requirement, and wherein to display the selected resume, the processor is further configured to:
  mark each said at least one occurrence of the required skill or experience-related phrase for each said at least one job requirement.

313. The system of claim 312, wherein the marking includes highlighting each said at least one occurrence of the required skill or experience-related phrase or said at least one implying phrase of the required skill or experience-related phrase for said at least one job requirement, or displaying in reverse video each said at least one occurrence of the required skill or experience-related phrase or said at least one implying phrase of the required skill or experience-related phrase for said at least one job requirement.

314. The system of claim 255, wherein the job description further includes a required level of education or a required field of specialization, and wherein the processor is further configured to:
  store the job description in the resume database; and
  send a portion of the result set,
  wherein the result set includes at least one matching resume from the resume database, each said at least one matching resume satisfying the job description.

315. The system of claim 314, wherein each said at least one matching resume satisfies the job description when the parsed resume includes the required level of education, the required field of specialization, or a phrase implying the required level of education or the required field of specialization.

316. The system of claim 255, wherein the job description further includes a required salary range comprising a minimum required salary and a maximum required salary, and wherein the processor is further configured to:
  store the job description; and
  send a portion of the result set,
  wherein the result set includes at least one matching resume from the resume database, each said at least one matching resume satisfying the job description.

317. The system of claim 316, wherein each said at least one matching resume satisfies the job description when the parsed resume includes an expected salary that falls within the required salary range.

318. The system of claim 317, wherein the expected salary falls within the required salary range when:
  the expected salary is greater than or equal to the minimum required salary, and
  the expected salary is less than or equal to the maximum required salary.

319. The system of claim 318, wherein the parsed resume includes at least one salary range set to represent the expected salary, each said at least one salary range set including a salary range unit and a multiplier, and wherein a multiplication of the salary range unit and the multiplier yields a result that is the greatest integer that is less than or equal to the expected salary.

320. The system of claim 255, wherein the processor is further configured to:
  extract education data from the resume; and
  store the education data in the parsed resume.

321. The system of claim 320, wherein to store the education data, the processor is further configured to:
  store the education data in an element defined by a markup language, the element comprising a start tag, content data, and an end tag,
  wherein the content data includes the education data.

322. The system of claim 321, wherein the storing of the element is to a file.

323. The system of claim 322, wherein the file comprises an XML file.

324. The system of claim 321, wherein the education data includes at least one education summary, and wherein to store the education data, the processor is further configured to:
  store each said at least one education summary in an education summary element defined by a markup language, the education summary element comprising an education summary start tag, education summary content data, and an education summary end tag,
  wherein the education summary content data includes each said at least one education summary.

325. The system of claim 324, wherein each said at least one education summary includes a degree, a field of specialization, a school name, and a graduation year, and wherein to store the education data, the processor is further configured to:
  store the education summary content data in an education element defined by a markup language, the education element comprising an education start tag, education content data, and an education end tag,
  wherein the education start tag and the education end tag include an indication of the degree, and
  wherein the education content data includes each said at least one education summary.

326. The system of claim 325, wherein the education content data further includes a nested education element comprising a nested education start tag, nested education content data, and a nested education end tag, wherein the nested education start tag and the nested education end tag include an indication of a prerequisite degree implied by the degree, and wherein the nested education content data includes each said at least one education summary.

327. The system of claim 321, wherein to store the education data, the processor is further configured to:

store degree data in a degree element defined by a markup language, the degree element comprising an degree start tag, degree content data, and a degree end tag, wherein the education data includes at least one education summary, each said at least one education summary including a degree and at least one prerequisite degree implied by the degree, and wherein the degree content data includes, for each said at least one education summary, the degree and each said at least one prerequisite degree.

328. The system of claim 255, wherein the processor is further configured to:

obtain an expected salary for a candidate;

convert the expected salary to at least one multiplier; and store each said at least one multiplier in the parsed resume, wherein each said at least one multiplier is associated with a salary range unit, and wherein each said at least one multiplier is the greatest integer that is less than or equal to a result of a division of the expected salary by the salary range unit.

329. The system of claim 328, wherein the resume further comprises the expected salary.

330. The system of claim 328, wherein to store each said at least one multiplier, the processor is further configured to:

store each said at least one multiplier as an element defined by a markup language, the element comprising a start tag, content data, and an end tag, wherein the start tag and the end tag include an indication of the salary range unit associated with each said at least one multiplier, and wherein the content data includes each said at least one multiplier.

331. The system of claim 330, wherein the storing of the element is to a file.

332. The system of claim 331, wherein the file comprises an XML file.

333. A method for using a computer to improve a precision ratio when searching a resume database, comprising:

receiving a resume in a memory device resident in the computer;

parsing the resume to:

locate at least one skill or experience-related phrase in the resume;

determine an experience range for each said at least one skill or experience-related phrase by examining a use of each said at least one skill or experience-related phrase in the resume; and compute, by the computer, a term of experience for each said at least one skill or experience-related phrase based on the experience range, wherein the term of experience for each said at least one skill or experience-related phrase is a summation of the term of experience for each occurrence of the phrase associated with a different experience range;

storing the resume in the resume database;

associating at least one of said at least one skill or experience-related phrase located in the resume with at least one implied skill or experience-related phrase, wherein a term of experience for each said at least one implied skill or experience-related phrase is the term of experience computed for said at least one of said at least one skill or experience-related phrase, and wherein said at least one skill or experience-related phrase and said at least one implied skill or experience-related phrase are searchable phrases in the resume;

creating a parsed resume based on the resume, the parsed resume including each searchable phrase in the resume, the term of experience for each searchable phrase, and a relationship between the term of experience and each searchable phrase;

storing the parsed resume in the resume database;

sending a database query to the resume database, the database query including a job description that includes at least one job requirement, each said at least one job requirement including a required skill or experience-related phrase, and a required term of experience; and receiving a result set in response to the database query, wherein the result set includes the resume when the parsed resume satisfies the job description.

334. The method of claim 333, wherein at least one of each said at least one implied skill or experience-related phrase comprises a broader skill or experience-related phrase.

335. The method of claim 333, wherein the resume comprises a document in an electronic format.

336. The method of claim 335, wherein the electronic format includes a standard digital document format.

337. The method of claim 333, wherein the resume comprises a curriculum vitae.

338. The method of claim 333, wherein the receiving of the resume is from a candidate.

339. The method of claim 338, wherein the candidate creates the resume.

340. The method of claim 333, wherein the received resume is one of a number of resumes.

341. The method of claim 340, wherein the receipt of the number of resumes is automatic, scheduled, or periodic.

342. The method of claim 333, wherein the resume includes at least one word, and wherein said at least one skill or experience-related phrase comprises said at least one word.

343. The method of claim 342, wherein, when the resume includes at least two words, said at least one skill or experience-related phrase further comprises at least one word group, each said at least one word group including consecutive words from the resume.

344. The method of claim 333, wherein each said at least one skill or experience-related phrase comprises a skill, a job location, a title, a department, a responsibility, a duty, an action, an achievement, an accomplishment, a relationship, a product, a consultation, a group, a team, a field, a space, an area of endeavor, a company, an industry, a technical package, or a tool.

345. The method of claim 333, wherein the storing of the resume further comprises:

storing the resume as a public resume, wherein the resume database is accessible by at least one recruiter, and the public resume is accessible by every recruiter.

346. The method of claim 333, wherein the storing of the resume further comprises:

storing the resume as a private resume,
wherein the resume database is accessible by at least one recruiter, and the private resume is accessible by only one recruiter of said at least one recruiter.

347. The method of claim 333, wherein the storing of the resume further comprises:
storing the resume as a private resume,
wherein the resume database is accessible by at least one recruitment team, each said at least one recruitment team including at least one recruitment team member, and the private resume is accessible by only one recruitment team of said at least one recruitment team.

348. The method of claim 333, wherein the associating of said at least one of said at least one skill or experience-related phrase with each said at least one implied skill or experience-related phrase further comprises:
retrieving each said at least one implied skill or experience-related phrase from a phrase mapping table that relates each said at least one of said at least one skill or experience-related phrase to each said at least one implied skill or experience-related phrase.

349. The method of claim 333, wherein said at least one skill or experience-related phrase includes at least one attribute for a candidate.

350. The method of claim 349, wherein said at least one attribute includes a name, a residence or business address, a telephone number, an electronic mail address, education data, past employer data, or salary data.

351. The method of claim 350, wherein the telephone number includes a home number, a work number, a facsimile number, or a cellular number.

352. The method of claim 350, wherein the education data includes a degree, a major, a year, or a school name.

353. The method of claim 350, wherein the past employer data includes an employer name, a last title, and a period of employment.

354. The method of claim 350, wherein the salary data includes a current salary and an expected salary.

355. The method of claim 333, wherein the examining of the use of each said at least one skill or experience-related phrase in the resume includes examining a portion of the resume that surrounds each said at least one skill or experience-related phrase for a context.

356. The method of claim 355, wherein a context for each said at least one implied skill or experience-related phrase is the context of the implying said at least one skill or experience-related phrase.

357. The method of claim 356, further comprising:
when the experience range is zero:
setting the term of experience to zero; and
when the experience range is greater than zero:
determining a start time for the experience range;
determining an end time for the experience range;
computing a time difference between the start time and the end time; and
setting the term of experience to the time difference,
wherein the term of experience is rounded down to a unit of time.

358. The method of claim 357, wherein the unit of time is a number of seconds, minutes, hours, days, weeks, months, years, or decades.

359. The method of claim 357, wherein the unit of time is an integer.

360. The method of claim 357, wherein the unit of time is not an integer.

361. The method of claim 357, wherein the setting of the term of experience to the time difference further comprises:

computing a repeated entry time difference for each of the searchable phrases that is a repeated entry and is associated with an other experience range; and
adding to the time difference each repeated entry time difference,
wherein the other experience range includes an other start time and an other end time, and
wherein the other start time and the start time are different, or the other end time and the end time are different.

362. The method of claim 361, wherein the storing of the parsed resume further comprises:
storing each of the searchable phrases having an identical term of experience as an element defined by a markup language, the element comprising a start tag, content data, and an end tag,
wherein the start tag and the end tag include the identical term of experience, and
wherein the content data includes each of the searchable phrases having the identical term of experience.

363. The method of claim 362, wherein the content data further includes a nested element comprising a nested start tag, nested content data, and a nested end tag, wherein the nested start tag and the nested end tag include a nested term of experience, and wherein the nested content data includes each of the searchable phrases having the nested term of experience.

364. The method of claim 363, wherein the nested term of experience is greater than the identical term of experience.

365. The method of claim 362, wherein the storing of the element is to a file.

366. The method of claim 365, wherein the file comprises an XML file.

367. The method of claim 333, further comprising:
sending a portion of the parsed resume to a candidate.

368. The method of claim 367, wherein the portion of the parsed resume is sent in a message to the candidate.

369. The method of claim 368, wherein the message includes an electronic mail message.

370. The method of claim 368, wherein the portion of the parsed resume is an attachment to an electronic mail message.

371. The method of claim 367, wherein a reference to the portion of the parsed resume is sent in a message to the candidate.

372. The method of claim 367, further comprising:
receiving a modified copy of the portion of the parsed resume.

373. The method of claim 372, further comprising:
creating a replacement resume based on the modified copy of the portion of the parsed resume.

374. The method of claim 333, wherein the resume comprises a replacement resume.

375. The method of claim 333, further comprising:
receiving the job description;
storing the job description in the resume database; and
sending a portion of the result set to a recruiter,
wherein the result set includes at least one matching resume from the resume database, each said at least one matching resume satisfying the job description.

376. The method of claim 375, wherein the required term of experience is rounded up to a unit of time.

377. The method of claim 376, wherein the unit of time is a number of seconds, minutes, hours, days, weeks, months, years, or decades.

378. The method of claim 376, wherein the unit of time is an integer.

379. The method of claim 376, wherein the unit of time is not an integer.

380. The method of claim 376, wherein each said at least one matching resume satisfies the job description when the parsed resume includes the required skill or experience-related phrase for each said at least one job requirement, and the term of experience for the required skill or experience-related phrase in the parsed resume is greater than or equal to the required term of experience.

381. The method of claim 380, wherein at least one of said at least one job requirement includes at least one alternative job requirement, each said at least one alternative job requirement comprising an alternative required skill or experience-related phrase and an alternative required term of experience, and wherein each said at least one matching resume satisfies said at least one of said at least one job requirement when the parsed resume includes either:
 the required skill or experience-related phrase for said at least one of said at least one job requirement, and the term of experience for the required skill or experience-related phrase in the parsed resume is greater than or equal to the required term of experience; or
 the alternative required skill or experience-related phrase for any said at least one alternative job requirement, and the term of experience for the alternative required skill or experience-related phrase in the parsed resume is greater than or equal to the alternative required term of experience.

382. The method of claim 376, wherein each said at least one matching resume satisfies the job description when the parsed resume includes the required skill or experience-related phrase for any said at least one job requirement, and the term of experience for the required skill or experience-related phrase in the parsed resume is greater than or equal to the required term of experience.

383. The method of claim 375, wherein the receiving of the job description is from a recruiter.

384. The method of claim 383, wherein a recruiter creates the job description.

385. The method of claim 375, wherein the job description is a clone of an existing job description stored in the resume database.

386. The method of claim 375, wherein the received job description is one of a number of job descriptions.

387. The method of claim 386, wherein the receipt of the number of job descriptions is automatic, scheduled, or periodic.

388. The method of claim 375, wherein a reference to the portion of the result set is sent.

389. The method of claim 375, further comprising:
 identifying as a selected resume one of said at least one matching resume; and
 displaying the selected resume on a display screen having a left side and a right side, the left side showing a parsed representation of the selected resume, and the right side showing a marked-up representation of the selected resume.

390. The method of claim 389, wherein the marked-up representation includes at least one occurrence of the required skill or experience-related phrase or at least one implying phrase of the required skill or experience-related phrase for said at least one job requirement, and wherein the displaying of the selected resume further comprises:
 marking each said at least one occurrence of the required skill or experience-related phrase for each said at least one job requirement.

391. The method of claim 390, wherein the marking includes highlighting each said at least one occurrence of the required skill or experience-related phrase or said at least one implying phrase of the required skill or experience-related phrase for said at least one job requirement, or displaying in reverse video each said at least one occurrence of the required skill or experience-related phrase or said at least one implying phrase of the required skill or experience-related phrase for said at least one job requirement.

392. The method of claim 333, wherein the job description further includes a required level of education or a required field of specialization, the method further comprising:
 storing the job description in the resume database; and
 sending a portion of the result set,
  wherein the result set includes at least one matching resume from the resume database, each said at least one matching resume satisfying the job description.

393. The method of claim 392, wherein each said at least one matching resume satisfies the job description when the parsed resume includes the required level of education, the required field of specialization, or a phrase implying the required level of education or the required field of specialization.

394. The method of claim 333, wherein the job description further includes a required salary range comprising a minimum required salary and a maximum required salary, the method further comprising:
 storing the job description; and
 sending a portion of the result set,
  wherein the result set includes at least one matching resume from the resume database, each said at least one matching resume satisfying the job description.

395. The method of claim 394, wherein each said at least one matching resume satisfies the job description when the parsed resume includes an expected salary that falls within the required salary range.

396. The method of claim 395, wherein the expected salary falls within the required salary range when:
 the expected salary is greater than or equal to the minimum required salary, and
 the expected salary is less than or equal to the maximum required salary.

397. The method of claim 396, wherein the parsed resume includes at least one salary range set to represent the expected salary, each said at least one salary range set including a salary range unit and a multiplier, and wherein a multiplication of the salary range unit and the multiplier yields a result that is the greatest integer that is less than or equal to the expected salary.

398. The method of claim 333, further comprising:
 extracting education data from the resume; and
 storing the education data in the parsed resume.

399. The method of claim 398, wherein the storing of the education data further comprises:
 storing the education data in an element defined by a markup language, the element comprising a start tag, content data, and an end tag,
 wherein the content data includes the education data.

400. The method of claim 399, wherein the storing of the element is to a file.

401. The method of claim 400, wherein the file comprises an XML file.

402. The method of claim 399, wherein the education data includes at least one education summary, and wherein the storing of the education data further comprises:
 storing each said at least one education summary in an education summary element defined by a markup language, the education summary element comprising an education summary start tag, education summary content data, and an education summary end tag, wherein the education summary content data includes each said at least one education summary.

403. The method of claim 402, wherein each said at least one education summary includes a degree, a field of specialization, a school name, and a graduation year, and wherein the storing of the education data further comprises:
storing the education summary content data in an education element defined by a markup language, the education element comprising an education start tag, education content data, and an education end tag,
wherein the education start tag and the education end tag include an indication of the degree, and
wherein the education content data includes each said at least one education summary.

404. The method of claim 403, wherein the education content data further includes a nested education element comprising a nested education start tag, nested education content data, and a nested education end tag,
wherein the nested education start tag and the nested education end tag include an indication of a prerequisite degree implied by the degree, and
wherein the nested education content data includes each said at least one education summary.

405. The method of claim 399, wherein the storing of the education data further comprises:
storing degree data in a degree element defined by a markup language, the degree element comprising an degree start tag, degree content data, and a degree end tag,
wherein the education data includes at least one education summary, each said at least one education summary including a degree and at least one prerequisite degree implied by the degree, and
wherein the degree content data includes, for each said at least one education summary, the degree and each said at least one prerequisite degree.

406. The method of claim 333, further comprising:
obtaining an expected salary for a candidate;
converting the expected salary to at least one multiplier; and
storing each said at least one multiplier in the parsed resume,
wherein each said at least one multiplier is associated with a salary range unit, and
wherein each said at least one multiplier is the greatest integer that is less than or equal to a result of a division of the expected salary by the salary range unit.

407. The method of claim 406, wherein the resume further comprises the expected salary.

408. The method of claim 406, wherein the storing of each said at least one multiplier further comprises:
storing each said at least one multiplier as an element defined by a markup language, the element comprising a start tag, content data, and an end tag,
wherein the start tag and the end tag include an indication of the salary range unit associated with each said at least one multiplier, and
wherein the content data includes each said at least one multiplier.

409. The method of claim 408, wherein the storing of the element is to a file.

410. The method of claim 409, wherein the file comprises an XML file.

411. A computer program product, to be used on a computer, for improving a precision ratio when searching a resume database, comprising:
a computer readable medium storing:
program code for receiving a resume;
program code for parsing the resume to:
locate at least one skill or experience-related phrase in the resume;
determine an experience range for each said at least one skill or experience-related phrase by examining a use of each said at least one skill or experience-related phrase in the resume; and
compute a term of experience for each said at least one skill or experience-related phrase based on the experience range,
wherein the term of experience for each said at least one skill or experience-related phrase is a summation of the term of experience for each occurrence of the phrase associated with a different experience range;
program code for storing the resume in the resume database;
program code for associating at least one of said at least one skill or experience-related phrase located in the resume with at least one implied skill or experience-related phrase, wherein a term of experience for each said at least one implied skill or experience-related phrase is the term of experience computed for said at least one of said at least one skill or experience-related phrase, and wherein said at least one skill or experience-related phrase and said at least one implied skill or experience-related phrase are searchable phrases in the resume;
program code for creating a parsed resume based on the resume, the parsed resume including each searchable phrase in the resume, the term of experience for each searchable phrase, and a relationship between the term of experience and each searchable phrase;
program code for storing the parsed resume in the resume database;
program code for sending a database query to the resume database, the database query including a job description that includes at least one job requirement, each said at least one job requirement including a required skill or experience-related phrase, and a required term of experience; and
program code for receiving a result set in response to the database query, wherein the result set includes the resume when the parsed resume satisfies the job description.

412. The computer program product of claim 411, wherein at least one of each said at least one implied skill or experience-related phrase comprises a broader skill or experience-related phrase.

413. The computer program product of claim 411, wherein the received resume is one of a number of resumes.

414. The computer program product of claim 413, wherein the receipt of the number of resumes is automatic, scheduled, or periodic.

415. The computer program product of claim 411, wherein the resume includes at least one word, and wherein said at least one skill or experience-related phrase comprises said at least one word.

416. The computer program product of claim 415, wherein, when the resume includes at least two words, said at least one skill or experience-related phrase further comprises at least one word group, each said at least one word group including consecutive words from the resume.

417. The computer program product of claim 411, wherein the program code for storing the resume further comprises:

program code for storing the resume as a public resume,
wherein the resume database is accessible by at least one recruiter, and the public resume is accessible by every recruiter.

418. The computer program product of claim 411, wherein the program code for storing the resume further comprises:
program code for storing the resume as a private resume,
wherein the resume database is accessible by at least one recruiter, and the private resume is accessible by only one recruiter of said at least one recruiter.

419. The computer program product of claim 411, wherein the program code for storing the resume further comprises:
program code for storing the resume as a private resume,
wherein the resume database is accessible by at least one recruitment team, each said at least one recruitment team including at least one recruitment team member, and the private resume is accessible by only one recruitment team of said at least one recruitment team.

420. The computer program product of claim 411, wherein the program code for associating said at least one of said at least one skill or experience-related phrase with each said at least one implied skill or experience-related phrase further comprises:
program code for retrieving each said at least one implied skill or experience-related phrase from a phrase mapping table that relates each said at least one of said at least one skill or experience-related phrase to each said at least one implied skill or experience-related phrase.

421. The computer program product of claim 411, wherein said at least one skill or experience-related phrase includes at least one attribute for a candidate.

422. The computer program product of claim 411, wherein the examining of the use of each said at least one skill or experience-related phrase in the resume includes examining a portion of the resume that surrounds each said at least one skill or experience-related phrase for a context.

423. The computer program product of claim 422, wherein a context for each said at least one implied skill or experience-related phrase is the context of the implying said at least one skill or experience-related phrase.

424. The computer program product of claim 423, the computer readable medium further storing:
program code for setting the term of experience to zero when the experience range is zero;
program code for determining a start time for the experience range when the experience range is greater than zero;
program code for determining an end time for the experience range when the experience range is greater than zero;
program code for computing a time difference between the start time and the end time when the experience range is greater than zero; and
program code for setting the term of experience to the time difference when the experience range is greater than zero,
wherein the term of experience is rounded down to a unit of time.

425. The computer program product of claim 424, wherein the program code for setting the term of experience to the time difference further comprises:
program code for computing a repeated entry time difference for each of the searchable phrases that is a repeated entry and is associated with an other experience range; and
program code for adding to the time difference each repeated entry time difference,
wherein the other experience range includes an other start time and an other end time, and
wherein the other start time and the start time are different, or the other end time and the end time are different.

426. The computer program product of claim 425, wherein the program code for storing the parsed resume further comprises:
program code for storing each of the searchable phrases having an identical term of experience as an element defined by a markup language, the element comprising a start tag, content data, and an end tag,
wherein the start tag and the end tag include the identical term of experience, and
wherein the content data includes each of the searchable phrases having the identical term of experience.

427. The computer program product of claim 426, wherein the content data further includes a nested element comprising a nested start tag, nested content data, and a nested end tag, wherein the nested start tag and the nested end tag include a nested term of experience, and wherein the nested content data includes each of the searchable phrases having the nested term of experience.

428. The computer program product of claim 427, wherein the nested term of experience is greater than the identical term of experience.

429. The computer program product of claim 426, wherein the storing of the element is to a file.

430. The computer program product of claim 429, wherein the file comprises an XML file.

431. The computer program product of claim 411, the computer readable medium further storing:
program code for sending a portion of the parsed resume to a candidate.

432. The computer program product of claim 431, wherein a reference to the portion of the parsed resume is sent in a message to the candidate.

433. The computer program product of claim 431, the computer readable medium further storing:
program code for receiving a modified copy of the portion of the parsed resume.

434. The computer program product of claim 433, the computer readable medium further storing:
program code for creating a replacement resume based on the modified copy of the portion of the parsed resume.

435. The computer program product of claim 411, the computer readable medium further storing:
program code for receiving the job description;
program code for storing the job description in the resume database; and
program code for sending a portion of the result set to a recruiter,
wherein the result set includes at least one matching resume from the resume database, each said at least one matching resume satisfying the job description.

436. The computer program product of claim 435, wherein the required term of experience is rounded up to a unit of time.

437. The computer program product of claim 436, wherein each said at least one matching resume satisfies the job description when the parsed resume includes the required skill or experience-related phrase for each said at least one job requirement, and the term of experience for the required skill or experience-related phrase in the parsed resume is greater than or equal to the required term of experience.

438. The computer program product of claim 437, wherein at least one of said at least one job requirement includes at least one alternative job requirement, each said at least one alternative job requirement comprising an alternative required skill or experience-related phrase and an alternative required term of experience, and wherein each said at least one matching resume satisfies said at least one of said at least one job requirement when the parsed resume includes either:

the required skill or experience-related phrase for said at least one of said at least one job requirement, and the term of experience for the required skill or experience-related phrase in the parsed resume is greater than or equal to the required term of experience; or the alternative required skill or experience-related phrase for any said at least one alternative job requirement, and the term of experience for the alternative required skill or experience-related phrase in the parsed resume is greater than or equal to the alternative required term of experience.

439. The computer program product of claim 436, wherein each said at least one matching resume satisfies the job description when the parsed resume includes the required skill or experience-related phrase for any said at least one job requirement, and the term of experience for the required skill or experience-related phrase in the parsed resume is greater than or equal to the required term of experience.

440. The computer program product of claim 435, wherein the job description is a clone of an existing job description stored in the resume database.

441. The computer program product of claim 435, wherein the received job description is one of a number of job descriptions.

442. The computer program product of claim 441, wherein the receipt of the number of job descriptions is automatic, scheduled, or periodic.

443. The computer program product of claim 435, wherein a reference to the portion of the result set is sent.

444. The computer program product of claim 435, the computer readable medium further storing:

program code for identifying as a selected resume one of said at least one matching resume; and program code for displaying the selected resume on a display screen having a left side and a right side, the left side showing a parsed representation of the selected resume, and the right side showing a marked-up representation of the selected resume.

445. The computer program product of claim 444, wherein the marked-up representation includes at least one occurrence of the required skill or experience-related phrase or at least one implying phrase of the required skill or experience-related phrase for said at least one job requirement, and wherein the program code for displaying the selected resume further comprises:

program code for marking each said at least one occurrence of the required skill or experience-related phrase for each said at least one job requirement.

446. The computer program product of claim 445, wherein the marking includes highlighting each said at least one occurrence of the required skill or experience-related phrase or said at least one implying phrase of the required skill or experience-related phrase for said at least one job requirement, or displaying in reverse video each said at least one occurrence of the required skill or experience-related phrase or said at least one implying phrase of the required skill or experience-related phrase for said at least one job requirement.

447. The computer program product of claim 411, wherein the job description further includes a required level of education or a required field of specialization, the computer readable medium further storing:

program code for storing the job description in the resume database; and program code for sending a portion of the result set, wherein the result set includes at least one matching resume from the resume database, each said at least one matching resume satisfying the job description.

448. The computer program product of claim 447, wherein each said at least one matching resume satisfies the job description when the parsed resume includes the required level of education, the required field of specialization, or a phrase implying the required level of education or the required field of specialization.

449. The computer program product of claim 411, wherein the job description further includes a required salary range comprising a minimum required salary and a maximum required salary, the computer readable medium further storing:

program code for storing the job description; and program code for sending a portion of the result set, wherein the result set includes at least one matching resume from the resume database, each said at least one matching resume satisfying the job description.

450. The computer program product of claim 449, wherein each said at least one matching resume satisfies the job description when the parsed resume includes an expected salary that falls within the required salary range.

451. The computer program product of claim 450, wherein the expected salary falls within the required salary range when:

the expected salary is greater than or equal to the minimum required salary, and the expected salary is less than or equal to the maximum required salary.

452. The computer program product of claim 451, wherein the parsed resume includes at least one salary range set to represent the expected salary, each said at least one salary range set including a salary range unit and a multiplier, and wherein a multiplication of the salary range unit and the multiplier yields a result that is the greatest integer that is less than or equal to the expected salary.

453. The computer program product of claim 411, the computer readable medium further storing:

program code for extracting education data from the resume; and program code for storing the education data in the parsed resume.

454. The computer program product of claim 453, wherein the program code for storing the education data further comprises:

program code for storing the education data in an element defined by a markup language, the element comprising a start tag, content data, and an end tag, wherein the content data includes the education data.

455. The computer program product of claim 454, wherein the storing of the element is to a file.

456. The computer program product of claim 455, wherein the file comprises an XML file.

457. The computer program product of claim 454, wherein the education data includes at least one education summary, and wherein the program code for storing the education data further comprises:

program code for storing each said at least one education summary in an education summary element defined by a markup language, the education summary element comprising an education summary start tag, education summary content data, and an education summary end tag, wherein the education summary content data includes each said at least one education summary.

458. The computer program product of claim 457, wherein each said at least one education summary includes a degree, a field of specialization, a school name, and a graduation year, and wherein the program code for storing the education data further comprises:
program code for storing the education summary content data in an education element defined by a markup language, the education element comprising an education start tag, education content data, and an education end tag,
wherein the education start tag and the education end tag include an indication of the degree, and
wherein the education content data includes each said at least one education summary.

459. The computer program product of claim 458, wherein the education content data further includes a nested education element comprising a nested education start tag, nested education content data, and a nested education end tag,
wherein the nested education start tag and the nested education end tag include an indication of a prerequisite degree implied by the degree, and
wherein the nested education content data includes each said at least one education summary.

460. The computer program product of claim 454, wherein the program code for storing the education data further comprises:
program code for storing degree data in a degree element defined by a markup language, the degree element comprising an degree start tag, degree content data, and a degree end tag,
wherein the education data includes at least one education summary, each said at least one education summary including a degree and at least one prerequisite degree implied by the degree, and
wherein the degree content data includes, for each said at least one education summary, the degree and each said at least one prerequisite degree.

461. The computer program product of claim 411, the computer readable medium further storing:
program code for obtaining an expected salary for a candidate;
program code for converting the expected salary to at least one multiplier; and
program code for storing each said at least one multiplier in the parsed resume,
wherein each said at least one multiplier is associated with a salary range unit, and
wherein each said at least one multiplier is the greatest integer that is less than or equal to a result of a division of the expected salary by the salary range unit.

462. The computer program product of claim 461, wherein the resume further comprises the expected salary.

463. The computer program product of claim 461, wherein the program code for storing each said at least one multiplier further comprises:
program code for storing each said at least one multiplier as an element defined by a markup language, the element comprising a start tag, content data, and an end tag,
wherein the start tag and the end tag include an indication of the salary range unit associated with each said at least one multiplier, and
wherein the content data includes each said at least one multiplier.

464. The computer program product of claim 463, wherein the storing of the element is to a file.

465. The computer program product of claim 464, wherein the file comprises an XML file.

466. A system for using a computer to improve a precision ratio when searching a resume database, comprising:
means for receiving a resume;
means for parsing the resume to:
locate at least one skill or experience-related phrase in the resume;
determine an experience range for each said at least one skill or experience-related phrase by examining a use of each said at least one skill or experience-related phrase in the resume; and
compute a term of experience for each said at least one skill or experience-related phrase based on the experience range,
wherein the term of experience for each said at least one skill or experience-related phrase is a summation of the term of experience for each occurrence of the phrase associated with a different experience range;
means for storing the resume in the resume database;
means for associating at least one of said at least one skill or experience-related phrase located in the resume with at least one implied skill or experience-related phrase, wherein a term of experience for each said at least one implied skill or experience-related phrase is the term of experience computed for said at least one of said at least one skill or experience-related phrase, and wherein said at least one skill or experience-related phrase and said at least one implied skill or experience-related phrase are searchable phrases in the resume;
means for creating a parsed resume based on the resume, the parsed resume including each searchable phrase in the resume, the term of experience for each searchable phrase, and a relationship between the term of experience and each searchable phrase;
means for storing the parsed resume in the resume database;
means for sending a database query to the resume database, the database query including a job description that includes at least one job requirement, each said at least one job requirement including a required skill or experience-related phrase, and a required term of experience; and
means for receiving a result set in response to the database query, wherein the result set includes the resume when the parsed resume satisfies the job description.

467. The system of claim 466, wherein at least one of each said at least one implied skill or experience-related phrase comprises a broader skill or experience-related phrase.

468. The system of claim 466, wherein the received resume is one of a number of resumes.

469. The system of claim 468, wherein the receipt of the number of resumes is automatic, scheduled, or periodic.

470. The system of claim 466, wherein the resume includes at least one word, and wherein said at least one skill or experience-related phrase comprises said at least one word.

471. The system of claim 470, wherein, when the resume includes at least two words, said at least one skill or experience-related phrase further comprises at least one word group, each said at least one word group including consecutive words from the resume.

472. The system of claim 466, wherein the means for storing the resume further comprises:
means for storing the resume as a public resume,
wherein the resume database is accessible by at least one recruiter, and the public resume is accessible by every recruiter.

473. The system of claim 466, wherein the means for storing the resume further comprises:
    means for storing the resume as a private resume,
    wherein the resume database is accessible by at least one recruiter, and the private resume is accessible by only one recruiter of said at least one recruiter.

474. The system of claim 466, wherein the means for storing the resume further comprises:
    means for storing the resume as a private resume,
    wherein the resume database is accessible by at least one recruitment team, each said at least one recruitment team including at least one recruitment team member, and the private resume is accessible by only one recruitment team of said at least one recruitment team.

475. The system of claim 466, wherein the means for associating said at least one of said at least one skill or experience-related phrase with each said at least one implied skill or experience-related phrase further comprises:
    means for retrieving each said at least one implied skill or experience-related phrase from a phrase mapping table that relates each said at least one of said at least one skill or experience-related phrase to each said at least one implied skill or experience-related phrase.

476. The system of claim 466, wherein said at least one skill or experience-related phrase includes at least one attribute for a candidate.

477. The system of claim 466, wherein the examining of the use of each said at least one skill or experience-related phrase in the resume includes examining a portion of the resume that surrounds each said at least one skill or experience-related phrase for a context.

478. The system of claim 477, wherein a context for each said at least one implied skill or experience-related phrase is the context of the implying said at least one skill or experience-related phrase.

479. The system of claim 478, further comprising:
    means for setting the term of experience to zero when the experience range is zero;
    means for determining a start time for the experience range when the experience range is greater than zero;
    means for determining an end time for the experience range when the experience range is greater than zero;
    means for computing a time difference between the start time and the end time when the experience range is greater than zero; and
    means for setting the term of experience to the time difference when the experience range is greater than zero,
    wherein the term of experience is rounded down to a unit of time.

480. The system of claim 479, wherein the means for setting the term of experience to the time difference further comprises:
    means for computing a repeated entry time difference for each of the searchable phrases that is a repeated entry and is associated with an other experience range; and
    means for adding to the time difference each repeated entry time difference,
    wherein the other experience range includes an other start time and an other end time, and
    wherein the other start time and the start time are different, or the other end time and the end time are different.

481. The system of claim 480, wherein the means for storing the parsed resume further comprises:
    means for storing each of the searchable phrases having an identical term of experience as an element defined by a markup language, the element comprising a start tag, content data, and an end tag,
    wherein the start tag and the end tag include the identical term of experience, and
    wherein the content data includes each of the searchable phrases having the identical term of experience.

482. The system of claim 481, wherein the content data further includes a nested element comprising a nested start tag, nested content data, and a nested end tag, wherein the nested start tag and the nested end tag include a nested term of experience, and wherein the nested content data includes each of the searchable phrases having the nested term of experience.

483. The system of claim 482, wherein the nested term of experience is greater than the identical term of experience.

484. The system of claim 481, wherein the storing of the element is to a file.

485. The system of claim 484, wherein the file comprises an XML file.

486. The system of claim 466, further comprising:
    means for sending a portion of the parsed resume to a candidate.

487. The system of claim 486, wherein a reference to the portion of the parsed resume is sent in a message to the candidate.

488. The system of claim 486, further comprising:
    means for receiving a modified copy of the portion of the parsed resume.

489. The system of claim 488, further comprising:
    means for creating a replacement resume based on the modified copy of the portion of the parsed resume.

490. The system of claim 466, further comprising:
    means for receiving the job description;
    means for storing the job description in the resume database; and
    means for sending a portion of the a result set to a recruiter,
    wherein the result set includes at least one matching resume from the resume database, each said at least one matching resume satisfying the job description.

491. The system of claim 490, wherein the required term of experience is rounded up to a unit of time.

492. The system of claim 491, wherein each said at least one matching resume satisfies the job description when the parsed resume includes the required skill or experience-related phrase for each said at least one job requirement, and the term of experience for the required skill or experience-related phrase in the parsed resume is greater than or equal to the required term of experience.

493. The system of claim 492, wherein at least one of said at least one job requirement includes at least one alternative job requirement, each said at least one alternative job requirement comprising an alternative required skill or experience-related phrase and an alternative required term of experience, and wherein each said at least one matching resume satisfies said at least one of said at least one job requirement when the parsed resume includes either:
    the required skill or experience-related phrase for said at least one of said at least one job requirement, and the term of experience for the required skill or experience-related phrase in the parsed resume is greater than or equal to the required term of experience; or
    the alternative required skill or experience-related phrase for any said at least one alternative job requirement, and the term of experience for the alternative required skill or experience-related phrase in the parsed resume is greater than or equal to the alternative required term of experience.

494. The system of claim 491, wherein each said at least one matching resume satisfies the job description when the parsed resume includes the required skill or experience-related phrase for any said at least one job requirement, and the term of experience for the required skill or experience-related phrase in the parsed resume is greater than or equal to the required term of experience.

495. The system of claim 490, wherein the job description is a clone of an existing job description stored in the resume database.

496. The system of claim 490, wherein the received job description is one of a number of job descriptions.

497. The system of claim 496, wherein the receipt of the number of job descriptions is automatic, scheduled, or periodic.

498. The system of claim 490, wherein a reference to the portion of the result set is sent.

499. The system of claim 490, further comprising:
   means for identifying as a selected resume one of said at least one matching resume; and
   means for displaying the selected resume on a display screen having a left side and a right side, the left side showing a parsed representation of the selected resume, and the right side showing a marked-up representation of the selected resume.

500. The system of claim 499, wherein the marked-up representation includes at least one occurrence of the required skill or experience-related phrase or at least one implying phrase of the required skill or experience-related phrase for said at least one job requirement, and wherein the means for displaying the selected resume further comprises:
   means for marking each said at least one occurrence of the required skill or experience-related phrase for each said at least one job requirement.

501. The system of claim 500, wherein the marking includes highlighting each said at least one occurrence of the required skill or experience-related phrase or said at least one implying phrase of the required skill or experience-related phrase for said at least one job requirement, or displaying in reverse video each said at least one occurrence of the required skill or experience-related phrase or said at least one implying phrase of the required skill or experience-related phrase for said at least one job requirement.

502. The system of claim 466, wherein the job description further includes a required level of education or a required field of specialization, the system further comprising:
   means for storing the job description in the resume database; and
   means for sending a portion of the result set,
   wherein the result set includes at least one matching resume from the resume database, each said at least one matching resume satisfying the job description.

503. The system of claim 502, wherein each said at least one matching resume satisfies the job description when the parsed resume includes the required level of education, the required field of specialization, or a phrase implying the required level of education or the required field of specialization.

504. The system of claim 466, wherein the job description further includes a required salary range comprising a minimum required salary and a maximum required salary, the system further comprising:
   means for storing the job description; and
   means for sending a portion of the result set,
   wherein the result set includes at least one matching resume from the resume database, each said at least one matching resume satisfying the job description.

505. The system of claim 504, wherein each said at least one matching resume satisfies the job description when the parsed resume includes an expected salary that falls within the required salary range.

506. The system of claim 505, wherein the expected salary falls within the required salary range when:
   the expected salary is greater than or equal to the minimum required salary, and
   the expected salary is less than or equal to the maximum required salary.

507. The system of claim 506, wherein the parsed resume includes at least one salary range set to represent the expected salary, each said at least one salary range set including a salary range unit and a multiplier, and wherein a multiplication of the salary range unit and the multiplier yields a result that is the greatest integer that is less than or equal to the expected salary.

508. The system of claim 466, further comprising:
   means for extracting education data from the resume; and
   means for storing the education data in the parsed resume.

509. The system of claim 508, wherein the means for storing the education data further comprises:
   means for storing the education data in an element defined by a markup language, the element comprising a start tag, content data, and an end tag,
   wherein the content data includes the education data.

510. The system of claim 509, wherein the storing of the element is to a file.

511. The system of claim 510, wherein the file comprises an XML file.

512. The system of claim 509, wherein the education data includes at least one education summary, and wherein the means for storing the education data further comprises:
   means for storing each said at least one education summary in an education summary element defined by a markup language, the education summary element comprising an education summary start tag, education summary content data, and an education summary end tag,
   wherein the education summary content data includes each said at least one education summary.

513. The system of claim 512, wherein each said at least one education summary includes a degree, a field of specialization, a school name, and a graduation year, and wherein the means for storing the education data further comprises:
   means for storing the education summary content data in an education element defined by a markup language, the education element comprising an education start tag, education content data, and an education end tag,
   wherein the education start tag and the education end tag include an indication of the degree, and
   wherein the education content data includes each said at least one education summary.

514. The system of claim 513, wherein the education content data further includes a nested education element comprising a nested education start tag, nested education content data, and a nested education end tag,
   wherein the nested education start tag and the nested education end tag include an indication of a prerequisite degree implied by the degree, and
   wherein the nested education content data includes each said at least one education summary.

515. The system of claim 509, wherein the means for storing the education data further comprises:
   means for storing degree data in a degree element defined by a markup language, the degree element comprising an degree start tag, degree content data, and a degree end tag, wherein the education data includes at least one education summary, each said at least one education summary including a degree and at least one prerequisite degree implied by the degree, and wherein the degree content data includes, for each said at least one education summary, the degree and each said at least one prerequisite degree.

516. The system of claim 466, further comprising:

means for obtaining an expected salary for a candidate;

means for converting the expected salary to at least one multiplier; and means for storing each said at least one multiplier in the parsed resume, wherein each said at least one multiplier is associated with a salary range unit, and wherein each said at least one multiplier is the greatest integer that is less than or equal to a result of a division of the expected salary by the salary range unit.

517. The system of claim 516, wherein the resume further comprises the expected salary.

518. The system of claim 516, wherein the means for storing each said at least one multiplier further comprises:

means for storing each said at least one multiplier as an element defined by a markup language, the element comprising a start tag, content data, and an end tag, wherein the start tag and the end tag include an indication of the salary range unit associated with each said at least one multiplier, and wherein the content data includes each said at least one multiplier.

519. The system of claim 518, wherein the storing of the element is to a file.

520. The system of claim 519, wherein the file comprises an XML file.

\* \* \* \* \*